US008730057B2

(12) United States Patent
Dalla

(10) Patent No.: US 8,730,057 B2
(45) Date of Patent: May 20, 2014

(54) AMR METER TO ZIGBEE COMMUNICATIONS BRIDGE

(75) Inventor: Christopher Dalla, Westminster, CO (US)

(73) Assignee: Tendril Networks, Inc., Boulder, CO (US)

( * ) Notice: Subject to any disclaimer, the term of this patent is extended or adjusted under 35 U.S.C. 154(b) by 186 days.

(21) Appl. No.: 12/856,350

(22) Filed: Aug. 13, 2010

(65) Prior Publication Data
US 2011/0169659 A1 Jul. 14, 2011

Related U.S. Application Data

(60) Provisional application No. 61/234,558, filed on Aug. 17, 2009.

(51) Int. Cl.
*G08B 23/00* (2006.01)
*G08C 15/06* (2006.01)

(52) U.S. Cl.
USPC .................................................. 340/870.02

(58) Field of Classification Search
USPC .................................................. 340/870.02
See application file for complete search history.

(56) References Cited

U.S. PATENT DOCUMENTS

2007/0247905 A1* 10/2007 Rudelic .................... 365/185.04
2008/0189415 A1*  8/2008 Vaswani et al. ............... 709/226
2008/0219239 A1*  9/2008 Bell et al. ..................... 370/351
2009/0138099 A1*  5/2009 Veillette ........................ 700/22
2010/0004791 A1*  1/2010 West et al. ................... 700/291
2010/0008510 A1*  1/2010 Zayas ........................... 380/283
2010/0156665 A1*  6/2010 Krzyzanowski et al. 340/870.02
2011/0035510 A1*  2/2011 Alexander .................... 709/246

OTHER PUBLICATIONS

Bullis, Kevin, "Dumb Meters Get Smarter," <http://www.technologyreview.com/energy/22366>, Mar. 31, 2009, 2 pages.
Dave's Tech Blog, "Itron Remote Read Electric Meter," <http://davestech.blogspot.com/2008/02/itron-remote-read-electric-meter.html>, Internet accessed on Nov. 8, 2010, 22 pages.
Hancock, Gregory, "Power monitoring to the people!" <http://www.gridinsight.com/2009/02/power-monitoring-to-the-people.html>, Feb. 25, 2009, 4 pages.

* cited by examiner

*Primary Examiner* — Arnold Kinkead
*Assistant Examiner* — Richard Tan
(74) *Attorney, Agent, or Firm* — Perkins Coie LLP

(57) ABSTRACT

A communications bridge facilitates communication between an automatic meter reading (AMR) meter and a home area network (HAN) that uses the ZigBee smart energy (SE) protocol. The communications bridge includes a variety of components, including an AMR receiver, a microcontroller, and a ZigBee radio. The AMR receiver reads AMR data, which is not compatible with the ZigBee SE protocol, from the AMR meter. The microcontroller parses the received AMR data and translates it into corresponding ZigBee data. This ZigBee data is transmitted to other devices on the HAN via the ZigBee radio. The translated AMR meter data can then be presented to a consumer in real-time, enabling the consumer to better understand and manage his or her energy usage.

20 Claims, 24 Drawing Sheets

AMR METER TO ZIGBEE COMMUNICATIONS BRIDGE

CROSS REFERENCE TO RELATED APPLICATION(S)

This application claims priority to, and incorporates by reference in its entirety, U.S. Provisional Patent Application No. 61/234,558, entitled "AMR Meter to ZigBee Communications Bridge," filed on Aug. 17, 2009.

TECHNICAL FIELD

The present invention relates to systems and methods for providing real-time access to metered consumption data. More specifically, the present technology relates converting automatic meter reading (AMR) data into data compatible with the ZigBee smart energy (SE) protocol.

BACKGROUND

Automatic meter reading (AMR) allows data to be automatically collected from electric meters at residences and/or businesses and transmitted to a central database for billing, analyzing, and other purposes. Utility companies, or contracted agents of utility companies, typically use trucks equipped with AMR radio devices to capture electric meter data while driving past a residence or business. Alternatively, utility personnel or agents may walk within a certain proximity of the meter and capture the electric meter data via a handheld device. The captured data is processed by a utility company and is used to calculate a customer's electricity bill.

AMR meters commonly transmit data including, but not limited to, summation information, interval information, present demand, configuration, diagnostic information, and a meter identifier. Summation information is the total amount of the product (e.g., energy, water, natural gas, etc.) delivered to a home or business. A summation value may decrease over time, for example, when a home is equipped with solar panels or a windmill, allowing the consumer to return energy to a power grid. A billing scheme implemented by allowing the consumer to return energy to a power grid. A billing scheme implemented by a utility company may provide for more than one summation. For example, one summation may apply to weekdays, while another summation may apply to nights and weekends. A summation is expressed in a unit of measure that is appropriate for the asset being delivered, such as a multiple of watt-hours (Wh) for energy, gallons for water, or cubic feet for gas.

Interval information indicates the amount of product delivered in one or more preceding time periods. Each time period is equal in length, and the time periods usually begin with the most recent interval and proceed to less recent intervals within a defined period of time. For example, an AMR protocol may transmit data for ten (10) intervals, with each interval representing a period of time of 2.5 minutes. In such an example, the interval data allows for historical analysis of the product usage for the 25 minutes (10×2.5 minutes) prior to the data transmission. Interval data often includes an indication of the time at which the most recent interval ended. Interval data is expressed in units similar to summation data.

Present demand indicates the amount of an asset currently being delivered through the metering device. Due to the nature of this measurement, present demand is typically only reported by meters that measure electricity. Present demand is an indication of the total amount of power being consumed by all of the devices to which the meter is providing power, and is usually measured in a multiple of watts (W).

Meter configuration data allows a receiving device to determine how to parse data transmitted by the meter. Meter configuration data may include information such as how many units (e.g., watt-hours, gallons, cubic feet) are represented by each segment of summation or interval data, how frequently the meter will transmit a message, how many seconds each interval of interval data represents, and other information. Meter configuration data may also indicate the version of firmware running on the AMR meter, which allows a receiving device to adjust for the effects of any known bugs in that firmware version. Not all AMR meters transmit meter configuration data. Where meter configuration data is not transmitted, a receiving device may derive the configuration data from the data format, presuming that the meter is configured like meters that transmit data in a similar format.

A meter identifier (ID) designates the meter that transmitted the message. Meter IDs may vary in length, and a single meter may transmit messages corresponding to more than one meter ID. Where a meter transmits messages corresponding to multiple meter IDs, the meter typically has a base ID of n and transmits messages with message IDs corresponding to n, n+1, n+2, and so on.

AMR meter data may be encoded for transmission according to a variety of recognized methods, including amplitude modulation (AM), frequency modulation (FM), frequency-hopping spread spectrum (FHSS), direct sequence spread spectrum (DSSS), non-return-to-zero (NRZ), Manchester encoding, and other methods. Because these methods are well known in the art, they will not be described in additional detail herein.

Under current AMR technology, a customer does not have real-time access to consumption data. Instead, the customer typically only sees its consumption data as part of its bill. This impedes a customer's ability to manage and understand its resource usage.

Moreover, smart energy grids are increasingly being deployed in residences, businesses, and neighborhoods. In addition to delivering energy to a residence or business in the usual manner, a smart grid allows a utility provider to interact with its customers in near real-time, allowing greater visibility into energy utilization. This improved visibility in turn allows much-improved management of energy usage. In addition, it allows the utility to warn customers of anticipated peak usage situations, so that devices in the customer's home can be configured to automatically curtail energy usage. Accordingly, the impact of a peak usage situation, such as energy consumption on an extraordinarily hot day, may be lessened. One of the most common implementations of the customer side of a smart grid uses the ZigBee smart energy (SE) protocol. The ZigBee SE protocol allows information to be collected from a network of sensing and control devices within a residence or business. However, AMR meter data is not compatible with the ZigBee SE protocol. AMR meter data cannot be read by a ZigBee device, and thus cannot be incorporated into an information system that processes and presents usage information from ZigBee devices.

SUMMARY

A system and method for providing an AMR meter to ZigBee communications bridge reads a radio signal from an AMR-enabled meter, parses the information contained in the radio signal, and reformats the data such that it can then be transmitted to other devices and/or receptors via the ZigBee SE protocol.

DETAILED DESCRIPTION

A system and method for providing an AMR meter to ZigBee communications bridge reads a radio signal from an AMR-enabled meter, parses the information contained in the radio signal, and reformats the data such that it can then be transmitted to other devices and/or receptors via the ZigBee SE protocol.

Among other benefits, the communications bridge enables AMR meter data to be presented on a daily, hourly, and in some cases minute-by-minute basis to the consumer. This increases the customer's awareness and enables the customer to better manage and understand their energy usage. In addition, the communications bridge allows utilities to "rescue" the investment already made in AMR meters that are already deployed, by allowing those meters to be used with current smart grid-like deployments, rather than requiring the utilities to deploy new smart grid-enabled meters.

1. AMR Meter Message Structure

There are a variety of AMR protocols that can be used to encode a message containing AMR meter data. Message format and content varies based on the AMR protocol used to encode the message. However, the communications bridge described herein is capable of reformatting AMR meter data according to a ZigBee protocol, regardless of the AMR protocol used to encode the AMR meter data.

Figure 1:
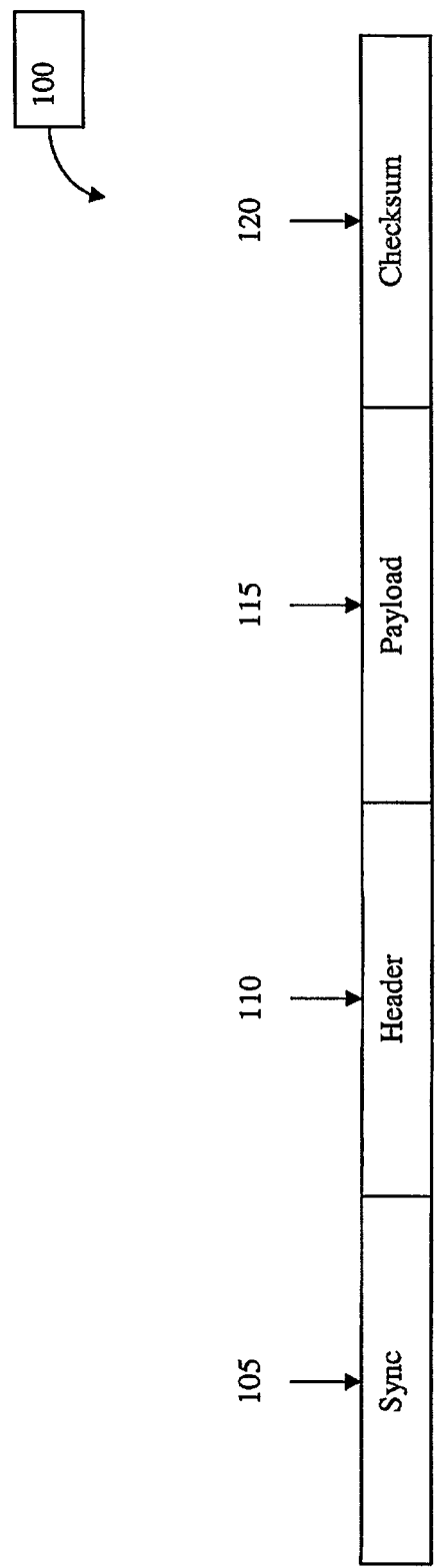
FIG. 1 is a block diagram of an AMR message.

No matter which AMR protocol is used, AMR messages typically share common features. FIG. 1 is a block diagram of a representative AMR message 100. The AMR message includes four elements: a sync field 105, a header 110, a payload 115, and a checksum 120. The sync field 105 of the AMR message 100 is a sequence of bits that precedes a valid message. The sync field 105 enables a receiving device to adjust its radio tuning and thresholds in order to optimize the chances of successfully receiving the message. For example, a receiving device may adjust threshold controls to allow on-off keyed (OOK) modulated and amplitude modulated (AM) message signal levels for "1" and "0" bits to be determined. As another example, a receiving device may lock autocorrelators in direct sequence spread spectrum (DSSS) receivers to a pseudorandom number (PN) code sequence being used by a transmitter.

The header 110 of the AMR message 100 generally includes information such as the message type (e.g., summation information, interval information, configuration information, etc.), the length of the message, the meter ID of the meter transmitting the message, and so on. For those AMR protocols that use fixed-length radio packets, the header 110 may be minimal. For example, in such a protocol, the header 110 may include only the meter ID. AMR protocols may differentiate message types by combining the message type with another field, such as the meter ID. For example, a meter capable of transmitting summation information and present demand may transmit the summation information using its base meter ID n and the present demand using a meter ID of n+1.

The payload 115 of the AMR message 100 includes telemetry and/or other data transmitted by the AMR meter. The structure and content of the payload 115 varies based on the AMR protocol and message type, and is described in additional detail herein.

The checksum 120 of the AMR message 100 includes one or more bytes that indicate the result of a mathematical operation applied to some combination of other bytes of the AMR message 100. The checksum 120 allows the receiving device to determine whether the received message is valid. The bytes to which the mathematical operation is applied typically include the entire payload 115 and all or a portion of the header 110. The sync field 105 is not usually included in the checksum, because if the sync field 105 is not received correctly, the receiving device will not even attempt to process the subsequent elements of the AMR message 100.

Although the sync field 105, header 110, payload 115, and checksum 120 are typically present in an AMR message 100, one skilled in the art will appreciate that not all AMR messages will have these fields, that the fields may appear in an order other than that depicted in FIG. 1, and that other AMR message formats may be used. For example, an AMR message may have superfluous "clock recovery" bytes scattered throughout the message, which are removed prior to parsing the message. Clock recovery bytes are described in additional detail herein.

In addition, in order to obscure message data, an AMR vendor may obfuscate its messages, such as by building the message in such a way as to make the purpose of a given byte of data non-obvious, or by encrypting all or part of the message. In such cases, a receiving device may use its knowledge of the AMR protocol to decrypt the received messages before parsing.

2. Model AMR Protocols

Because AMR protocols are proprietary to their developers, no current protocol will be detailed herein. Instead, various model protocols will be used to illustrate the capabilities of the communications bridge.

a. Model Protocol 1

Model Protocol 1 is designed to achieve at least the following goals: (1) capability to deploy at least 20 million meters of any given type; (2) short transmission time, allowing improved battery life for gas and water meters; (3) capability to transmit the same data shown on the meter's display or dials (e.g., summation information); (4) capability to transmit some number of bits of status information that can be used to describe problems with the meter; (5) message format simple enough to be implemented in a microcontroller having fewer than 8K bytes of program space; and (6) all meters of a given type will use the same unit of measure for the product metered.

The message format for Model Protocol 1 is defined in Table 1:

TABLE 1

| Byte | Description |
|---|---|
| 1 | Sync field 1 |
| 2 | Sync field 2 |
| 3 | Instrument type and status |
| 4 | Summation most significant byte |
| 5 | Summation second most significant byte |
| 6 | Summation second least significant byte |
| 7 | Summation least significant byte |
| 8 | Meter ID most significant byte |
| 9 | Meter ID second most significant byte |
| 10 | Meter ID second least significant byte |
| 11 | Meter ID least significant byte |
| 12 | Checksum high byte |
| 13 | Checksum low byte |

The instrument type and status byte (byte 3 in Table 1) includes five elements: the type of meter transmitting the message and four status flags that indicate various problems with the meter. This byte is formatted according to Table 2:

TABLE 2

| Bit | Description |
|---|---|
| 0 | Meter has been tampered with physically |
| 1 | Meter has detected reverse flow |
| 2 | Battery low (battery-powered modules in gas and water meters) Power outage detected in the last 3 hours (electric meters) |
| 3 | Meter nonvolatile memory corrupt |
| 4 ... 7 | Instrument type (see tables 3, 5 and 9) |

Because instrument type (bits 4-7 in Table 2) is encoded as a four-bit field, sixteen different types of instruments can be defined. For this protocol, the instrument types in Table 3 are defined:

TABLE 3

| Value | Description |
|---|---|
| 0x0 | Undefined |
| 0x1 | Electric meter |
| 0x2 | Gas meter |
| 0x3 | Water meter |
| 0x4 | Undefined |
| 0x5 | Undefined |
| 0x6 | Undefined |
| 0x7 | Undefined |
| 0x8 | Undefined |
| 0x9 | Undefined |
| 0xA | Undefined |
| 0xB | Undefined |
| 0xC | Undefined |
| 0xD | Undefined |
| 0xE | Undefined |
| 0xF | Undefined |

Model Protocol 1 specifies that electric meters express measurements in kilowatt-hours (kWh), gas meters in cubic feet, and water meters in gallons. In addition, checksums for Model Protocol 1 are computed by applying a mathematical algorithm to bytes 3 through 11.

Given the definition of Model Protocol 1, an example transmission from an electric meter using this protocol is depicted in Table 4:

TABLE 4

| Byte | Value | Description |
|---|---|---|
| 1 | 0x45 | Sync field 1 |
| 2 | 0xAA | Sync field 2 |
| 3 | 0x12 | Instrument type and status |
| 4 | 0x00 | Summation most significant byte |
| 5 | 0x00 | Summation second most significant byte |
| 6 | 0x30 | Summation second least significant byte |
| 7 | 0x39 | Summation least significant byte |
| 8 | 0x01 | Meter ID most significant byte |
| 9 | 0x01 | Meter ID second most significant byte |
| 10 | 0x11 | Meter ID second least significant byte |
| 11 | 0x11 | Meter ID least significant byte |
| 12 | 0xnn | Checksum high byte |
| 13 | 0xnn | Checksum low byte |

In the example message depicted in Table 4, the instrument type byte (byte 3, bits 4-7) is "0x1," which indicates an electric meter (see Table 3). Bit 1 is set, indicating that the meter has detected a reverse power flow (see Table 2). A reverse power flow may be detected, for example, when a customer has a windmill and returns surplus power to a grid. The transmitted summation (bytes 4-7) is "0x00003039." Because this is an electric meter, measured in kWh, this represents a reading of 12345 kWh of energy delivered through the meter. The meter ID (bytes 8-11) is "0x01011111."

Following initial deployment of meters using Model Protocol 1, a meter manufacturer may define new requirements without compromising backwards compatibility of the protocol. As an example, a manufacturer may implement the following new requirements: (1) allocation of an additional 4 billion meter IDs to gas meters, due to very strong sale of gas meter modules; (2) electric meters that can express summation with higher resolution (e.g., decawatt-hours (daWh)), due to pressure from electric utilities; and (3) electric meters that can express a summation (measured in daWh) and an instantaneous demand (measured in watts (W)). Given these new requirements, the summation bytes (bytes 4-7) of Model Protocol 1 are renamed counter bytes, and the encoding of the instrument type is modified as indicated in Table 5:

TABLE 5

| Value | Old description | New description |
|---|---|---|
| 0x1 | Electric meter | Electric meter, summation only, measures in kWh |
| 0x4 | Undefined | Gas meter |
| 0x5 | Undefined | Electric meter, summation only, measures in daWh |
| 0x6 | Undefined | Electric meter, summation + demand, measures in daWh and W. |

Given the changes in Model Protocol 1, an example transmission from an electric meter using revised Model Protocol 1 is depicted in Table 6:

TABLE 6

| Byte | Value | Description |
|---|---|---|
| 1 | 0x45 | Sync field 1 |
| 2 | 0xAA | Sync field 2 |
| 3 | 0x50 | Instrument type and status |
| 4 | 0x00 | Counter most significant byte |
| 5 | 0x12 | Counter second most significant byte |
| 6 | 0xD6 | Counter second least significant byte |
| 7 | 0x87 | Counter least significant byte |
| 8 | 0x01 | Meter ID most significant byte |
| 9 | 0x02 | Meter ID second most significant byte |

TABLE 6-continued

| Byte | Value | Description |
|---|---|---|
| 10 | 0x22 | Meter ID second least significant byte |
| 11 | 0x22 | Meter ID least significant byte |
| 12 | 0xnn | Checksum high byte |
| 13 | 0xnn | Checksum low byte |

In the example message depicted in Table 6, the instrument type (byte 3, bits 4-7) is "0x5," which indicates an electric meter that measures power in decawatt-hours (see Table 5). The transmitted counter value (bytes 4-7) is "0x0012D687." Given the instrument type, this represents a summation of 1234567 daWh (or 12345.67 kWh) of power delivered by the meter. The meter ID (bytes 8-11) is "0x01022222."

Because a new instrument type of "electric meter that measures summation and instantaneous demand" has been defined, a means of differentiating a message containing a summation from a message containing an instantaneous demand is defined. For example, a meter manufacturer may transmit a summation using the meter's base ID as the meter ID, and the instantaneous demand using the meter's base ID+1 as the meter ID. If a meter has a base ID of "0x0102333," an example message from the meter is depicted in Table 7:

TABLE 7

| Byte | Value | Description |
|---|---|---|
| 1 | 0x45 | Sync field 1 |
| 2 | 0xAA | Sync field 2 |
| 3 | 0x60 | Instrument type and status |
| 4 | 0x00 | Counter most significant byte |
| 5 | 0x34 | Counter second most significant byte |
| 6 | 0xBF | Counter second least significant byte |
| 7 | 0x15 | Counter least significant byte |
| 8 | 0x01 | Meter ID most significant byte |
| 9 | 0x02 | Meter ID second most significant byte |
| 10 | 0x33 | Meter ID second least significant byte |
| 11 | 0x33 | Meter ID least significant byte |
| 12 | 0xnn | Checksum high byte |
| 13 | 0xnn | Checksum low byte |

In the example depicted in Table 7, the instrument type (byte 3, bits 4-7) is "0x6," which indicates that this is an electric meter that measures power in decawatt-hours and instantaneous demand in watts (see Table 5). The transmitted counter value (bytes 4-7) is "0x0034BF15." Given the instrument type, this represents a reading of 3456789 daWh of power delivered or 3456789 W of power being consumed. To determine which of these values is represented by the counter value, the meter ID (bytes 8-11) is parsed. The meter ID is "0x01023333." Because this is the meter's base ID, as described herein, the counter value represents a summation. Accordingly, the counter represents a summation of 3456789 daWh of power delivered.

Another example transmission from an electric meter using revised Model Protocol 1 is depicted in Table 8:

TABLE 8

| Byte | Value | Description |
|---|---|---|
| 1 | 0x45 | Sync field 1 |
| 2 | 0xAA | Sync field 2 |
| 3 | 0x60 | Instrument type and status |
| 4 | 0x00 | Counter most significant byte |
| 5 | 0x00 | Counter second most significant byte |
| 6 | 0x04 | Counter second least significant byte |
| 7 | 0xD2 | Counter least significant byte |
| 8 | 0x01 | Meter ID most significant byte |
| 9 | 0x02 | Meter ID second most significant byte |
| 10 | 0x33 | Meter ID second least significant byte |
| 11 | 0x34 | Meter ID least significant byte |
| 12 | 0xnn | Checksum high byte |
| 13 | 0xnn | Checksum low byte |

In the example depicted in Table 8, the instrument type (byte 3, bits 4-7) is "0x6," which indicates that this is an electric meter that measures power in decawatt-hours and instantaneous demand in watts (see Table 5). The transmitted counter value (bits 4-7) is "0x000004D2." Given the instrument type, this represents a reading of 1234 daWh of power delivered or 1234 W of power being consumed. To determine which of these values is represented by the counter value, the meter ID (bytes 8-11) is parsed. The meter ID is "0x01023334." Because this is the meter's base ID+1, the counter value represents an instantaneous demand. Accordingly, the counter represents an instantaneous demand of 1234 W of power being consumed.

Because the meter ID in these examples effectively contains other data (in this case, the type of data represented by the counter field), in some embodiments steps are taken to prevent ambiguity in the messages. Ambiguity can occur, for example, if a single receiving device receives data from a first meter with a meter ID of N and a second meter with an ID of N+1. To prevent ambiguity, only every other base ID can be allocated, such that if a physical meter with an ID of N exists, no physical meter with an ID of N+1 could exist. Alternatively, meters can be geographically distributed, so that a physical meter with an ID of N is not within the range of a physical meter with an ID of N+1. One skilled in the art will recognize that other steps may be taken to prevent ambiguity, or that a combination of these and other steps may be used.

Model Protocol 1 can be revised in additional ways. For example, in response to a request from a gas utility that is concerned about messages being monitored and decoded by unauthorized persons, Model Protocol 1 may be further revised so that some of the bytes of the meter ID and the counter value are swapped to obscure their meaning. To accommodate meters that obfuscate data, the encoding of the instrument type may be modified as depicted in Table 9:

TABLE 9

| Value | Old description | New description |
|---|---|---|
| 0x2 | Gas meter | Gas meter, unobfuscated data |
| 0x4 | Gas meter | Gas meter, unobfuscated data |
| 0x7 | Undefined | Gas meter, obfuscated data |

Given these further revisions to Model Protocol 1, an example message transmitted by a gas meter that obfuscates its data is depicted in Table 10:

TABLE 10

| Byte | Value | Description |
|---|---|---|
| 1 | 0x45 | Sync field 1 |
| 2 | 0xAA | Sync field 2 |
| 3 | 0x70 | Instrument type and status |
| 4 | 0x22 | Counter least significant byte |
| 5 | 0x44 | Meter ID second least significant byte |
| 6 | 0x03 | Meter ID second most significant byte |

TABLE 10-continued

| Byte | Value | Description |
|---|---|---|
| 7 | 0x00 | Counter most significant byte |
| 8 | 0x01 | Meter ID most significant byte |
| 9 | 0xAB | Counter second least significant byte |
| 10 | 0x25 | Counter second most significant byte |
| 11 | 0x44 | Meter ID least significant byte |
| 12 | 0xnn | Checksum high byte |
| 13 | 0xnn | Checksum low byte |

In the example depicted in Table 10, the instrument type (byte 3, bits 4-7) is "0x7," which indicates that this is a gas meter that measures gas in cubic feet and obfuscates its data (see Table 9). The counter value (bytes 4, 7, 9 and 10, once reordered) is "0x0025AB22." Given the instrument type, this represents a summation of 2468642 cubic feet of gas delivered. The meter ID (bytes 5, 6, 8, and 11, once reordered) is "0x01034444."

b. Model Protocol 2

Model Protocol 2 is designed to achieve at least the following goals: (1) capability to deploy at least 20 million meters of any given type; (2) capability to transmit summation information, instantaneous demand, interval information, and meter configuration information; (3) interval information measures ten (10) intervals with 16 bits of resolution per interval; (4) a message is transmitted for every recorded interval; (5) capability to transmit some number of bits of status information that can be used to describe problems with the meter; (6) highly robust message verification (e.g., due to longer messages than in Model Protocol 1); and (7) more definitive determination of start-of-message (sync) condition.

The message format for Model Protocol 2 is defined in Table 11:

TABLE 11

| Byte | Description |
|---|---|
| 1 | Sync field 1 |
| 2 | Sync field 2 |
| 3 | Sync field 3 |
| 4 | Sync field 4 |
| 5 | Meter ID most significant byte |
| 6 | Meter ID second most significant byte |
| 7 | Meter ID second least significant byte |
| 8 | Meter ID least significant byte |
| 9 | Instrument type and unit of measure |
| 10 | Meter status and interval duration |
| 11 | Summation most significant byte |
| 12 | Summation second most significant byte |
| 13 | Summation second least significant byte |
| 14 | Summation least significant byte |
| 15 | Demand most significant byte |
| 16 | Demand mid byte |
| 17 | Demand least significant byte |
| 18 | Interval sequence number |
| 19 | Interval age high byte |
| 20 | Interval age low byte |
| 21 | Interval 0 high byte |
| 22 | Interval 0 low byte |
| 23 | Interval 1 high byte |
| 24 | Interval 1 low byte |
| 25 | Interval 2 high byte |
| 26 | Interval 2 low byte |
| 27 | Interval 3 high byte |
| 28 | Interval 3 low byte |
| 29 | Interval 4 high byte |
| 30 | Interval 4 low byte |
| 31 | Interval 5 high byte |
| 32 | Interval 5 low byte |
| 33 | Interval 6 high byte |

TABLE 11-continued

| Byte | Description |
|---|---|
| 34 | Interval 6 low byte |
| 35 | Interval 7 high byte |
| 36 | Interval 7 low byte |
| 37 | Interval 8 high byte |
| 38 | Interval 8 low byte |
| 39 | Interval 9 high byte |
| 40 | Interval 9 low byte |
| 41 | Checksum most significant byte |
| 42 | Checksum second most significant byte |
| 43 | Checksum second least significant byte |
| 44 | Checksum least significant byte |

The instrument type and unit of measure byte (byte 9 in Table 11) includes two four-bit values concatenated into a single byte. The first value describes the meter type. The second value specifies the unit of measure used by the meter, and is interpreted based on the meter type. This byte is formatted according to Table 12:

TABLE 12

| Bit | Description |
|---|---|
| 0 ... 3 | Instrument type (see table 13) |
| 4 ... 7 | Unit of measure (see table 14) |

Because instrument type is encoded as a four-bit field, sixteen different types of instruments can be defined. For this protocol, the instrument types in Table 13 are defined:

TABLE 13

| Value | Description |
|---|---|
| 0x0 | Undefined |
| 0x1 | Electric meter |
| 0x2 | Gas meter |
| 0x3 | Undefined |
| 0x4 | Water meter |
| 0x5 | Undefined |
| . | . |
| . | . |
| . | . |
| 0xF | Undefined |

Similar to instrument type, because the unit of measure (UOM) is a four-bit field, sixteen different units of measure can be defined. The interpretation of this field depends on the meter type, which is determined by parsing the value of the instrument type field, as described herein. For this protocol, the units of measure in Table 14 are defined:

TABLE 14

| Value | Electric meter UOM (summation/ interval/consumption) | Gas meter UOM | Water meter UOM |
|---|---|---|---|
| 0x0 | Wh/W | Cubic feet | Gallons |
| 0x1 | daWh/W | 10x Cubic feet | 10x Gallons |
| 0x2 | kWh/W | 100x Cubic feet | 100x Gallons |
| 0x3 | 10x kWh/W | 1000x Cubic feet | 1000x Gallons |
| 0x4 | Wh/$10^{ths}$ of W | Undefined | Undefined |
| 0x5 | daWh/$10^{ths}$ of W | Undefined | Undefined |
| 0x6 | kWh/$10^{ths}$ of W | Undefined | Undefined |
| 0x7 | 10x kWh/$10^{ths}$ of W | Undefined | Undefined |
| 0x8 | Undefined | Undefined | Undefined |
| 0x9 | Undefined | Undefined | Undefined |
| 0xA | Undefined | Undefined | Undefined |
| 0xB | Undefined | Undefined | Undefined |

TABLE 14-continued

| Value | Electric meter UOM (summation/ interval/consumption) | Gas meter UOM | Water meter UOM |
|---|---|---|---|
| 0xC | Undefined | Undefined | Undefined |
| 0xD | Undefined | Undefined | Undefined |
| 0xE | Undefined | Undefined | Undefined |
| 0xF | Undefined | Undefined | Undefined |

Because electric meters are assumed to be capable of sending interval data and instantaneous consumption in addition to summation data, the encoding of the UOM for electric meters is more complex than for gas and water meters. Such encoding can be even more complex if summation and interval data are encoded differently.

The meter status and interval duration byte (byte 10 in Table 11) contains five elements: a single four-bit value that encodes the interval duration in seconds, and four status flags that indicate various statuses of the meter. This byte is formatted according to Table 15:

TABLE 15

| Bit | Description |
|---|---|
| 0 ... 3 | Interval duration (see table 16) |
| 4 | Meter has been tampered with physically |
| 5 | Meter has detected reverse flow |
| 6 | Battery low (battery-powered modules in gas and water meters) Power outage detected in the last 3 hours (electric meters) |
| 7 | Meter nonvolatile memory corrupt |

Because interval duration is only allocated four bits of space in this protocol, a short list of valid interval durations (in this example, sixteen of them) is defined. The four available bits are used to select a duration from the list. In this example, interval duration is formatted according to Table 16:

TABLE 16

| Value | Interval duration |
|---|---|
| 0x0 | 15 seconds |
| 0x1 | 30 seconds |
| 0x2 | 60 seconds (1 minute) |
| 0x3 | 90 seconds (1.5 minutes) |
| 0x4 | 120 seconds (2 minutes) |
| 0x5 | 150 seconds (2.5 minutes) |
| 0x6 | 180 seconds (3 minutes) |
| 0x7 | 300 seconds (5 minutes) |
| 0x8 | 600 seconds (10 minutes) |
| 0x9 | 900 seconds (15 minutes) |
| 0xA | 1800 seconds (30 minutes) |
| 0xB | 3600 seconds (1 hour) |
| 0xC | 7200 seconds (2 hours) |
| 0xD | 21600 seconds (6 hours) |
| 0xE | 43200 seconds (12 hours) |
| 0xF | Interval data not recorded |

The interval sequence number byte (byte 18 in Table 11) is a one-byte counter that indicates how many intervals have been recorded by the meter. This byte allows a receiving device to compute the length of an interval in the absence of a message that explicitly identifies the length of an interval. Even for two consecutive transmissions, it is possible for the interval sequence number to increase by more than one. For example, a meter may record more than one interval between actual transmissions. Because the interval sequence can increment multiple times between successive transmissions, the interval sequence number can be used as a basic check. For example, if a meter only transmits after it has recorded two new intervals, the interval sequence number for that meter should always be an even number.

Additionally, it is possible that the interval sequence does not increment at all for a number of successive transmissions. This occurs, for example, if the interval length is 2.5 minutes, but the meter sends a transmission every 30 seconds. In such a case, the interval sequence number would increment on every fifth transmitted message.

The interval age bytes (bytes 19 and 20 in Table 11) indicate the age of the most recent interval value included in the message at the time the message was transmitted. The interval age allows the meter's consumption data to be synchronized to actual time. For example, AMR meters will often randomize the time between their radio transmissions to mitigate the possibility that two or more meters are transmitting at the same time. By randomizing transmission intervals slightly, two meters whose transmission times "walk together" and intersect will most likely diverge after only once transmitting at the same time.

Although the interval age can be greater than the amount of time between transmissions (for example, when interval length is larger than the amount of time between transmissions), interval age is always less than the length of an interval.

The checksum (bytes 41-44 in Table 11) is computed by applying a mathematical algorithm to bytes 5 through 40 of the message. In Model Protocol 2, because more robust error detection is a goal, a 32-bit checksum is chosen rather than a 16-bit checksum. Well-implemented 32-bit checksums can detect error patterns that 16-bit checksums may not.

Given the definition of Model Protocol 2, an example transmission from an electric meter using this protocol is depicted in Table 17:

TABLE 17

| Byte | Value | Description |
|---|---|---|
| 1 | 0xAA | Sync field 1 |
| 2 | 0x42 | Sync field 2 |
| 3 | 0xC6 | Sync field 3 |
| 4 | 0x55 | Sync field 4 |
| 5 | 0x02 | Meter ID most significant byte |
| 6 | 0x01 | Meter ID second most significant byte |
| 7 | 0x11 | Meter ID second least significant byte |
| 8 | 0x11 | Meter ID least significant byte |
| 9 | 0x11 | Instrument type and unit of measure |
| 10 | 0x45 | Meter status and interval duration |
| 11 | 0x00 | Summation most significant byte |
| 12 | 0x58 | Summation second most significant byte |
| 13 | 0x5E | Summation second least significant byte |
| 14 | 0x5C | Summation least significant byte |
| 15 | 0x00 | Demand most significant byte |
| 16 | 0x1A | Demand mid byte |
| 17 | 0x39 | Demand least significant byte |
| 18 | 0x15 | Interval sequence number |
| 19 | 0x00 | Interval age high byte |
| 20 | 0x09 | Interval age low byte |
| 21 | 0x00 | Interval 0 high byte |
| 22 | 0x1B | Interval 0 low byte |
| 23 | 0x00 | Interval 1 high byte |
| 24 | 0x1C | Interval 1 low byte |
| 25 | 0x00 | Interval 2 high byte |
| 26 | 0x1B | Interval 2 low byte |
| 27 | 0x00 | Interval 3 high byte |
| 28 | 0x1B | Interval 3 low byte |
| 29 | 0x00 | Interval 4 high byte |
| 30 | 0x08 | Interval 4 low byte |
| 31 | 0x00 | Interval 5 high byte |
| 32 | 0x05 | Interval 5 low byte |
| 33 | 0x00 | Interval 6 high byte |
| 34 | 0x04 | Interval 6 low byte |
| 35 | 0x00 | Interval 7 high byte |

TABLE 17-continued

| Byte | Value | Description |
|---|---|---|
| 36 | 0x06 | Interval 7 low byte |
| 37 | 0x00 | Interval 8 high byte |
| 38 | 0x06 | Interval 8 low byte |
| 39 | 0x00 | Interval 9 high byte |
| 40 | 0x04 | Interval 9 low byte |
| 41 | 0xnn | Checksum most significant byte |
| 42 | 0xnn | Checksum second most significant byte |
| 43 | 0xnn | Checksum second least significant byte |
| 44 | 0xnn | Checksum least significant byte |

In the example depicted in Table 17, the meter ID (bytes 5-8) is "0x02011111." The instrument type (byte 9, bits 0-3) is "0x1," which indicates that this is an electric meter (see Table 13). Unit of measure (byte 9, bits 4-7) is also "0x1," which indicates that summation and interval information are expressed in daWh and consumption is expressed in W (see Table 14).

The only meter status bit (byte 10, bits 4-7) that is set is the "power failure in the last 3 hours" bit, which indicates that the power grid to which this meter is connected suffered a corresponding outage. Alternatively, this bit can be set because the meter was brought online for the first time during the last 3 hours, or because electric power to the residence or business served by the meter had been shut off (e.g., to perform repairs, install new circuits, etc.) and was restored in the last 3 hours. The interval duration (byte 10, bits 0-3) is "0x5," which represents an interval duration value of 150 seconds (or 2.5 minutes) per interval.

The transmitted summation (bytes 11-14) is "0x00585E5C." Because this is an electric meter that measures power in daWh, this represents a reading of 5791324 daWh (or 57913.24 kWh) of energy delivered through the meter.

The transmitted demand (bytes 15-17) is "0x001A39." Because this is an electric meter that measures demand in W, this represents a reading of 6713 W of energy being consumed at the present time.

The transmitted interval sequence number (byte 18) is "0x15." Because the interval sequence number is an 8-bit value, the most recent interval for which data is included in the message is interval number 21 (or 277, 533, or 21 plus another multiple of 256). However, since the "power failure in the last 3 hours" bit in the meter status flags is set, as described herein, it can be determined that this interval is interval 21. Moreover, since the interval duration is known to be 2.5 minutes, as described herein, and the age of the most recent interval is known to be 9 seconds, as described herein, it can be determined that the power failure ended 52 minutes and 39 seconds (21×2.5 minutes+9 seconds) prior to the transmission of the message.

The transmitted interval age (bytes 19 and 20) is "0x0009," which indicates that the most recent measurement interval was completed 9 seconds prior to transmission of the message.

Interval 0 through Interval 9 (bytes 21-40) indicate the amount of energy consumed during ten (10) equal-length periods of time prior to the transmission of the message. Interval 0 is the most recent interval, while Interval 9 is the oldest interval. In this example, Intervals 0 through 9 indicate consumption of 27, 28, 27, 27, 8, 5, 4, 6, 6, and 4 daWh of electricity, respectively.

Given the definition of Model Protocol 2, an example transmission from a gas meter using this protocol is depicted in Table 18:

TABLE 18

| Byte | Value | Description |
|---|---|---|
| 1 | 0xAA | Sync field 1 |
| 2 | 0x42 | Sync field 2 |
| 3 | 0xC6 | Sync field 3 |
| 4 | 0x55 | Sync field 4 |
| 5 | 0x02 | Meter ID most significant byte |
| 6 | 0x01 | Meter ID second most significant byte |
| 7 | 0x22 | Meter ID second least significant byte |
| 8 | 0x22 | Meter ID least significant byte |
| 9 | 0x02 | Instrument type and unit of measure |
| 10 | 0x0F | Meter status and interval duration |
| 11 | 0x00 | Summation most significant byte |
| 12 | 0x00 | Summation second most significant byte |
| 13 | 0x50 | Summation second least significant byte |
| 14 | 0x53 | Summation least significant byte |
| 15 | 0xFF | Demand most significant byte |
| 16 | 0xFF | Demand mid byte |
| 17 | 0xFF | Demand least significant byte |
| 18 | 0x00 | Interval sequence number |
| 19 | 0x00 | Interval age high byte |
| 20 | 0x00 | Interval age low byte |
| 21 | 0xFF | Interval 0 high byte |
| 22 | 0xFF | Interval 0 low byte |
| 23 | 0xFF | Interval 1 high byte |
| 24 | 0xFF | Interval 1 low byte |
| 25 | 0xFF | Interval 2 high byte |
| 26 | 0xFF | Interval 2 low byte |
| 27 | 0xFF | Interval 3 high byte |
| 28 | 0xFF | Interval 3 low byte |
| 29 | 0xFF | Interval 4 high byte |
| 30 | 0xFF | Interval 4 low byte |
| 31 | 0xFF | Interval 5 high byte |
| 32 | 0xFF | Interval 5 low byte |
| 33 | 0xFF | Interval 6 high byte |
| 34 | 0xFF | Interval 6 low byte |
| 35 | 0xFF | Interval 7 high byte |
| 36 | 0xFF | Interval 7 low byte |
| 37 | 0xFF | Interval 8 high byte |
| 38 | 0xFF | Interval 8 low byte |
| 39 | 0xFF | Interval 9 high byte |
| 40 | 0xFF | Interval 9 low byte |
| 41 | 0xnn | Checksum most significant byte |
| 42 | 0xnn | Checksum second most significant byte |
| 43 | 0xnn | Checksum second least significant byte |
| 44 | 0xnn | Checksum least significant byte |

In the example depicted in Table 18, the meter ID (bytes 5-8) is "0x02012222." The instrument type (byte 9, bits 0-3) is "0x2," which indicates that this is a gas meter (see Table 13). The unit of measure (byte 9, bits 4-7) is "0x0," which indicates that summation data is expressed in cubic feet (see Table 14).

No meter status bits (byte 10, bits 4-7) are set, so the AMR module in the gas meter has not detected any faults to report. The interval duration value (byte 10, bits 0-3) is "0xF," which indicates that the meter is not tracking interval data.

The transmitted summation (bytes 11-14) is "0x00005053." Because this is a gas meter that measures summation in cubic feet, this reading represents a total of 20563 cubic feet of gas delivered through the meter.

The transmitted demand (bytes 15-17) is "0xFFFFFF." Because this is a gas meter that does not measure instantaneous demand, this field is populated with a special value that indicates "no valid demand data." The transmitted interval sequence number (byte 18) is "0x00." Because this meter module does not support interval data, the interval sequence number is never incremented. The transmitted interval age (bytes 19 and 20) is 0 seconds. Again, since the meter does not support interval data, the interval age is never clocked.

Interval 0 through Interval 9 indicate the amount of energy consumed during 10 equal-length periods of time prior to transmission of the message. Interval 0 is the most recent interval, while Interval 9 is the oldest interval. In this example, all interval values (bytes 21-40) are set to "0xFFFF," which indicates that no valid interval data has been recorded for any of the intervals.

c. Model Protocol 3

Model Protocol 3 is designed to achieve at least the following goals: (1) capability to deploy at least 20 million meters of any given type; (2) capability to transmit summation data, interval data, and meter configuration information; (3) for meters that only support summation (e.g., gas and water meters), shorter messages that only support summation are used, while longer messages are used for line-powered meters (e.g., electric meters) to transmit interval data as necessary; (4) highly robust message verification (e.g., due to long messages that include interval data); (5) protocol is intended to be used with a DSSS radio that requires periodic resynchronization of the pseudorandom number (PN) spreading sequence; and (6) capability to support a wide variety of units of measure for any given meter type.

Two of the design goals of Model Protocol 3 distinguish it from Model Protocols 1 and 2. First, in Model Protocol 3, different types of meters have the ability to send different types of messages, depending on the needs of the meter application. This goal lends itself to a protocol that is defined as a generic message format, and in which the length of the message and the type of data stored in the message are determined by analyzing data within the message itself. Second, Model Protocol 3 is intended to be used with a DSSS protocol in which the receiver periodically resynchronizes itself with the PN spreading sequence superimposed on the message.

The message format for Model Protocol 3 is defined in Table 19:

TABLE 19

| Raw byte | Actual byte | Description |
|---|---|---|
| −15 . . . 0 |   | PN synchronization (all 0xFF) |
| 1 | 1 | Sync field 1 |
| 2 | 2 | Sync field 2 |
| 3 | 3 | Sync field 3 |
| 4 | 4 | Sync field 4 |
| 5 | 5 | Message length (N + 10) |
| 6 | 6 | Message type |
| 7 |   | Clock recovery byte (always 0xFF) |
| 8 | 7 | Meter ID most significant byte |
| 9 | 8 | Meter ID second most significant byte |
| 10 | 9 | Meter ID second least significant byte |
| 11 | 10 | Meter ID least significant byte |
| 12 | 11 | Instrument type |
| 13 | 12 | Payload byte 1 |
| . | . | . |
| . | . | . |
| . | . | . |
| N + 11 + C | N + 11 | Payload byte N |
| N + 12 + C | N + 12 | Checksum most significant byte |
| N + 13 + C | N + 13 | Checksum second most significant byte |
| N + 14 + C | N + 14 | Checksum second least significant byte |
| N + 15 + C | N + 15 | Checksum least significant byte |

To meet design goal (5) above (use with a DSSS radio that requires periodic resynchronization), the message format depicted in Table 19 includes two features that are not present in Model Protocol 1 or 2. First, the message is preceded by a string of sixteen (16) PN synchronization bytes. These bytes each have a value of "0xFF." The PN synchronization bytes are intended to create a long, continuous broadcast of an essentially phase-modulated version of the PN code used by the transmitter. A receiving device uses the time period provided by the PN synchronization bytes to synchronize its own PN sequence with that of the transmitter.

Second, clock recovery bytes are inserted into the message depicted in Table 19. The byte after the message type byte is a clock recovery byte, as indicated by raw bytes 6 and 7. In addition, after the first clock recovery byte, a clock recovery byte is inserted after every seventh byte in the message. Clock recovery bytes have a value of "0xFF," and are not included in the computation of the checksum. In this way, the message format differentiates between "raw" byte number and "actual" byte numbers. "Raw" byte numbers refer to the message including the clock recovery bytes, while "actual" byte numbers refer to the message without clock recovery bytes. In Table 19, the "+C" term in the "Raw byte" column is used to represent the total number of clock recovery bytes inserted into the message.

In addition, any of the last five bytes of a message can be a clock recovery byte. For example, in a message of type "0x11," described herein, a clock recovery byte appears just prior to the checksum most significant byte. In such a case, payload byte N corresponds to raw byte N+11+C−1.

The PN synchronization bytes are a string of sixteen (16) "0xFF" bytes that provide a receiving device with an opportunity to synchronize its own PN sequence with that used by the transmitting device. Because the PN synchronization bytes are not considered part of the actual message, the "raw" byte numbers for the PN synchronization bytes are numbered −15 through 0.

The message length byte (byte 5 in Table 19) indicates the overall length of the message. Because messages can be of variable length, the receiving device uses this byte to determine how many bytes it can expect to receive for a given message, how many bytes to apply to the checksum, and so on. Alternatively, during reception, the receiving device can choose to receive the maximum number of bytes, without regard to the message length field. Once reception is complete, the receiving device then uses the message length field to decode the received data. The message length for a given message type is constant, as indicated by Table 20. The message lengths shown in Table 20 are lengths after clock recovery bytes have been removed.

The message type byte (byte 6 in Table 19) indicates the type of data conveyed by the message and the format of data within the message. This byte is formatted according to Table 20:

TABLE 20

| Message type | Length | Description |
|---|---|---|
| 0x01 | 19 | 24-bit summation, meter status |
| 0x02 | 20 | 32-bit summation, meter status |
| 0x11 | 38 | 24-bit summation, 16 8-bit intervals, meter status |
| 0x12 | 39 | 32-bit summation, 16 8-bit intervals, meter status |
| 0x13 | 43 | 32-bit summation, 10 16-bit intervals, meter status |
| 0x21 | 30 | Meter configuration |

The instrument type byte (actual byte 11 in Table 19) indicates the type of meter sending the message. This byte is formatted according to Table 21:

TABLE 21

| Instrument type | Description | Basic unitt of measure |
|---|---|---|
| 0x00..0x0F | Undefined | n/a |
| 0x10..0x1F | Electric meter | Watt-hours or watts |
| 0x20..0x2F | Gas meter | Cubic feet |
| 0x30..0x3F | Water meter | Gallons |
| 0x40..0xFF | Undefined | n/a |

The checksum for Model Protocol 3 (actual bytes N+12 through N+15 in Table 19) is computed by applying a mathematical algorithm to actual bytes 5 through N+11 (i.e., after removing any clock recovery bytes inserted in the message), where N is the number of payload bytes contained in the message.

Given the definition of Model Protocol 3, an example 24-bit summation and meter status message using this protocol is depicted in Table 22. This message type would typically be used by a gas or water meter.

TABLE 22

| Raw byte | Actual byte | Value | Description |
|---|---|---|---|
| −15 . . . 0 |  | 0xFF | PN synchronization |
| 1 | 1 | 0xAA | Sync field 1 |
| 2 | 2 | 0x42 | Sync field 2 |
| 3 | 3 | 0xC6 | Sync field 3 |
| 4 | 4 | 0x55 | Sync field 4 |
| 5 | 5 | 0x0E | Message length |
| 6 | 6 | 0x01 | Message type |
| 7 |  | 0xFF | Clock recovery byte |
| 8 | 7 | 0x03 | Meter ID most significant byte |
| 9 | 8 | 0x01 | Meter ID second most significant byte |
| 10 | 9 | 0x11 | Meter ID second least significant byte |
| 11 | 10 | 0x11 | Meter ID least significant byte |
| 12 | 11 | 0x37 | Instrument type |
| 13 | 12 | 0x12 | Summation most significant byte |
| 14 | 13 | 0xD6 | Summation mid byte |
| 15 |  | 0xFF | Clock recovery byte |
| 16 | 14 | 0x87 | Summation least significant byte |
| 17 | 15 | 0x00 | Meter status |
| 18 | 16 | 0xnn | Checksum most significant byte |
| 19 | 17 | 0xnn | Checksum second most significant byte |
| 20 | 18 | 0xnn | Checksum second least significant byte |
| 21 | 19 | 0xnn | Checksum least significant byte |

In the message depicted in Table 22, the message length (byte 5) is "0x0E," or 14 decimal. Accordingly, after removal of the clock recovery bytes, there are 14 bytes following the message length byte. The message type byte (byte 6) is "0x01," indicating that this message includes a 24-bit summation and meter status data (see Table 20). The meter ID (actual bytes 7-10) is "0x03011111." The instrument type (actual byte 11) is "0x37," which indicates that this is a water meter (see Table 21).

The transmitted summation (actual bytes 12-14) is "0x12D687." This indicates a summation of 1234567 counts of water delivered through the meter. The unit of measure is not specified in this message, but is instead embedded in another message sent by the meter. Accordingly, summation values cannot be interpreted until a message indicating the meter's unit of measure has been received.

The meter status (actual byte 15) is "0x00," and is encoded as depicted in Table 23:

TABLE 23

| Bit | Description |
|---|---|
| 0 | Meter has detected reverse flow |
| 1 | Battery low (battery-powered modules in gas and water meters) Power outage detected in the last 3 hours (electric meters) |
| 2 | Meter nonvolatile memory is corrupt |
| 3 . . . 7 | Physical tamper count |

Given the definition of Model Protocol 3, an example 32-bit summation and meter status message using this protocol is depicted in Table 24. This message type would typically be used by a gas or water meter.

TABLE 24

| Raw byte | Actual byte | Value | Description |
|---|---|---|---|
| −15 . . . 0 |  | 0xFF | PN synchronization |
| 1 | 1 | 0xAA | Sync field 1 |
| 2 | 2 | 0x42 | Sync field 2 |
| 3 | 3 | 0xC6 | Sync field 3 |
| 4 | 4 | 0x55 | Sync field 4 |
| 5 | 5 | 0x0F | Message length |
| 6 | 6 | 0x02 | Message type |
| 7 |  | 0xFF | Clock recovery byte |
| 8 | 7 | 0x03 | Meter ID most significant byte |
| 9 | 8 | 0x01 | Meter ID second most significant byte |
| 10 | 9 | 0x22 | Meter ID second least significant byte |
| 11 | 10 | 0x22 | Meter ID least significant byte |
| 12 | 11 | 0x20 | Instrument type |
| 13 | 12 | 0x12 | Summation most significant byte |
| 14 | 13 | 0xD6 | Summation second most significant byte |
| 15 |  | 0xFF | Clock recovery byte |
| 16 | 14 | 0x87 | Summation second least significant byte |
| 17 | 15 | 0x87 | Summation least significant byte |
| 18 | 16 | 0x1A | Meter status |
| 19 | 17 | 0xnn | Checksum most significant byte |
| 20 | 18 | 0xnn | Checksum second most significant byte |
| 21 | 19 | 0xnn | Checksum second least significant byte |
| 22 | 20 | 0xnn | Checksum least significant byte |

In the message depicted in Table 24, the message length (byte 5) is "0x0F," or 15 decimal. Accordingly, after removal of clock recovery bytes, there are 15 bytes following the message length byte. The message type byte (byte 6) is "0x02," indicating that this message carries a 32-bit summation and meter status data (see Table 20). The meter ID (actual bytes 7-10) is "0x03012222." The instrument type (actual byte 11) is "0x20," which indicates that this is a gas meter (see Table 21).

The transmitted summation (actual bytes 12-15) is "0x0008AA52." This indicates a summation of 567890 counts of gas delivered through the meter. The unit of measure is not specified in this message, but is instead embedded in another message sent by the meter. Accordingly, summation values cannot be interpreted until a message indicating the meter's unit of measure is received.

The meter status (actual byte 16) is "0x1A," which indicates that the module's battery is low, and that the module has detected three instances of apparent physical tampering attempts with the meter (see Table 23).

Given the definition of Model Protocol 3, an example 24-bit summation, sixteen 8-bit intervals, and meter status message using this protocol is depicted in Table 25. This message type would typically be used by an electric meter.

TABLE 25

| Raw byte | Actual byte | Value | Description |
|---|---|---|---|
| −15 . . . 0 |  | 0xFF | PN synchronization |
| 1 | 1 | 0xAA | Sync field 1 |
| 2 | 2 | 0x42 | Sync field 2 |
| 3 | 3 | 0xC6 | Sync field 3 |
| 4 | 4 | 0x55 | Sync field 4 |
| 5 | 5 | 0x21 | Message length |
| 6 | 6 | 0x11 | Message type |
| 7 |  | 0xFF | Clock recovery byte |
| 8 | 7 | 0x03 | Meter ID most significant byte |
| 9 | 8 | 0x01 | Meter ID second most significant byte |
| 10 | 9 | 0x33 | Meter ID second least significant byte |
| 11 | 10 | 0x33 | Meter ID least significant byte |
| 12 | 11 | 0x10 | Instrument type |
| 13 | 12 | 0x38 | Summation high byte |
| 14 | 13 | 0x52 | Summation mid byte |

TABLE 25-continued

| Raw byte | Actual byte | Value | Description |
|---|---|---|---|
| 15 | | 0xFF | Clock recovery byte |
| 16 | 14 | 0xCF | Summation low byte |
| 17 | 15 | 0x00 | Meter status |
| 18 | 16 | 0x05 | Interval 0 value |
| 19 | 17 | 0x0C | Interval 1 value |
| 20 | 18 | 0x0B | Interval 2 value |
| 21 | 19 | 0x0C | Interval 3 value |
| 22 | 20 | 0x08 | Interval 4 value |
| 23 | | 0xFF | Clock recovery byte |
| 24 | 21 | 0x05 | Interval 5 value |
| 25 | 22 | 0x04 | Interval 6 value |
| 26 | 23 | 0x04 | Interval 7 value |
| 27 | 24 | 0x05 | Interval 8 value |
| 28 | 25 | 0x05 | Interval 9 value |
| 29 | 26 | 0x05 | Interval 10 value |
| 30 | 27 | 0x03 | Interval 11 value |
| 31 | | 0xFF | Clock recovery byte |
| 32 | 28 | 0x04 | Interval 12 value |
| 33 | 29 | 0x04 | Interval 13 value |
| 34 | 30 | 0x07 | Interval 14 value |
| 35 | 31 | 0x0A | Interval 15 value |
| 36 | 32 | 0x37 | Interval sequence number |
| 37 | 33 | 0x00 | Interval age high byte |
| 38 | 34 | 0x27 | Interval age low byte |
| 39 | | 0xFF | Clock recovery byte |
| 40 | 35 | 0xnn | Checksum most significant byte |
| 41 | 36 | 0xnn | Checksum second most significant byte |
| 42 | 37 | 0xnn | Checksum second least significant byte |
| 43 | 38 | 0xnn | Checksum least significant byte |

In the message depicted in Table 25, the message length (byte 5) is "0x21," or 33 decimal. Accordingly, after removal of the clock recovery bytes, there are 33 bytes following the message length byte. The message type byte (byte 6) is "0x11," indicating that this message carries a 24-bit summation, sixteen 8-bit intervals, and meter status data (see Table 20). The meter ID (actual bytes 7-10) is "0x03013333." The instrument type (actual byte 11) is "0x10," which indicates that this is an electric meter (see Table 21).

The transmitted summation (actual bytes 12-14) is "0x3852CF." This indicates a summation of 3691215 counts of energy delivered through the meter. The unit of measure is not specified in this message, but is instead embedded in another message sent by the meter. Accordingly, summation values cannot be interpreted until a message indicating the meter's unit of measure is received.

The meter status (actual byte 15) is "0x00," which indicates that the meter has not detected any problems for reporting (see Table 23).

Interval 0 through Interval 15 (actual bytes 16-31) indicate the amount of energy consumed during sixteen (16) equal-length periods of time prior to transmission of the message. Interval 0 is the most recent interval, while Interval 15 is the oldest interval. In this example, delivery of 5, 12, 11, 12, 8, 5, 4, 4, 5, 5, 5, 3, 4, 4, 7, and 10 counts are indicated for Intervals 0 through 15, respectively. As with the summation information, the unit of measure for the interval data is not specified in this message, but is instead embedded in another message sent by the meter.

The interval sequence number (actual byte 32) is "0x37." Because the interval sequence number is an 8-bit value, this indicates that the most recent interval for which data is included in the message is interval number 55 (or 310, 567, or 55 plus another multiple of 256).

The transmitted interval age (actual bytes 33 and 34) is "0x0027," indicating that the most recent measurement interval was completed 39 seconds prior to transmission of the message. This unusually long interval age indicates, for example, that the meter is transmitting more than one message during each interval. That is, intervals are long enough that more than one message is transmitted before the interval expires.

Given the definition of Model Protocol 3, an example 32-bit summation, sixteen 8-bit intervals, and meter status message using this protocol is depicted in Table 26. This message type would typically be used by an electric meter.

TABLE 26

| Raw byte | Actual byte | Value | Description |
|---|---|---|---|
| −15 ... 0 | | 0xFF | PN synchronization |
| 1 | 1 | 0xAA | Sync field 1 |
| 2 | 2 | 0x42 | Sync field 2 |
| 3 | 3 | 0xC6 | Sync field 3 |
| 4 | 4 | 0x55 | Sync field 4 |
| 5 | 5 | 0x22 | Message length |
| 6 | 6 | 0x12 | Message type |
| 7 | | 0xFF | Clock recovery byte |
| 8 | 7 | 0x03 | Meter ID most significant byte |
| 9 | 8 | 0x01 | Meter ID second most significant byte |
| 10 | 9 | 0x44 | Meter ID second least significant byte |
| 11 | 10 | 0x44 | Meter ID least significant byte |
| 12 | 11 | 0x10 | Instrument type |
| 13 | 12 | 0x00 | Summation most significant byte |
| 14 | 13 | 0x6D | Summation second most significant byte |
| 15 | | 0xFF | Clock recovery byte |
| 16 | 14 | 0x48 | Summation second least significant byte |
| 17 | 15 | 0x71 | Summation least significant byte |
| 18 | 16 | 0x01 | Meter status |
| 19 | 17 | 0x05 | Interval 0 value |
| 20 | 18 | 0x04 | Interval 1 value |
| 21 | 19 | 0x05 | Interval 2 value |
| 22 | 20 | 0x04 | Interval 3 value |
| 23 | | 0xFF | Clock recovery byte |
| 24 | 21 | 0x05 | Interval 4 value |
| 25 | 22 | 0x05 | Interval 5 value |
| 26 | 23 | 0x04 | Interval 6 value |
| 27 | 24 | 0x04 | Interval 7 value |
| 28 | 25 | 0x05 | Interval 8 value |
| 29 | 26 | 0x05 | Interval 9 value |
| 30 | 27 | 0x04 | interval 10 value |
| 31 | | 0xFF | Clock recovery byte |
| 32 | 28 | 0x06 | Interval 11 value |
| 33 | 29 | 0x11 | Interval 12 value |
| 34 | 30 | 0x11 | Interval 13 value |
| 35 | 31 | 0x07 | Interval 14 value |
| 36 | 32 | 0x04 | Interval 15 value |
| 37 | 33 | 0xFE | Interval sequence number |
| 38 | 34 | 0x00 | Interval age high byte |
| 39 | | 0xFF | Clock recovery byte |
| 40 | 35 | 0x03 | Interval age low byte |
| 41 | 36 | 0xnn | Checksum most significant byte |
| 42 | 37 | 0xnn | Checksum second most significant byte |
| 43 | 38 | 0xnn | Checksum second least significant byte |
| 44 | 39 | 0xnn | Checksum least significant byte |

In the message depicted in Table 26, the message length (byte 5) is "0x22," or 34 decimal. Accordingly, after removal of the clock recovery bytes, there are 34 bytes following the message length byte. The message type byte (byte 6) is "0x12," indicating that this message includes a 32-bit summation, sixteen 8-bit intervals, and meter status data (see Table 20). The meter ID (actual bytes 7-10) is "0x03014444." The instrument type (actual byte 11) is "0x10," which indicates that this is an electric meter (see Table 21).

The transmitted summation (actual bytes 12-15) is "0x006D4871." This indicates a summation of 7161969 counts of energy delivered through the meter. The unit of measure is not specified in this message, but is instead embedded in another message sent by the meter. Accordingly, summation values cannot be interpreted until a message indicating the meter's unit of measure is received.

The meter status (byte 16) is "0x01," which indicates that the meter has detected flow of power in the reverse direction, for example, because the consumer has solar panels and returns excess power to the grid (see Table 23).

Interval 0 through Interval 15 (actual bytes 17-32) indicate the amount of energy consumed during sixteen (16) equal-length periods of time prior to the transmission of the message. Interval 0 is the most recent interval, while Interval 15 is the oldest interval. In this example, delivery of 5, 4, 5, 4, 5, 5, 4, 4, 5, 5, 4, 6, 17, 17, 7, and 4 counts are indicated for Intervals 0 through 15, respectively. As with summation information, the unit of measure for the interval information is not specified in this message, but is instead embedded in another message sent by the meter.

The interval sequence number (actual byte 33) is "0xFE." Because the interval sequence number is an 8-bit value, this indicates that the most recent interval for which data is included in the message is interval number 254 (or 510, 766, or 254 plus another multiple of 256).

The transmitted interval age (actual bytes 34 and 35) is "0x0003," indicating that the most recent measurement interval was completed three seconds prior to transmission of the message.

Given the definition of Model Protocol 3, an example 32-bit summation, ten 16-bit intervals, and meter status message using this protocol is depicted in Table 27. This message type would typically be used by an electric meter.

TABLE 27

| Raw byte | Actual byte | Value | Description |
| --- | --- | --- | --- |
| −15 . . . 0 | | 0xFF | PN synchronization |
| 1 | 1 | 0xAA | Sync field 1 |
| 2 | 2 | 0x42 | Sync field 2 |
| 3 | 3 | 0xC6 | Sync field 3 |
| 4 | 4 | 0x55 | Sync field 4 |
| 5 | 5 | 0x26 | Message length |
| 6 | 6 | 0x13 | Message type |
| 7 | | 0xFF | Clock recovery byte |
| 8 | 7 | 0x03 | Meter ID most significant byte |
| 9 | 8 | 0x01 | Meter ID second most significant byte |
| 10 | 9 | 0x55 | Meter ID second least significant byte |
| 11 | 10 | 0x55 | Meter ID least significant byte |
| 12 | 11 | 0x10 | Instrument type |
| 13 | 12 | 0x00 | Summation most significant byte |
| 14 | 13 | 0x6D | Summation second most significant byte |
| 15 | | 0xFF | Clock recovery byte |
| 16 | 14 | 0x48 | Summation second least significant byte |
| 17 | 15 | 0x71 | Summation least significant byte |
| 18 | 16 | 0x01 | Meter status |
| 19 | 17 | 0x01 | Interval 0 value high byte |
| 20 | 18 | 0x04 | Interval 0 value low byte |
| 21 | 19 | 0x01 | Interval 1 value high byte |
| 22 | 20 | 0x08 | Interval 1 value low byte |
| 23 | | 0xFF | Clock recovery byte |
| 24 | 21 | 0x01 | Interval 2 value high byte |
| 25 | 22 | 0x05 | Interval 2 value low byte |
| 26 | 23 | 0x01 | Interval 3 value high byte |
| 27 | 24 | 0x04 | Interval 3 value low byte |
| 28 | 25 | 0x01 | Interval 4 value high byte |
| 29 | 26 | 0x05 | Interval 4 value low byte |
| 30 | 27 | 0x03 | Interval 5 value high byte |
| 31 | | 0xFF | Clock recovery byte |
| 32 | 28 | 0x86 | Interval 5 value low byte |
| 33 | 29 | 0x03 | Interval 6 value high byte |
| 34 | 30 | 0xA1 | Interval 6 value low byte |
| 35 | 31 | 0x03 | Interval 7 value high byte |
| 36 | 32 | 0x94 | Interval 7 value low byte |
| 37 | 33 | 0x01 | Interval 8 value high byte |
| 38 | 34 | 0x00 | Interval 8 value low byte |
| 39 | | 0xFF | Clock recovery byte |
| 40 | 35 | 0x00 | Interval 9 value high byte |
| 41 | 36 | 0xFE | Interval 9 value low byte |
| 42 | 37 | 0x42 | Interval sequence number |
| 43 | 38 | 0x00 | Interval age high byte |
| 44 | 39 | 0x10 | Interval age low byte |
| 45 | 40 | 0xnn | Checksum most significant byte |
| 46 | 41 | 0xnn | Checksum second most significant byte |
| 47 | | 0xFF | Clock recovery byte |
| 48 | 42 | 0xnn | Checksum second least significant byte |
| 49 | 43 | 0xnn | Checksum least significant byte |

In the example message depicted in Table 27, the message length (byte 5) is "0x26," or 38 decimal. Accordingly, after removing the clock recovery bytes, there are 38 bytes following the message length byte. The message type (byte 6) is "0x13," which indicates that the message includes a 32-bit summation, ten 16-bit intervals, and meter status data (see Table 20). The meter ID (actual bytes 7-10) is "0x03015555." The instrument type (actual byte 11) is "0x10," which indicates that this is an electric meter (see Table 21).

The transmitted summation information (actual bytes 12-15 in Table 27) is "0x006D4871." This indicates a summation of 7161969 counts of energy delivered through the meter. The unit of measure is not specified in this message, but is instead embedded in another message sent by the meter. Accordingly, the summation values cannot be interpreted until a message indicating the meter's unit of measure is received.

The meter status (actual byte 16 in Table 27) is "0x01," and is encoded according to Table 23. This indicates that the meter has detected a flow of power in the reverse direction.

Interval 0 through Interval 9 (actual bytes 17-36) indicate the amount of energy consumed during ten (10) equal-length periods of time prior to transmission of the message. Interval 0 is the most recent interval, while Interval 9 is the oldest interval. In this example, delivery of 260, 264, 261, 260, 261, 902, 929, 916, and 254 counts are indicated for Intervals 0 through 9, respectively. As with summation information, the unit of measure for the interval information is not specified in this message, but is instead embedded in another message sent by the meter. The larger values for the interval information suggest that the unit of measure for interval consumption is finer than that of the unit of measure for summation.

The transmitted interval sequence number (actual byte 37) is "0x42." Because the interval sequence number is an 8-bit value, this indicates that the most recent interval for which data is included in the message is interval number 66 (or 322, 578, or 66 plus another multiple of 256).

The transmitted interval age (actual bytes 38 and 39) is "0x0010," indicating that the most recent measurement interval was completed 16 seconds prior to transmission of the message.

Given the definition of Model Protocol 3, an example meter configuration message using this protocol is depicted in Table 28. This message type allows a receiving device to understand how the meter encodes transmitted data in other message types, the length of each interval (for messages that include interval data), and so on. The meter can transmit a meter configuration message periodically, such as once an hour. Alternatively or additionally, there may be a mechanism that causes the meter to transmit the message on demand, such as by applying a magnet to the outer case of the meter dial to trip a magnetic field sensor or reed switch.

TABLE 28

| Raw byte | Actual byte | Value | Description |
|---|---|---|---|
| −15 . . . 0 | | 0xFF | PN synchronization |
| 1 | 1 | 0xAA | Sync field 1 |
| 2 | 2 | 0x42 | Sync field 2 |
| 3 | 3 | 0xC6 | Sync field 3 |
| 4 | 4 | 0x55 | Sync field 4 |
| 5 | 5 | 0x19 | Message length |
| 6 | 6 | 0x21 | Message type |
| 7 | | 0xFF | Clock recovery byte |
| 8 | 7 | 0x03 | Meter ID most significant byte |
| 9 | 8 | 0x01 | Meter ID second most significant byte |
| 10 | 9 | 0x66 | Meter ID second least significant byte |
| 11 | 10 | 0x66 | Meter ID least significant byte |
| 12 | 11 | 0x10 | Instrument type |
| 13 | 12 | 0xF0 | Summation unit of measure high nibble + exponent |
| 14 | 13 | 0x48 | Summation unit of measure low byte |
| 15 | | 0xFF | Clock recovery byte |
| 16 | 14 | 0xF0 | Interval unit of measure high nibble + exponent |
| 17 | 15 | 0x48 | Interval unit of measure low byte |
| 18 | 16 | 0x00 | Interval length in seconds high byte |
| 19 | 17 | 0x96 | Interval length in seconds low byte |
| 20 | 18 | 0x00 | Message transmit interval in seconds high byte |
| 21 | 19 | 0x1E | Message transmit interval in seconds low byte |
| 22 | 20 | 0x03 | Meter firmware version number major |
| 23 | | 0xFF | Clock recovery byte |
| 24 | 21 | 0x01 | Meter firmware version number minor |
| 25 | 22 | 0x01 | Meter firmware build number high byte |
| 26 | 23 | 0xFD | Meter firmware build number low byte |
| 27 | 24 | 0x40 | Meter hardware type |
| 28 | 25 | 0x02 | Meter hardware version number major |
| 29 | 26 | 0x0A | Meter hardware version number minor |
| 30 | 27 | 0xnn | Checksum most significant byte |
| 31 | | 0xFF | Clock recovery byte |
| 32 | 28 | 0xnn | Checksum second most significant byte |
| 33 | 29 | 0xnn | Checksum second least significant byte |
| 34 | 30 | 0xnn | Checksum least significant byte |

In the message depicted in Table 28, the message length (byte 5) is "0x19," or 25 decimal. Accordingly, after removal of the clock recovery bytes, there are 25 bytes following the message length byte. The message type byte (byte 6) is "0x21," indicating that this message carries meter configuration information (see Table 20). The meter ID (actual bytes 7-10) is "0x03016666." The instrument type (actual byte 11) is "0x10," which indicates that this is an electric meter (see Table 21).

The summation unit of measure (actual bytes 12 and 13) defines how many units of product are represented by each count of summation transmitted by the meter according to other message types (e.g., 0x01, 0x02, 0x11, 0x12, and 0x13 as indicated in Table 20). This value is encoded as an unsigned 12-bit constant (K) whose value ranges from 0 to 999 and a signed 3-bit exponent (X) as indicated in Table 29:

TABLE 29

| Exponent (X) | Constant (K) bits 8 . . . 12 | Constant (K) bits 4 . . . 7 | Constant (K) bits 0 . . . 3 |
|---|---|---|---|
| Bits 4 . . . 7 | Bits 0 . . . 3 | Bits 4 . . . 7 | Bits 0 . . . 3 |
| High nibble + exponent | | Low byte | |

The 12-bit constant (K) has a theoretical range of 0 to 4095 (0x000 . . . 0xFFF), but uses values from 0 to 999 (0x000 . . . 0x3E7). The final value of the unit of measure is computed by multiplying K by 10 raised to the power of X (unit of measure=$(K \times 10^X)$ Wh)). The actual units being measured depends on the instrument type (see Table 21). Examples of an encoded unit of measure are depicted in Table 30:

TABLE 30

| Unit of measure (per count) | Constant | Exponent | UOM value |
|---|---|---|---|
| 1 kWh (1000 Wh) | 1 | 3 | 0x3001 |
| 1 kWh (1000 Wh) (alternate) | 100 | 1 | 0x1064 |
| 1 daWh (10 Wh) | 1 | 1 | 0x1001 |
| 1 daWh (10 Wh) (alternate) | 10 | 0 | 0x000A |
| 7.2 Wh | 72 | −1 | 0xF048 |
| 1 Wh | 1 | 0 | 0x0001 |
| 0.625 Wh (625 mWh) | 625 | −3 | 0xD271 |
| 0.25 Wh (250 mWh) | 25 | −2 | 0xE019 |
| 0.1 Wh (100 mWh) | 1 | −1 | 0xF001 |

In the example message depicted in Table 28, the summation unit of measure (actual bytes 12 and 13) is "0xF048," which indicates that each unit of a summation value transmitted by the meter represents 7.2 Wh of energy delivered (see Table 30).

The interval unit of measure (actual bytes 14 and 15 in Table 28) is a 2-byte value that indicates how many units of product are represented by each count of interval data transmitted by the meter according to other message types (e.g., 0x11, 0x12, and 0x13 as indicated in Table 20). The interval unit of measure is encoded according to Table 29. The interval unit of measure need not be the same as the unit of measure for summation values; accordingly, interval data can be viewed according to a higher resolution than overall summation. In the example message depicted in Table 28, the interval unit of measure (actual bytes 14 and 15) is "0xF048," which indicates that each unit of an interval value transmitted by the meter represents 7.2 Wh of energy delivered (see Table 30).

The interval length in seconds (actual bytes 16 and 17 in Table 28) indicates the length of one interval in a message of type 0x11, 0x12, or 0x13. In the example message depicted in Table 28, the interval length (actual bytes 16 and 17) is "0x0096," which indicates that each interval is 150 seconds (or 2.5 minutes) in length.

The message transmit interval in seconds (actual bytes 18 and 19 in Table 28) is a 2-byte value that indicates the nominal delay between successive transmissions from the meter. In the example message depicted in Table 28, the message transmit interval is "0x001E," which indicates that the transmit interval is 30 seconds. The meter can also impose a degree of randomization to its transmit intervals to mitigate the effects of possible transmission overlap from meters that are in close physical proximity to one another, as described herein.

The meter firmware version number (actual bytes 20-23 in Table 28) is a 4-byte field that indicates the version of firmware run by the meter. In combination with the meter hardware information, described herein, this data allows the receiving device to determine whether the meter has issues that merit field service (e.g., to upgrade or replace meters with known problems). In addition, the receiving device may determine whether the meter's data may be affected by known bugs in the firmware version, which may be adjusted for at the receiving end. In the example message depicted in Table 28, the major firmware version number (actual byte 20) is "0x03," the minor firmware version number (actual byte 21) is "0x01," and the firmware build number (actual bytes 22 and 23) is "0x01 FD," which indicates that the firmware version is 3.01, build 509.

The meter hardware type (actual byte 24 in Table 28) indicates the model of the meter. In combination with the meter hardware version number, described herein, this allows the receiving device to identify deployed meters that may be in need of an upgrade or replacement due to known hardware problems. In the example message depicted in Table 28, the meter hardware type is "0x40."

The meter hardware version number (actual bytes 25 and 26 in Table 28) indicates the version of hardware used to manufacture the meter. In combination with the meter hardware type, described herein, this allows the receiving device to identify deployed meters that may be in need of replacement due to known hardware problems. In the example message depicted in Table 28, the major meter hardware version (actual byte 25) is "0x02," and the minor meter hardware version (actual byte 26) is "0x0A." Accordingly, the meter hardware version is 2.10.

Following an initial deployment of meters using Model Protocol 3, a meter manufacturer can define new requirements for implementation. For example, due to pressure from electric utilities, the manufacturer may have a need for meters that can also transmit instantaneous demand. Given this new design goal, two new message types are defined according to Table 31:

TABLE 31

| Message type | Length | Description |
| --- | --- | --- |
| 0x14 | 47 | 32-bit summation, 10 16-bit intervals, consumption, meter status |
| 0x22 | 32 | Advanced meter configuration |

Because the general message format has not changed, the new messages are properly received (although perhaps not understood) by older receiving devices.

Given the revised Model Protocol 3, an example 32-bit summation, ten 16-bit intervals, consumption, and meter status message is depicted in Table 32:

TABLE 32

| Raw byte | Actual byte | Value | Description |
| --- | --- | --- | --- |
| −15 . . . 0 | | 0xFF | PN synchronization |
| 1 | 1 | 0xAA | Sync field 1 |
| 2 | 2 | 0x42 | Sync field 2 |
| 3 | 3 | 0xC6 | Sync field 3 |
| 4 | 4 | 0x55 | Sync field 4 |
| 5 | 5 | 0x2A | Message length |
| 6 | 6 | 0x14 | Message type |
| 7 | | 0xFF | Clock recovery byte |
| 8 | 7 | 0x03 | Meter ID most significant byte |
| 9 | 8 | 0x02 | Meter ID second most significant byte |
| 10 | 9 | 0x77 | Meter ID second least significant byte |
| 11 | 10 | 0x77 | Meter ID least significant byte |
| 12 | 11 | 0x10 | Instrument type |
| 13 | 12 | 0x00 | Summation most significant byte |
| 14 | 13 | 0x13 | Summation second most significant byte |
| 15 | | 0xFF | Clock recovery byte |
| 16 | 14 | 0x8F | Summation second least significant byte |
| 17 | 15 | 0xC2 | Summation least significant byte |
| 18 | 16 | 0x01 | Meter status |
| 19 | 17 | 0x02 | Interval 0 value high byte |
| 20 | 18 | 0x0A | Interval 0 value low byte |
| 21 | 19 | 0x01 | Interval 1 value high byte |
| 22 | 20 | 0x86 | Interval 1 value low byte |
| 23 | | 0xFF | Clock recovery byte |
| 24 | 21 | 0x01 | Interval 2 value high byte |
| 25 | 22 | 0x05 | Interval 2 value low byte |
| 26 | 23 | 0x00 | Interval 3 value high byte |
| 27 | 24 | 0xE3 | Interval 3 value low byte |
| 28 | 25 | 0x00 | Interval 4 value high byte |
| 29 | 26 | 0xD1 | Interval 4 value low byte |
| 30 | 27 | 0x00 | Interval 5 value high byte |
| 31 | | 0xFF | Clock recovery byte |
| 32 | 28 | 0xCA | Interval 5 value low byte |
| 33 | 29 | 0x00 | Interval 6 value high byte |
| 34 | 30 | 0xCF | Interval 6 value low byte |
| 35 | 31 | 0x00 | Interval 7 value high byte |
| 36 | 32 | 0xC9 | Interval 7 value low byte |
| 37 | 33 | 0x00 | Interval 8 value high byte |
| 38 | 34 | 0xD0 | Interval 8 value low byte |
| 39 | | 0xFF | Clock recovery byte |
| 40 | 35 | 0x00 | Interval 9 value high byte |
| 41 | 36 | 0xCB | Interval 9 value low byte |
| 42 | 37 | 0x2A | Interval sequence number |
| 43 | 38 | 0x00 | Interval age high byte |
| 44 | 39 | 0x5F | Interval age low byte |
| 45 | 40 | 0x00 | Consumption most significant byte |
| 46 | 41 | 0x00 | Consumption second most significant byte |
| 47 | | 0xFF | Clock recovery byte |
| 48 | 42 | 0x03 | Consumption second least significant byte |
| 49 | 43 | 0x31 | Consumption least significant byte |
| 50 | 44 | 0xnn | Checksum most significant byte |
| 51 | 45 | 0xnn | Checksum second most significant byte |
| 52 | 46 | 0xnn | Checksum second least significant byte |
| 53 | 47 | 0xnn | Checksum least significant byte |

In the example message depicted in Table 32, the message length (byte 5) is "0x2A," or 42 decimal. Accordingly, after removal of the clock recovery bytes, there are 42 bytes following the message length byte. The message type byte (byte 6) is "0x14," which indicates that this message carries a 32-bit summation, ten 16-bit intervals, meter status data, and a 32-bit demand value (see Table 31). The meter ID (actual bytes 7-10) is "0x03027777." The instrument type (actual byte 11) is "0x10," which indicates that this is an electric meter (see Table 21).

The transmitted summation information (actual bytes 12-15) is "0x00138FC2." This indicates a summation of 1281986 counts of energy delivered through the meter. The unit of measure is not specified in this message, but is instead embedded in another message sent by the meter. Accordingly, summation values cannot be interpreted until a message indicating the meter's unit of measure is received.

The meter status (actual byte 16) is "0x01," which indicates that the meter has detected a reverse power flow (see Table 23).

Interval 0 through Interval 9 (actual bytes 17-36) indicate the amount of energy consumed during ten (10) equal-length periods of time prior to the transmission of the message. Interval 0 is the most recent interval, while Interval 9 is the oldest interval. In the example depicted in Table 28, delivery of 522, 390, 261, 227, 209, 202, 207, 201, 208, and 203 counts are indicated for Intervals 0 through 9, respectively. As with summation information, the unit of measure for the interval information is not specified in the message, but is instead embedded in another message sent by the meter. The larger values for these numbers suggest that the unit of measure for interval consumption is finer than the unit of measure for summation.

The transmitted interval sequence number (actual byte 37) is "0x2A." Because the interval sequence number is an 8-bit value, this indicates that the most recent interval for which data is included in the message is interval number 42 (or 298, 554, or 42 plus another multiple of 256).

The transmitted interval age (actual bytes 38 and 39) is "0x005F," indicating that the most recent measurement interval was completed 95 seconds prior to transmission of the message.

The transmitted consumption (actual bytes 40-43) is "0x00000331." This indicates a consumption of 817 counts of energy being consumed at the present time. As with summation information, the unit of measure for this value is not specified in the message, but is instead embedded in another message sent by the meter. Accordingly, consumption values cannot be interpreted until a message indicating the meter's unit of measure has been received.

Given the revised Model Protocol 3, an example advanced meter configuration message is depicted in Table 33. This message allows a receiving device to understand how the meter encodes data transmitted in other messages, the length of each interval (for messages that include interval data), and so on. The meter may transmit an advanced meter configuration message periodically, such as once an hour. Alternatively or additionally, the meter may include a mechanism for forcing the meter to transmit the message on demand, for example, by applying a magnet to the outer case of the meter dial to trip a magnetic field sensor or reed switch.

TABLE 33

| Raw byte | Actual byte | Value | Description |
|---|---|---|---|
| −15 . . . 0 |  | 0xFF | PN synchronization |
| 1 | 1 | 0xAA | Sync field 1 |
| 2 | 2 | 0x42 | Sync field 2 |
| 3 | 3 | 0xC6 | Sync field 3 |
| 4 | 4 | 0x55 | Sync field 4 |
| 5 | 5 | 0x1B | Message length |
| 6 | 6 | 0x22 | Message type |
| 7 |  | 0xFF | Clock recovery byte |
| 8 | 7 | 0x03 | Meter ID most significant byte |
| 9 | 8 | 0x02 | Meter ID second most significant byte |
| 10 | 9 | 0x88 | Meter ID second least significant byte |
| 11 | 10 | 0x88 | Meter ID least significant byte |
| 12 | 11 | 0x10 | Instrument type |
| 13 | 12 | 0x10 | Summation unit of measure high nibble + exponent |
| 14 | 13 | 0x01 | Summation unit of measure low byte |
| 15 |  | 0xFF | Clock recovery byte |
| 16 | 14 | 0xF0 | Interval unit of measure high nibble + exponent |
| 17 | 15 | 0x01 | Interval unit of measure low byte |
| 18 | 16 | 0x00 | Consumption unit of measure high nibble + exponent |
| 19 | 17 | 0x01 | Consumption unit of measure low byte |
| 20 | 18 | 0x01 | Interval length in seconds high byte |
| 21 | 19 | 0x2C | Interval length in seconds low byte |
| 22 | 20 | 0x00 | Message transmit interval in seconds high byte |
| 23 |  | 0xFF | Clock recovery byte |
| 24 | 21 | 0x0F | Message transmit interval in seconds low byte |
| 25 | 22 | 0x04 | Meter firmware version number major |
| 26 | 23 | 0x02 | Meter firmware version number minor |
| 27 | 24 | 0x01 | Meter firmware build number high byte |
| 28 | 25 | 0x94 | Meter firmware build number low byte |
| 29 | 26 | 0x51 | Meter hardware type |
| 30 | 27 | 0x01 | Meter hardware version number major |
| 31 |  | 0xFF | Clock recovery byte |
| 32 | 28 | 0x03 | Meter hardware version number minor |
| 33 | 29 | 0xnn | Checksum most significant byte |
| 34 | 30 | 0xnn | Checksum second most significant byte |
| 35 | 31 | 0xnn | Checksum second least significant byte |
| 36 | 32 | 0xnn | Checksum least significant byte |

In the example message depicted in Table 33, the message length (byte 5) is "0x1B," or 27 decimal. Accordingly, after removing the clock recovery bytes, there are 27 bytes following the message length byte. The message type byte (byte 6) is "0x22," indicating that the message includes meter configuration data (see Table 31). The meter ID (actual bytes 7-10) is "0x03028888." The instrument type (actual byte 11) is "0x10," which indicates that this is an electric meter (see Table 21).

The summation unit of measure (actual bytes 12 and 13) is a 2-byte value that indicates how many units of product are represented by each count of summation in other message types. This value is encoded according to Table 29. In the example message depicted in Table 33, the summation unit of measure is "0x1001," which indicates that each unit of a summation value transmitted by the meter represents 10 Wh (1 daWh) of energy delivered (see Table 30)

The interval unit of measure (actual bytes 14 and 15) indicates how many units of product are represented by each count of interval data transmitted by other message types. The interval unit of measure is encoded according to Table 29. In the example message depicted in Table 33, the interval unit of measure is "0xF01," which indicates that each unit of an interval value transmitted by the meter represents 0.1 Wh (100 mWh) of energy delivered (see Table 30).

The consumption unit of measure (actual bytes 16 and 17) indicates how many units of product are being consumed at the present time and measured by the meter. The value is encoded according to Table 29, with the exception that the value is expressed as a multiple of a number of watts (W) rather than watt-hours (Wh). In the example message depicted in Table 33, the consumption unit of measure is "0x0001," which indicates that each unit of a consumption value transmitted by the meter represents 1 watt of energy being consumed (see Table 30).

The interval length in seconds (actual bytes 18 and 19) indicates the length of one interval in a message of type "0x11," "0x12," "0x13," or "0x14." In the example depicted in Table 33, the interval length is "0x012C," which indicates that each interval is 300 seconds (or 5 minutes) in length.

The message transmit interval in seconds (actual bytes 20 and 21) indicates the nominal delay between successive transmissions from the meter. In the example message depicted in Table 33, the message transmit interval is "0x000F," which indicates that the transmit interval is 15 seconds. In addition, the meter can impose a degree of randomization to its transmit intervals, as described herein.

The meter firmware version number (actual bytes 22-25) indicate the version of firmware run by the meter. In combination with the meter hardware information embedded in the message, described herein, this data allows the receiving device to determine whether the meter has issues that merit field service (e.g., to upgrade or replace meters with known problems). In addition, the receiving device may determine whether the meter's data is affected by known bugs in the firmware version that can be accommodated at the receiving end. In the example message depicted in Table 33, the major firmware version number is "0x04," the minor firmware version number is "0x02," and the firmware build number is "0x0194." Accordingly, the firmware version is 4.02, build 404.

The meter hardware type (actual byte 26) indicates the model of the meter. In combination with the meter hardware version number, described herein, this allows the receiving device to identify deployed meters that may be in need of an upgrade or replacement due to known hardware problems. In the example message depicted in Table 33, the meter hardware type is "0x51."

The meter hardware version number (actual bytes 27 and 28) indicate the version of hardware used to manufacture the meter. In combination with the meter hardware type, described herein, this allows the receiving device to identify deployed meters that may be in need of replacement due to known hardware problems. In the example message depicted in Table 33, the major meter hardware version is "0x01," and the minor meter hardware version is "0x03," which indicates that the meter hardware version is 1.03.

3. AMR Meter to ZigBee Communications Bridge

FIGS. 2a-l are block diagrams of various embodiments of a device 200 for providing a communications bridge in accordance with the present disclosure. The device 200 facilitates communication between an AMR meter 205 and a ZigBee home area network (HAN) 240.

The AMR meter 205 produces radio frequency (RF) transmissions that convey data related to meter readings, meter status, and other meter information. The AMR meter 205 transmits data on a frequency f between 902 and 928 MHz. Transmissions from the AMR meter 205 are received by an AMR receiver 210 that is similarly tunable between 902 and 928 MHz. To receive these transmissions, the AMR receiver 210 tunes to a frequency sufficiently close to f, such that data transmitted at frequency f will be received by the AMR receiver 210.

The communications bridge device 200 is capable of decoding signals modulated using AM or FM. Because different AMR protocols use different modulation schemes for data transmission, the device 200 configures itself to receive data using the modulation scheme expected to be used by the AMR meter 205.

Figure 3:
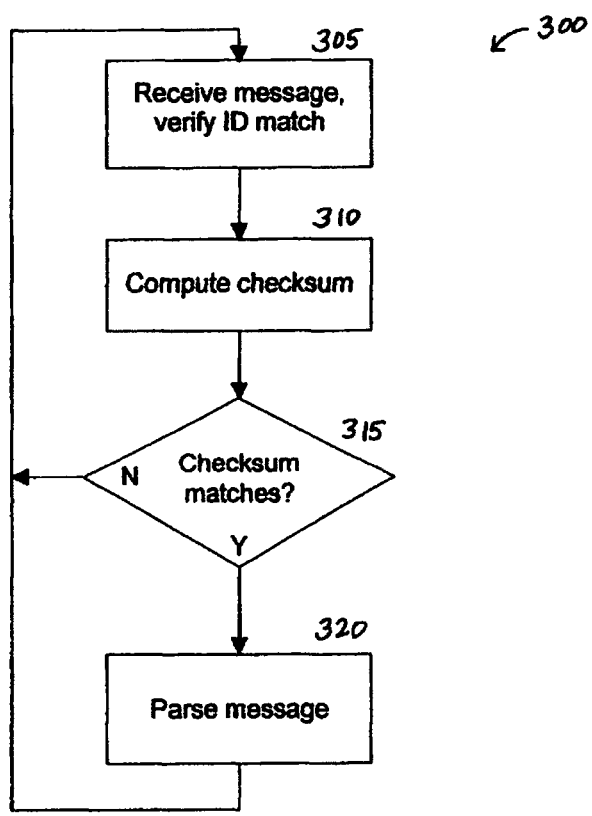
FIG. 3 is a flow diagram of a process for receiving and decoding a message.

Methods of receiving radio frequency data are well known in the art. Accordingly, these methods will not be described in detail herein. However, FIG. 3 is a flow diagram of a suitable, high-level process 300 by which a receiving device receives and decodes a message. At block 305, the receiving device receives a message from a meter, and verifies that the meter ID in the received message corresponds to the meter ID of the AMR meter with which the receiving device is intended to operate. At block 310, the receiving device computes the checksum for the received message. The particular algorithm used to compute the checksum varies based on the AMR protocol used to encode the message. At decision block 315, the receiving device determines whether the computed checksum matches the checksum included in the message. If so, the process proceeds to block 320, where the receiving device parses the message. The particular process for parsing the message varies based on the AMR protocol used to encode the message. Model parsing processes are described in additional detail herein. On the other hand, if the computed checksum does not match the checksum included in the message, the receiving device does not parse the message, but returns to block 305 to receive the next message from the meter.

If an AMR meter 205 uses a frequency-hopping spread-spectrum (FHSS) transmission scheme and the sequence of frequencies to be used by the AMR meter 205 is known, in some embodiments the device 200 seeks to minimize data acquisition time using the following process: (1) Select a number of frequencies on which the AMR meter 205 is known to transmit. (2) Obtain an average RF signal level on each of the selected frequencies. If the average RF signal level on each frequency is not consistent, repeat step 2 up to two more times. (3) Rapidly and continuously scan all of the selected frequencies for an average signal level, until a candidate signal level is obtained significantly in excess of the average level for that frequency as obtained in step 2. (4) If the candidate signal is found on frequency "X," tune the receiver to the frequency that the AMR meter 205 is expected to use in its next transmission (i.e., after transmitting on frequency "X"). (5) Wait a length of time in excess of what is known to be the longest interval transmissions from the AMR meter 205. If a valid message is obtained from the AMR meter 205 during this time, its position in the hopping sequence has been identified, and normal operation begins. (6) If no valid message is received during the time period in step 5, return to step 3. Optionally, if an excessive number of candidate signals were obtained but not followed by receipt of a valid message, return to step 2 to recalibrate baseline signal levels.

Alternatively, if an AMR meter 205 uses an FHSS transmission scheme, but the sequence of frequencies is random, pseudorandom, or unknown, in some embodiments the device 200 seeks to maximize the chances of receiving a message from the AMR meter 205 by identifying frequencies on which a message is more likely to be received. The device 200 identifies such frequencies according to the following process: (1) If the AMR meter 205 uses a list of frequencies, L, that are spaced such that the difference in Hz for two adjacent frequencies is less than the effective bandwidth of the AMR receiver 210, the device 200 makes a new list of frequencies, L', to tune. For N frequencies starting at frequency F from the list L, wherein the frequencies are equally spaced X Hz apart, begin at frequency F+(X/2). Compute a list of N/2 frequencies that are equally spaced 2X Hz apart. Accordingly, any message transmitted on either of the frequencies from list L adjacent to a given frequency from list L' is receivable by the device. Alternatively, if there are gaps in the frequency list L, an alternate list of frequencies L' can still be computed and situated halfway between pairs of adjacent frequencies in list L. (2) Assuming a list of N frequencies, numbered 1 through N, on which messages are expected to be received, tune to frequency 1. (3) Wait some length of time to receive a message. (4) If a valid message is received, add the frequency on which the message was received to a list of "known good" frequencies. If fewer than a threshold number of frequencies have been listed as "known good," tune to the next unknown frequency and return to step 3. Otherwise, tune to the next "known good" frequency and return to step 3. (5) If a valid message was not received during the time period in step 3, and there is at least one frequency that has been listed as "known good," tune to the next "known good" frequency and return to step 3. Otherwise, tune to the next frequency on the list and return to step 3.

For example, this process for identifying random, pseudorandom, or unknown frequencies may be applied to a device 200 that includes an AMR receiver 210 having an effective bandwidth of 150 kHz; and an AMR meter 205 that uses a list of 64 frequencies, L, spaced 200 kHz apart, starting at 905 MHz (i.e., 905 MHz, 905.2 MHz, 905.4 MHz, and so on, up to 917.6 MHz). Assume the threshold number of "known good" frequencies is 8, and the amount of time to wait for a message is 30 seconds.

Following this process, (1) A new list of 32 frequencies is computed, L', spaced 400 kHz apart, starting at 905.1 MHz. The list of frequencies to which the device 200 will tune include 905.1 MHz, 905.5 MHz, 905.9 MHz, and so on, up to 917.5 MHz. (2) Tune to 905.1 MHz. (3) Wait up to 30 seconds for a message. (4) If a valid message was received, mark 905.1 MHz as a "known good" frequency, tune to 905.5 MHz, and return to step 3. (5) If no frequencies are listed as "known good," tune to 905.5 MHz and return to step 3. Otherwise, tune to a "known good" frequency and return to step 3.

Assume that valid messages are received on frequencies at the following entries in the frequency list L', in the following order: 1, 2, 10, 11, 20, 22, 30, and 6. In such an example, the order of frequencies to which the receiver 210 is tuned are, in order: 1, 2, 3, 1, 4, 2, 5, 1, 6, 2, 7, 1, 8, 2, 9, 1, 10, 11, 12, 2, 13, 10, 14, 11, 15, 1, 16, 2, 17, 10, 18, 11, 19, 1, 20, 21, 2, 22, 23, 10, 24, 11, 25, 20, 26, 22, 27, 1, 28, 2, 29, 10, 30, 31, 11, 32, 20, 3, 22, 4, 30, 5, 1, 6, 2, 10, 11, 20, 22, 30, 6, 1, 2, 10, 11, 20, 22, 30, 6, and so on.

Returning to FIGS. 2*a-l*, the communications bridge device 200 includes a "master" microcontroller 225, whose functions include, but are not limited to: transposing data received from the AMR meter 205 into corresponding ZigBee SE profile fields; optionally handling firmware updates for itself, a ZigBee radio 230, the AMR slave microcontroller 215, and, if necessary, the AMR receiver 210; interpreting and responding to requests for the translated AMR data from the HAN 240, as though it were a ZigBee SE-compliant Advanced Metering Infrastructure (AMI) metering device; optionally storing interval data in a nonvolatile memory 235; responding to ZigBee network diagnostic requests; receiving from the HAN 240 configuration information relating to the AMR meter 205 with which the device 200 is intended to operate; providing the received configuration information to the AMR slave microcontroller 215 as necessary; and optionally computing data relating to energy consumption, including interval data and average demand, where such data is not explicitly provided by the AMR meter 205.

The communications bridge device 200 includes a ZigBee radio 230, which allows communication between the device 200 and the HAN 240. The device 200 can operate as a network coordinator or a ZigBee router.

The communications bridge device 200 also includes an AMR "slave" microcontroller 215, whose functions include, but are not limited to: decoding, validating, and parsing incoming messages from the AMR meter 205; configuring the AMR receiver 210 such that it can receive radio signals from the AMR meter 205; optionally having the ability to update its own firmware under control of the master microcontroller 225; providing parsed data received from the AMR meter 205 to the master microcontroller 225 in a format known to the master microcontroller 225; optionally producing a "wake-up" tone, if so required by the AMR meter 205 with which the device 200 is intended to operate; acquiring a signal from the AMR meter 205 and, if possible, matching the channel hopping sequence used by the AMR meter 205 if it is known; optionally intelligently compiling a list of "good" channels on which messages transmitted by the AMR meter 205 are likely to be received; and optionally configuring the clock generator 220 for the AMR receiver 210, to enable the AMR receiver 210 to receive and successfully decode messages from the AMR meter 205.

As described herein, the communications bridge device includes an AMR receiver 210 that is capable of being tuned to any frequency upon which AMR meter 205 is known to have the ability to transmit messages. In addition, the AMR receiver 210 is capable of being configured to correctly receive messages using the modulation and encoding scheme used by the AMR meter 205 to transmit its messages. In some embodiments, the AMR receiver 210 is application-specific, and is thus only able to receive signals from a particular type of AMR meter 205.

In some embodiments, the AMR meter 205 may require a "wake-up" tone in order to trigger the meter 205 to transmit its telemetry. In such cases, the AMR receiver 210 includes capability for producing such a wake-up tone. In some embodiments, in an effort to preserve battery life of the AMR meter 205, the device 200 does not produce a wake-up tone to trigger the AMR meter 205 unless a predefined period of time has elapsed since the last time the device 200 received a valid message from the AMR meter 205. An AMR meter 205 may transmit its telemetry to the device 200 with which it is intended to operate, without having received a wake-up tone from that particular device 200. That is, a separate device 200 transmitting a wake-up tone may cause a plurality of AMR meters 205 within a given area to transmit their telemetry, wherein each of the AMR meters 205 transmits its telemetry to the particular device 200 with which it is intended to operate.

In some embodiments, the communications bridge device 200 includes a nonvolatile memory 235, which stores any or all of the following: encrypted firmware images for the slave microcontroller 215, the master microcontroller 225, the ZigBee radio 230, and, if necessary, the AMR receiver 210; historic records of data received from the AMR meter 205; configuration information relating to the AMR meter 205; configuration information relating to the HAN 240; and other data not described herein. Information stored in the nonvolatile memory 235 is retrievable by the master microcontroller 225 as necessary.

In some embodiments, the communications bridge device includes a variable clock generator 220, which allows a reference clock signal for the AMR receiver 210 to be changed under firmware control. Accordingly, a single hardware design can function with multiple implementations of AMR meters 205.

In some embodiments, the communications bridge device 200 includes capability for indicating its current operating status. Status can be indicated using light emitting diodes (LEDs), a liquid crystal display (LCD), audio alerts, or another form of indicator. Possible status indications include, but are not limited to: ZigBee HAN down; ZigBee HAN formed; joined to ZigBee HAN; waiting for communication from AMR meter; communication with AMR meter established; communication with AMR meter functioning normally; communication with AMR meter marginal; no communication with AMR meter.

In some embodiments, the nonvolatile memory 235 stores interval data, such as according to market, customer, and other requirements. The nonvolatile memory 235 can store actual or perceived interval data. If the AMR meter 205 provides actual interval data that is decoded by the slave microcontroller 215, the communications bridge device 200 stores a historical record of this data in the nonvolatile memory 235. If the AMR meter 205 does not provide actual interval data, the device 200 computes perceived interval data on a periodic basis and stores this as historical data in the nonvolatile memory 235. In both cases, the interval data is retrievable by other devices in the HAN 240. In some embodiments, the interval data is stored in a circular buffer with a fixed size, so that when the buffer becomes full, the oldest stored entries are discarded in favor of new data. When the stored data is perceived interval data rather than actual interval data, the retrieving device in the HAN 240 is informed that the accuracy of the data is limited, for example, by how frequently messages are received by the AMR meter 205 and the resolution of the data transmitted by the AMR meter 205.

For an AMR meter 205 that is configurable to transmit a plurality of data types using a plurality of meter IDs, such as described in reference to Model Protocol 1, the slave microcontroller 215 is capable of being configured such that it understands the type of data associated with each meter ID used by the AMR meter 205.

In general, the communications bridge device 200 operates in the following manner: (1) the master microcontroller 225 forms or joins a ZigBee HAN 240; (2) if the master microcontroller 225 has already received from the HAN 250 configuration information relating to the AMR meter 205, the master microcontroller 225 configures the slave microcontroller 215 accordingly; otherwise, the master microcontroller 225 awaits the necessary configuration from the HAN 240, stores the received configuration in the nonvolatile memory 235, and configures the slave microcontroller 215 accordingly; (3) the slave microcontroller 215 configures the AMR receiver 210 as necessary to receive messages from the AMR meter 205, and configures the optional clock generator 220 if necessary; (4) the slave microcontroller 215 receives, validates, and parses radio signals from the AMR meter 205; (5) the slave microcontroller 215 passes the parsed data to the master microcontroller 225 upon request from the master microcontroller 225; (6) the master microcontroller 225 optionally stores the parsed data, and/or data derived from computations performed on the parsed data, in nonvolatile memory 235; (7) the master microcontroller 225 makes the parsed data, data computed based on the parsed data, and other status information available to other devices on the HAN 240 upon request; (8) the master microcontroller 225 optionally receives firmware updates from the HAN 240 and stores that firmware in encrypted form in nonvolatile memory 235; (9) upon instruction from the HAN 240, the master microcontroller 225 updates its own firmware and, if necessary, that of the slave microcontroller 215, the ZigBee radio 230, and/or the AMR receiver 210.

ZigBee transmission data and payload are received by the HAN 240 for further communications, processing, display, and other functions, as described in detail herein. In some embodiments, the communications bridge device 200 is integrated in a device with additional functions, such as an in-home display, a ZigBee-to-Ethernet or a ZigBee-to-WiFi gateway, a programmable thermostat, a load control device, or another device.

Figure 2A:
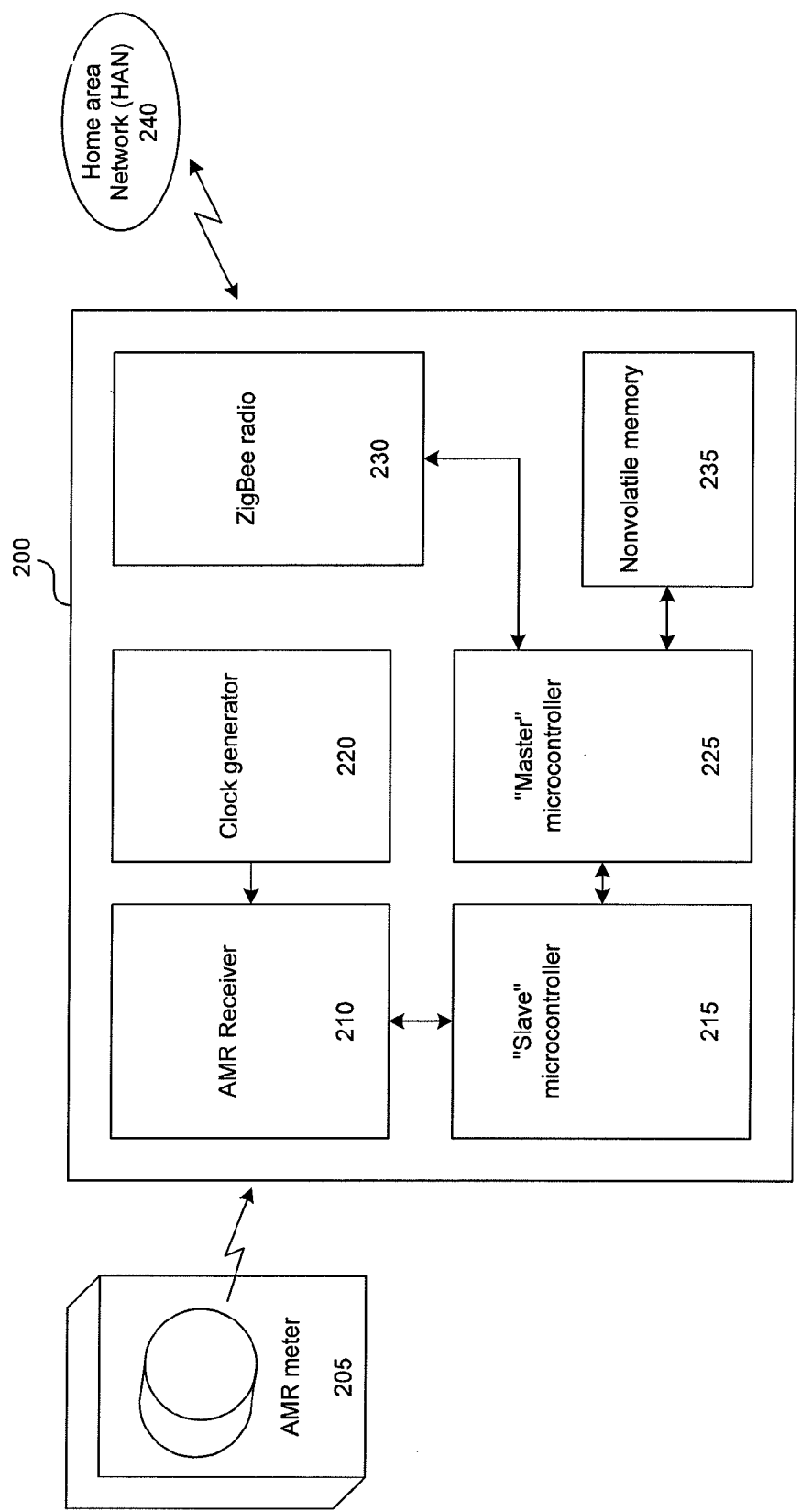
FIGS. 2a-l are block diagrams of a device for providing an AMR meter to ZigBee communications bridge.
Figure 2B:
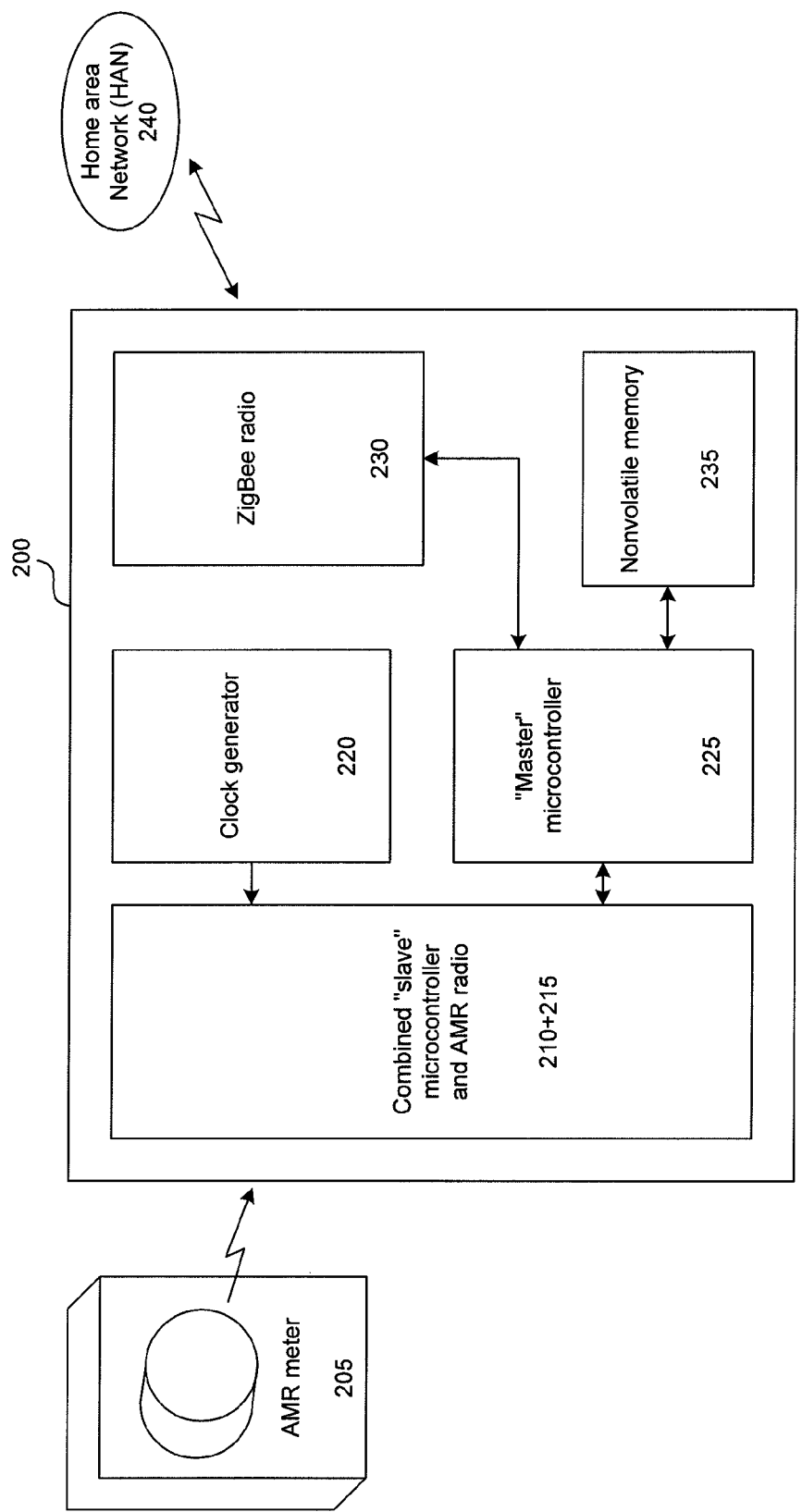
Figure 2C:
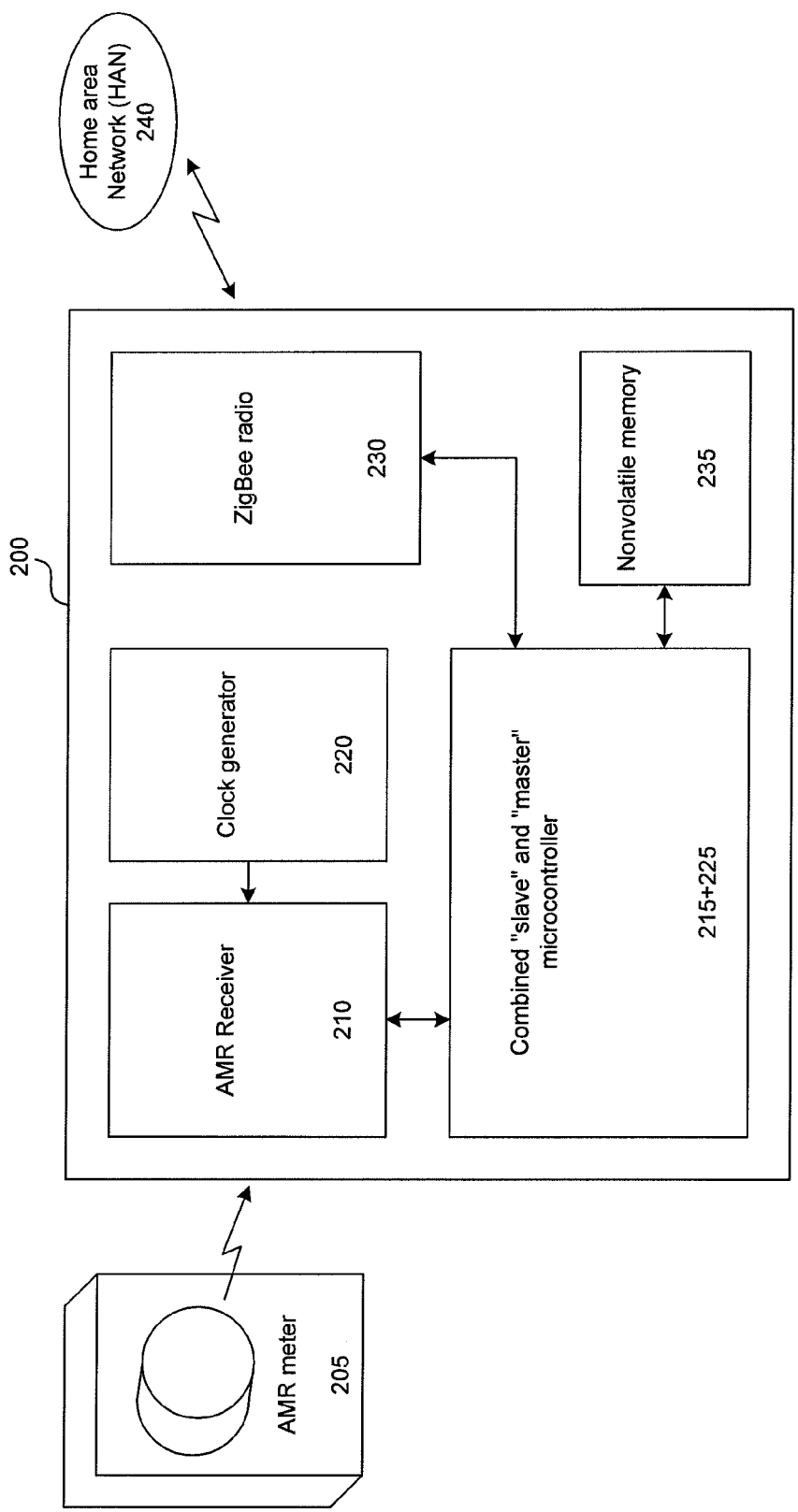
Figure 2D:
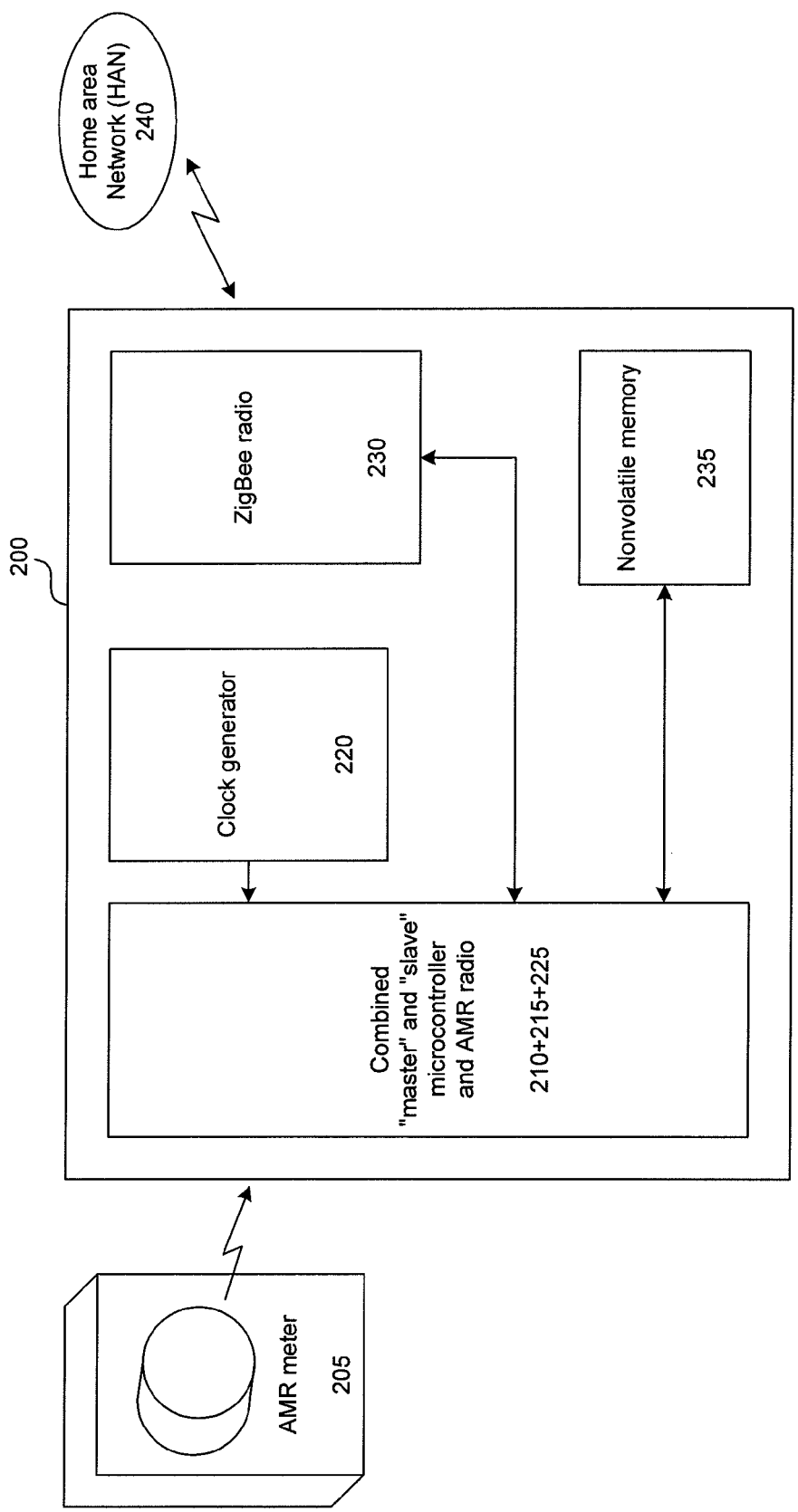
Figure 2E:
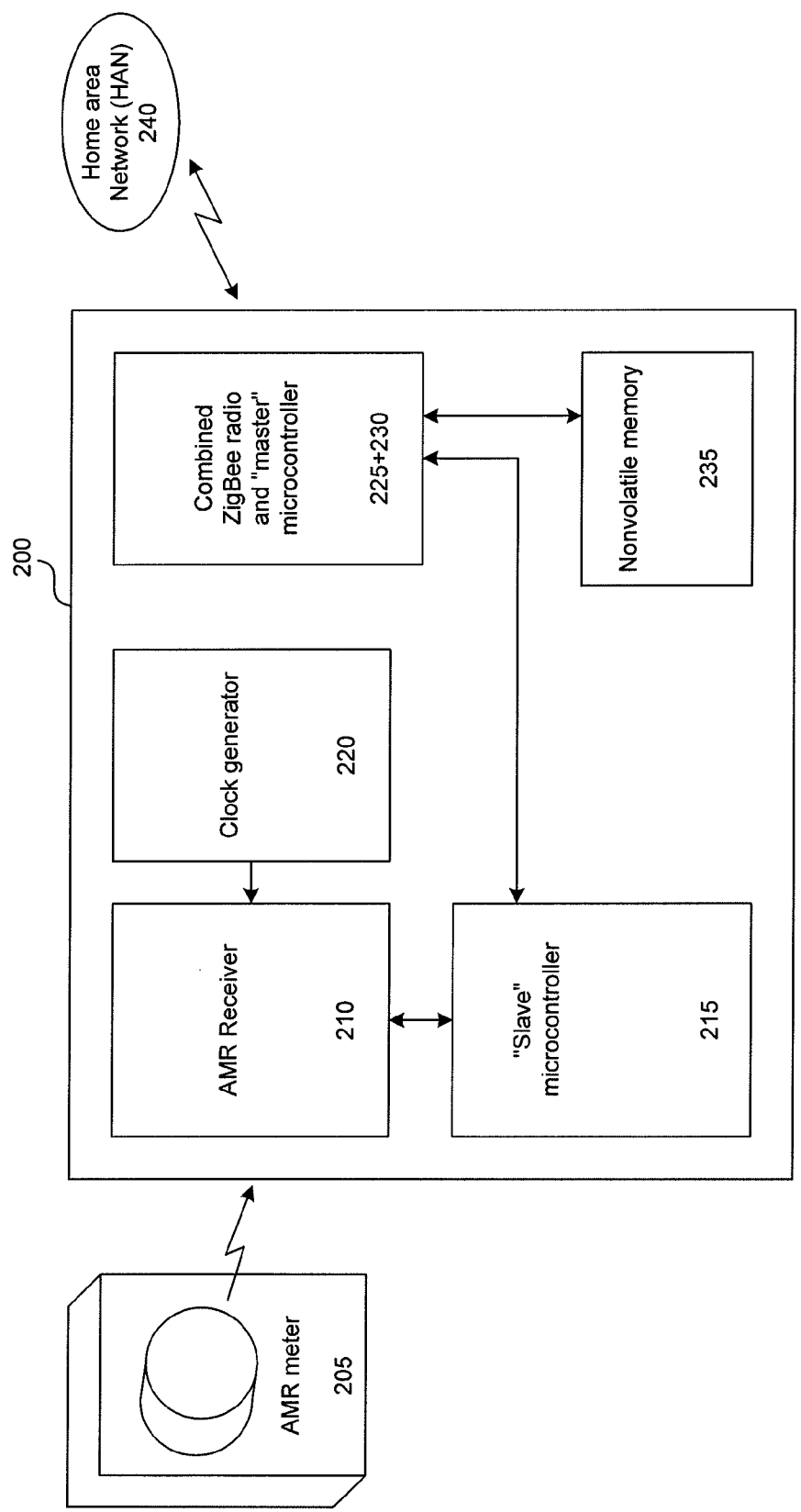
Figure 2F:
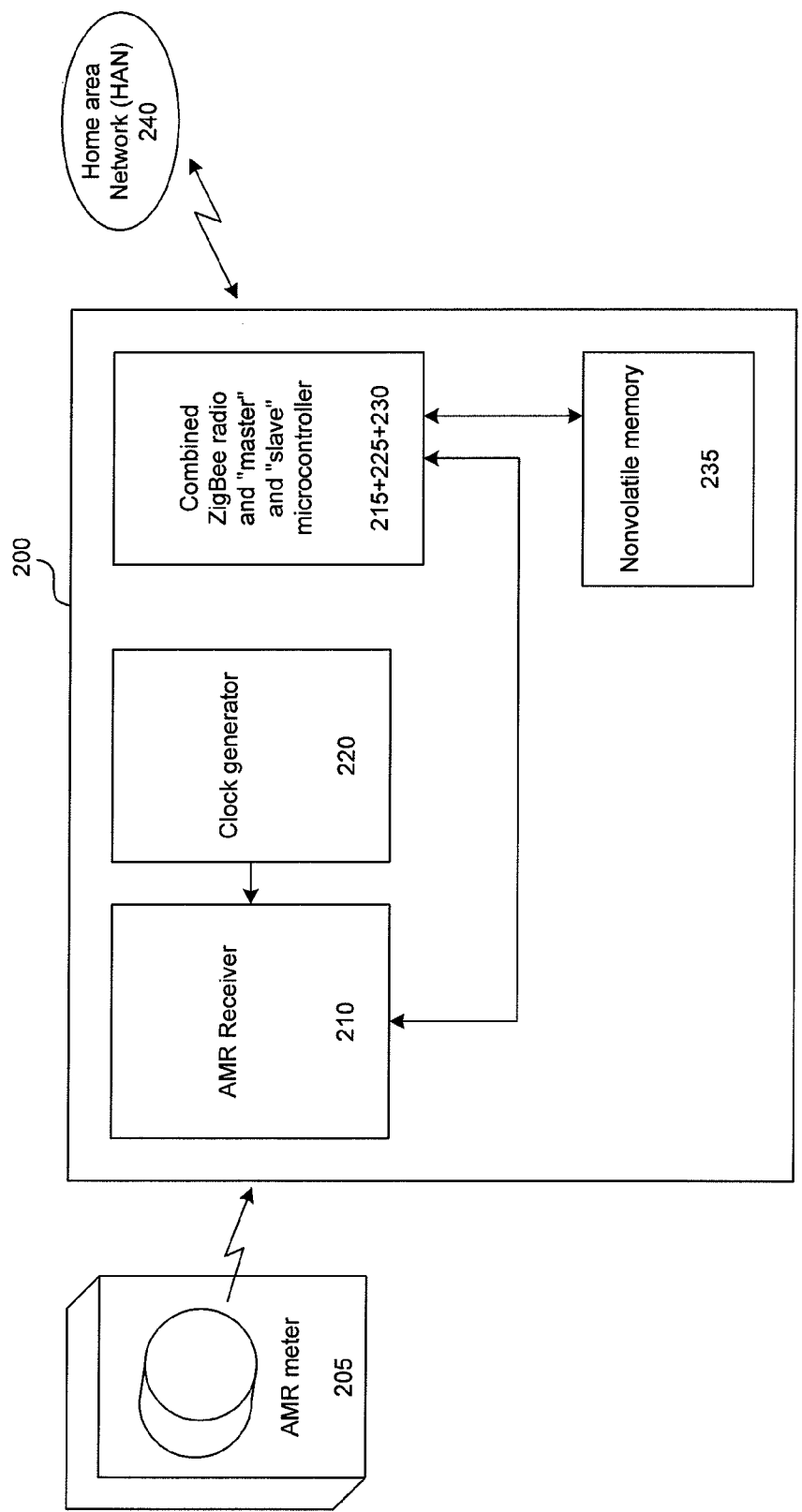

FIGS. 2b-l are block diagrams of various embodiments of a communications bridge device 200 in which different components, including the AMR receiver 210, slave microcontroller 215, master microcontroller 225, and/or ZigBee radio 230, are combined into a single integrated circuit or module. FIG. 2b depicts a device 200 in which the slave microcontroller 215 and the AMR receiver 210 are combined into a single integrated circuit or module. FIG. 2c depicts a device 200 in which the functions of the slave microcontroller 215 are performed by the master microcontroller 225, effectively combining these microcontrollers 215 and 225 into a single integrated circuit or module. FIG. 2d depicts a device 200 in which the functions of a combined slave microcontroller 215 and AMR receiver 210 are performed by the master microcontroller 225, effectively combining these three components 210, 215, and 225 into a single integrated circuit or module. FIG. 2e depicts a device 200 in which the master microcontroller 225 and the ZigBee radio 230 are implemented as a single "system on chip" integrated circuit or module. FIG. 2f depicts a device 200 in which the functions of the slave microcontroller 215 are performed by the combined master microcontroller 225 and ZigBee radio 230.

Figure 2G:
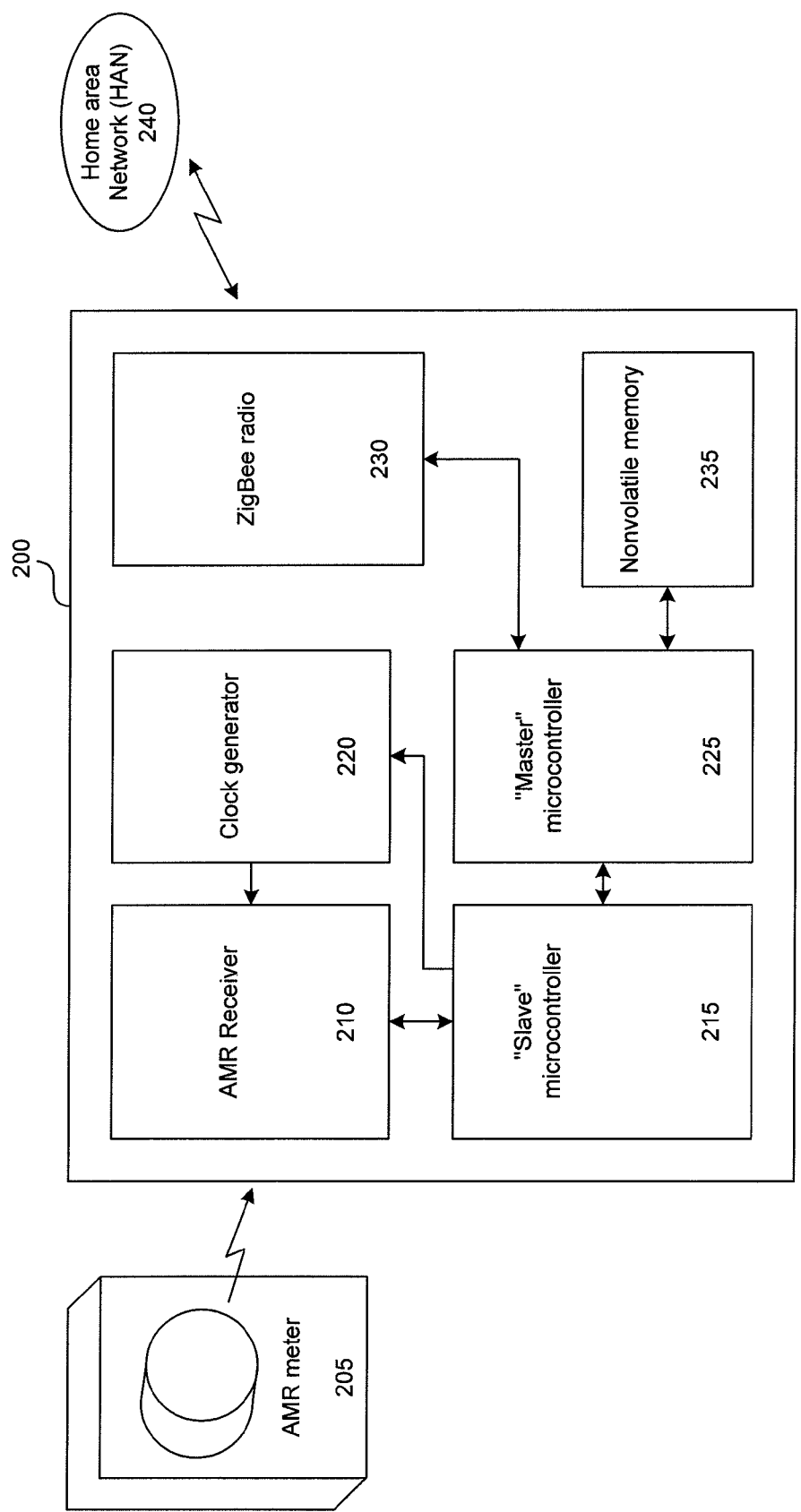
Figure 2H:
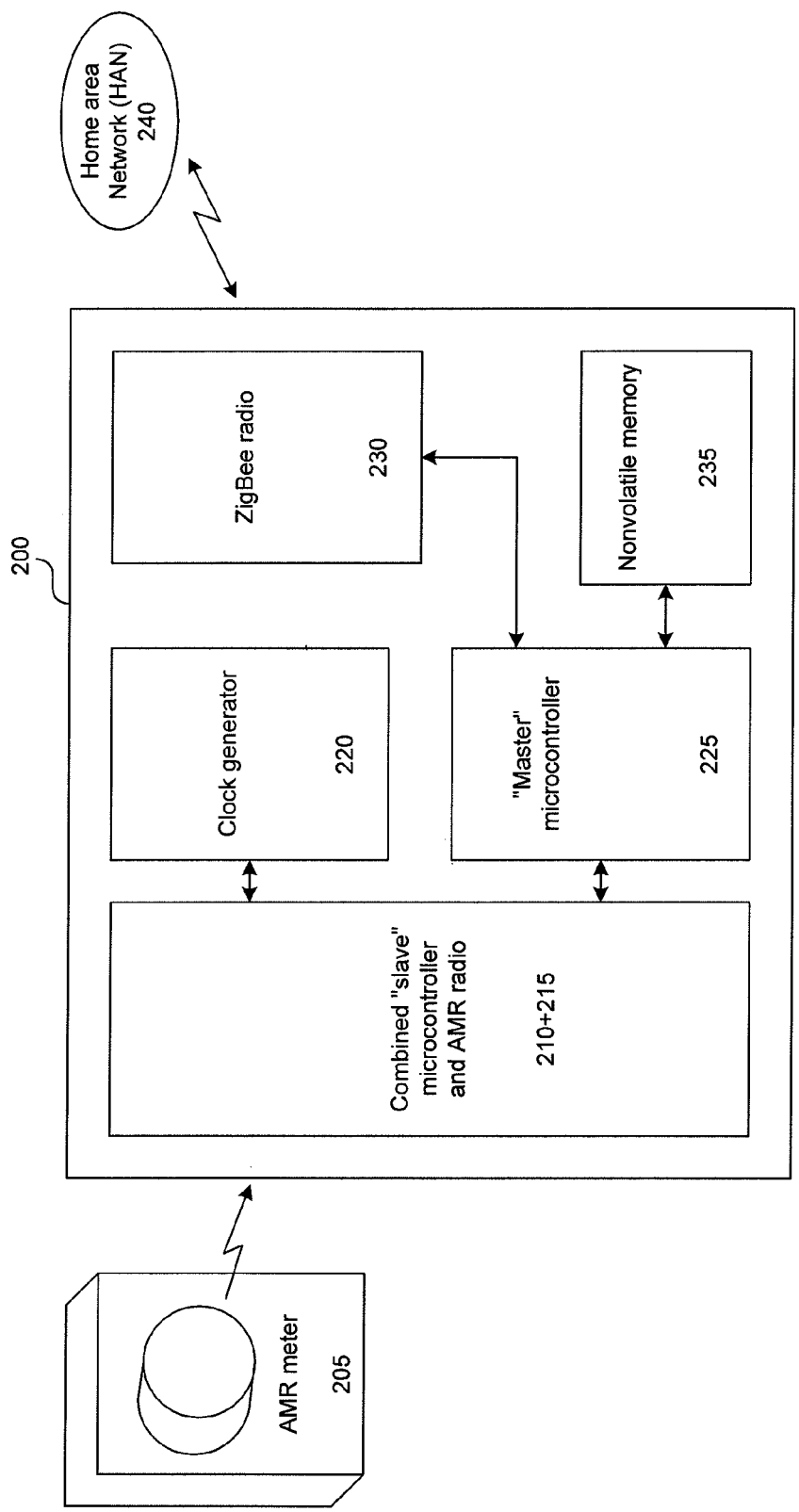
Figure 2I:
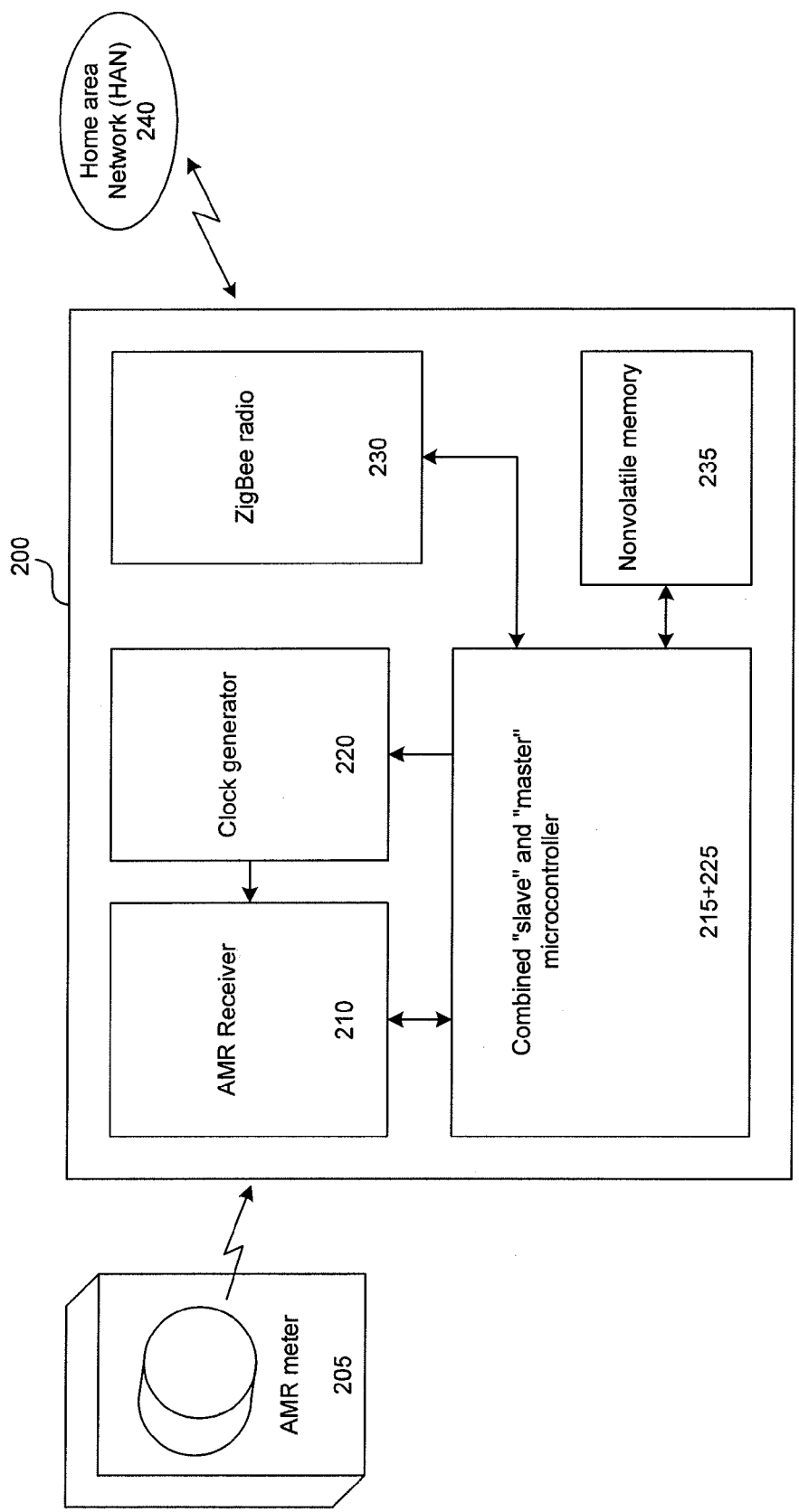
Figure 2J:
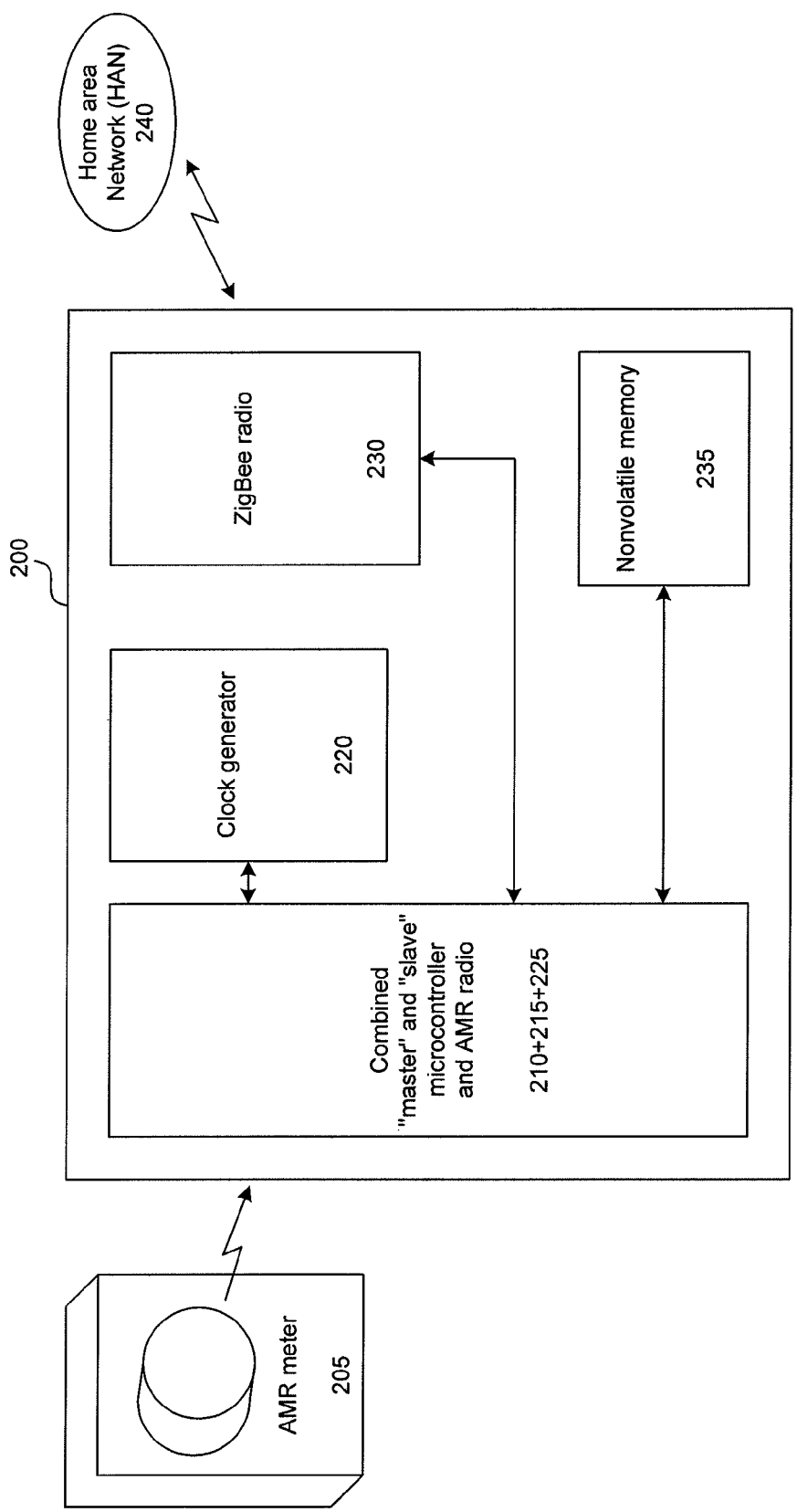
Figure 2K:
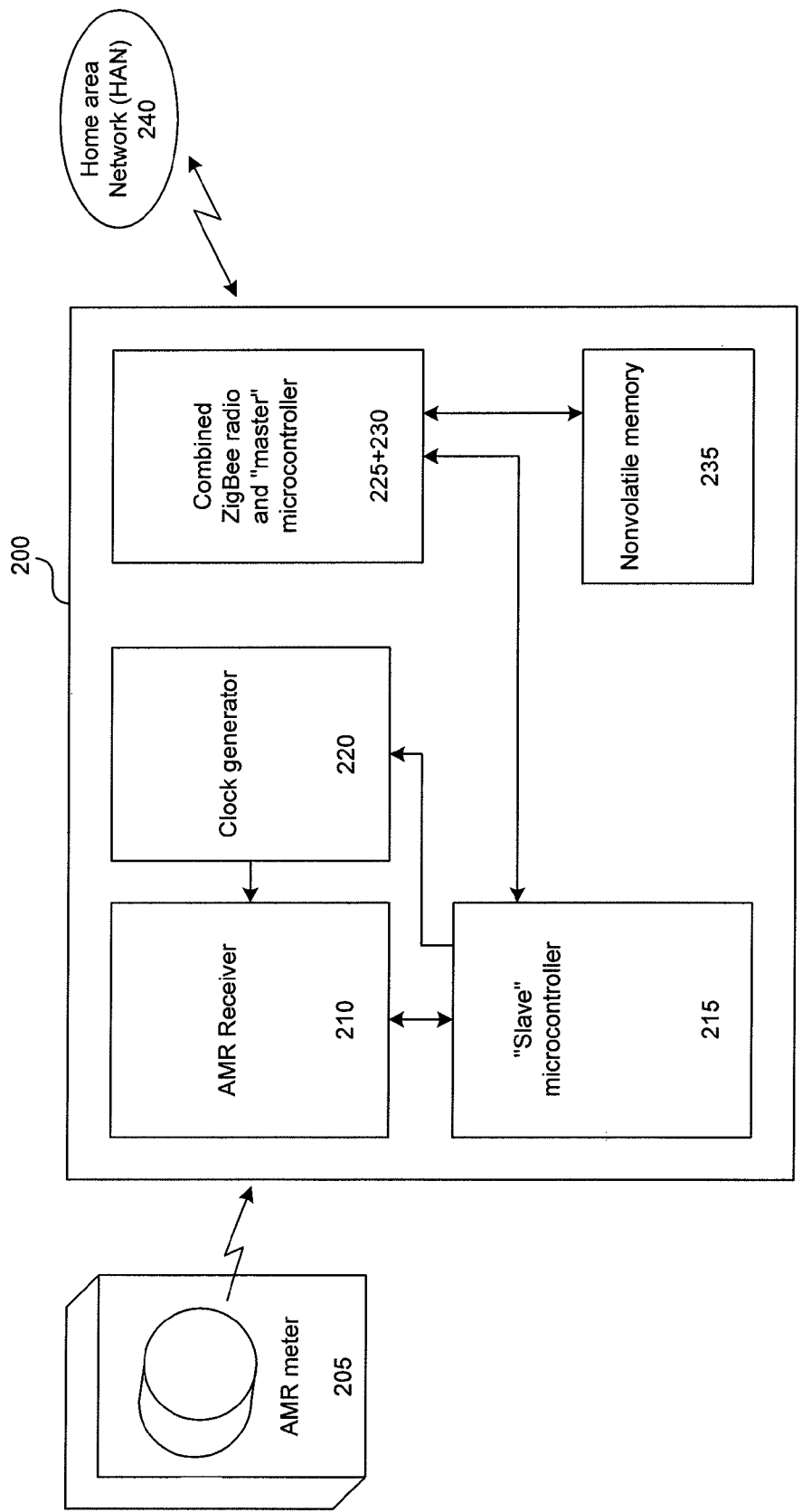
Figure 2L:
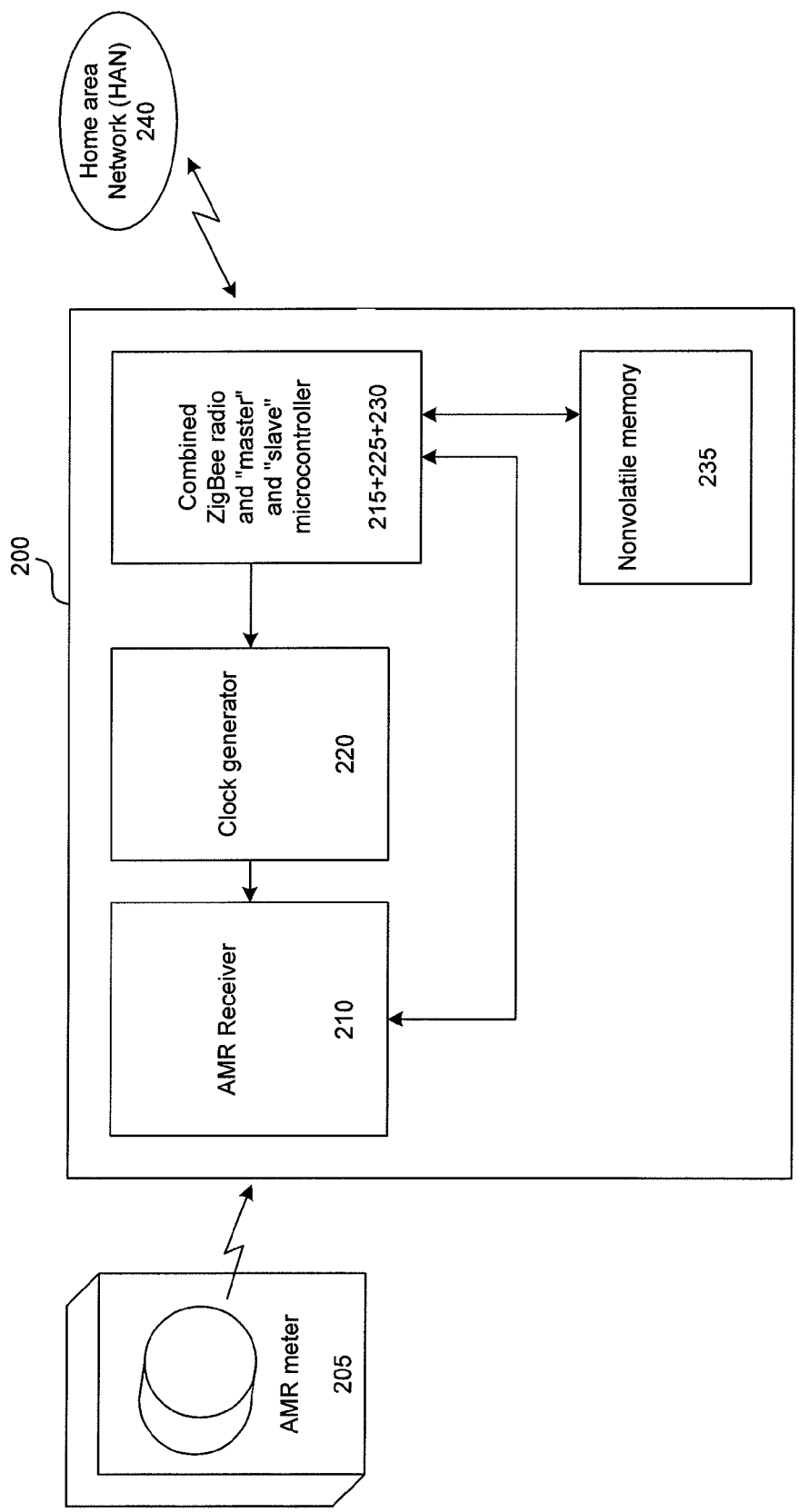

FIGS. 2g-l depict devices 200 in which the clock generator 220 is configurable by the slave microcontroller 215, whether the slave microcontroller 215 is a discrete component, as depicted by FIG. 2a, or is combined with other components, as depicted by FIGS. 2b-f. FIG. 2g depicts a device 200 similar to that of FIG. 2a, with the additional feature that the clock generator 220 is configurable by the slave microcontroller 215. FIG. 2h depicts a device 200 similar to that of FIG. 2b, with the additional feature that the clock generator 220 is configurable by the combined slave microcontroller 215 and AMR receiver 210. FIG. 2i depicts a device 200 similar to that of FIG. 2c, with the additional feature that the clock generator 220 is configurable by the combined slave microcontroller 215 and master microcontroller 225. FIG. 2j depicts a device 200 similar to that of FIG. 2d, with the additional feature that the clock generator 220 is configurable by the combined AMR receiver 210, slave microcontroller 215, and master microcontroller 225. FIG. 2k depicts a device similar to that of FIG. 2e, with the additional feature that the clock generator 220 is configurable by the slave microcontroller 215. FIG. 2l depicts a device similar to that of FIG. 2f, with the additional feature that the clock generator is configurable by the combined slave microcontroller 215, master microcontroller 225, and ZigBee radio 230.

In some embodiments, the communications bridge device 200 is line-powered. However, the connection to a power source should still allow for fine adjustment of the device 200 location and, in some cases, the orientation of the device 200 in order to optimize the ability of the device 200 to receive signals from the AMR meter 205.

Although not required, aspects of the technology described herein may be implemented as computer-executable instructions, such as routines executed by a general or special purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the technology may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

a. Parsing AMR Messages

The process for parsing AMR messages varies based on the AMR protocol used to encode the message. Model parsing processes are described in additional detail herein.

i. Parsing Model Protocol 1 Messages

Figure 4:
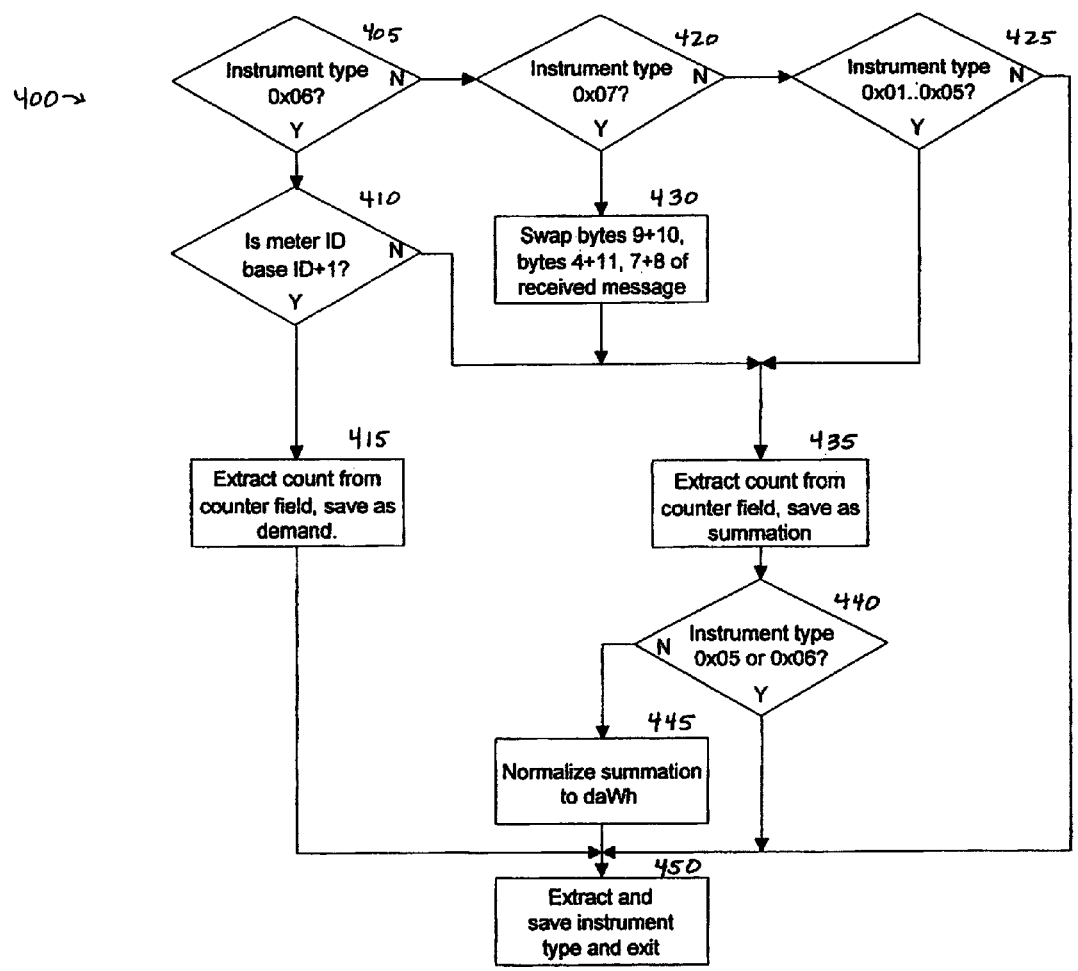
FIGS. 4 and 5 are flow diagrams of processes for parsing received messages.

FIG. 4 is a flow diagram of a suitable process 400 by which a receiving device parses a message encoded using Model Protocol 1, described herein. At decision block 405, the receiving device determines whether the instrument type (byte 3 in Model Protocol 1) is "0x06," which indicates an electric meter that can express both summation and demand (see Table 5). If so, at decision block 410, the receiving device determines whether the received data is a summation or a demand. To do so, the receiving device determines whether the received meter ID is base ID+1, which indicates that the message includes demand data. If so, at block 415, the receiving device extracts the count from the counter field and saves it as demand data. Otherwise, at block 435, the receiving device extracts the count from the counter field and saves it as summation data.

If at decision block 405 the instrument type is not "0x06," the process proceeds to decision block 420, where the receiving device determines whether the instrument type is "0x07," which indicates a gas meter that obfuscates its data (see Table 9). If so, at block 430, the receiving device unobfuscates the data. To do so, the receiving device swaps bytes 9 and 10, bytes 4 and 11, and bytes 7 and 8 of the received message. The process then proceeds to block 435, where the receiving device extracts the count from the counter field and saves it as summation data.

If at decision block 420 the instrument type is not "0x07," the process proceeds to decision block 425, where the receiving device determines whether the instrument type is any of "0x01" through "0x05." If so, the process proceeds to block 435, where the receiving device extracts the count from the counter field and saves it as summation data.

After the receiving device has extracted the count from the counter field and saved it as summation data at block 435, the process proceeds to decision block 440, where the receiving device determines whether the instrument type is either of "0x05" or "0x06," which indicates that the summation data is expressed in daWh. If not, at block 445, the receiving device normalizes the summation data to daWh. At block 450, the receiving device extracts and saves the instrument type, and the process ends.

ii. Parsing Model Protocol 2 Messages

Figure 5:
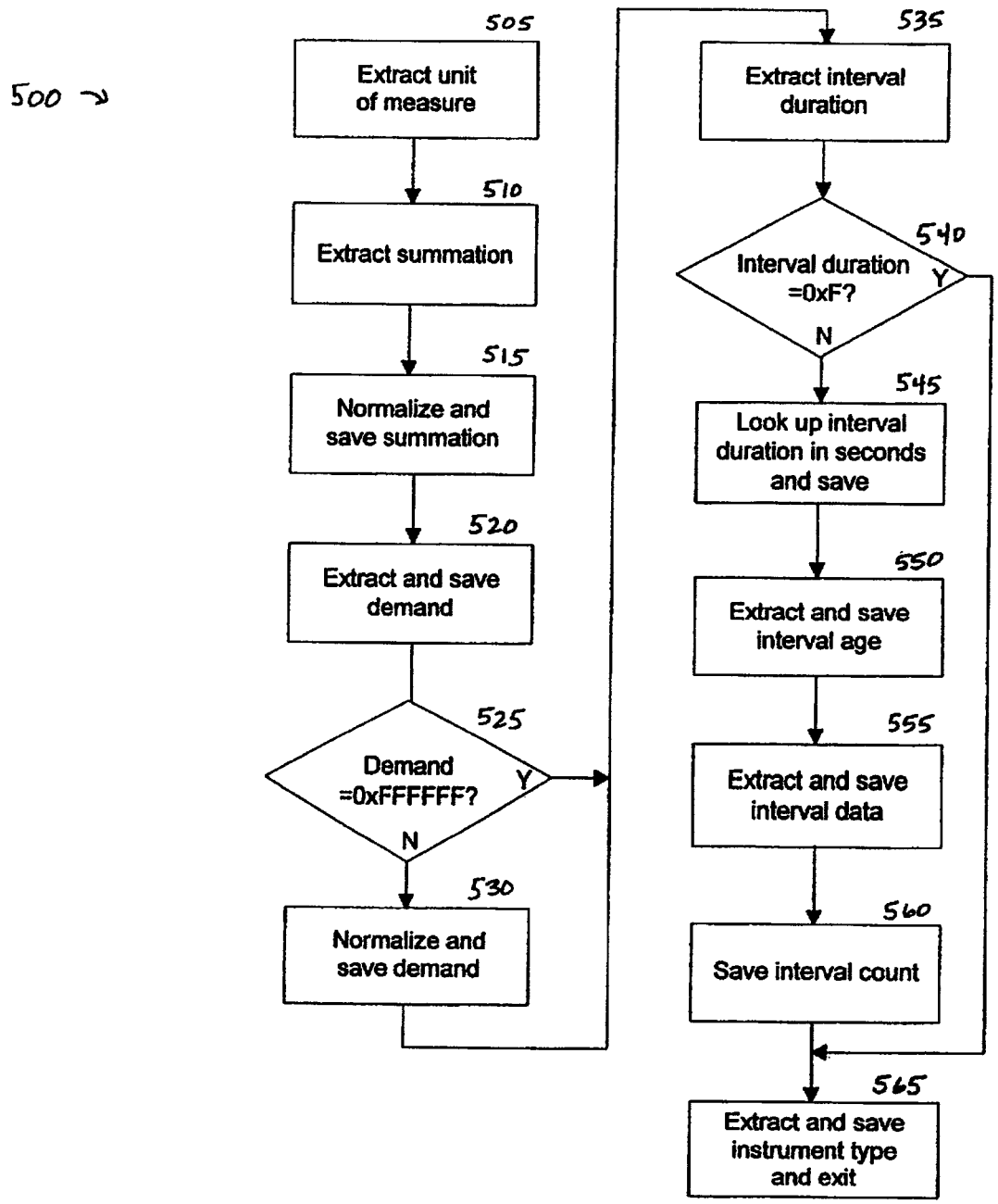

FIG. 5 is a flow diagram of a suitable process 500 by which a receiving device parses a message encoded using Model Protocol 2, described herein. At block 505, the receiving device extracts the unit of measure (byte 9 in Model Protocol 2) from the message. At block 510, the receiving device extracts the summation information (bytes 11-14) from the message, and at block 515, the receiving device normalizes and saves the summation information.

At block 520, the receiving device extracts and saves the demand information (bytes 15-17) from the message. At decision block 525, the receiving device determines whether the demand is "0xFFFFFF," which indicates that there is no valid demand data. If not (i.e., if there is a valid demand value), at block 530, the receiving device normalizes and saves the demand data.

At block 535, the receiving device extracts the interval duration (byte 10) from the message. At decision block 540, the receiving device determines whether the interval duration is "0xF," which indicates that the meter is not tracking interval data. If so, the process proceeds to block 565, where the receiving device extracts and saves the instrument type, and the process ends.

If at decision block 540 the interval duration is not "0xF," the process proceeds to block 545, where the receiving device looks up the interval duration in seconds (see, e.g., Table 16) and saves the interval duration. At block 550, the receiving device extracts and saves the interval age (bytes 19-20). At block 555, the receiving device extracts and saves the interval data (bytes 21-40), and at block 560, the receiving device saves the interval count. The process then proceeds to block 565, where the receiving device extracts and saves the instrument type, and the process ends.

iii. Parsing Model Protocol 3 Messages

Figure 6:
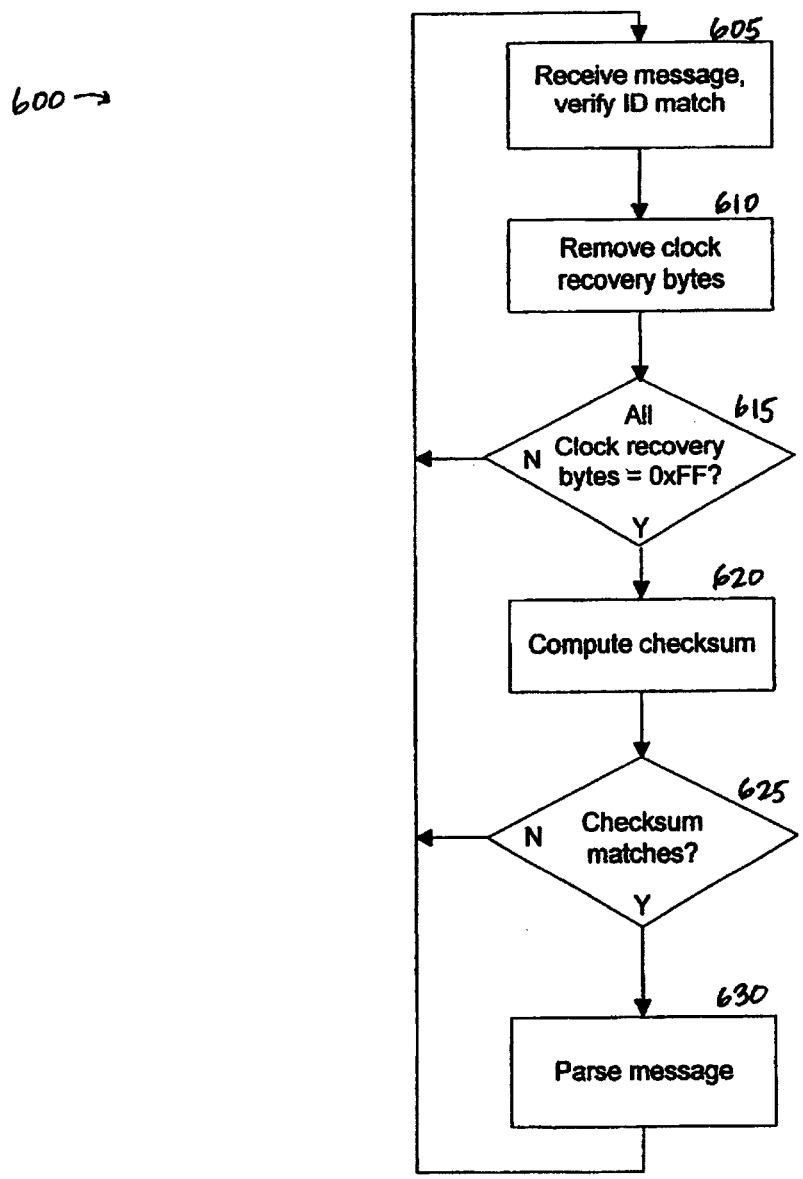
FIG. 6 is a flow diagram of a process for receiving and decoding a message.

FIG. 6 is a flow diagram of a suitable, high-level process 600 by which a receiving device receives and decodes a message using Model Protocol 3, described herein. At block 605, the receiving device receives from a meter a message encoded using Model Protocol 3, and verifies that the meter ID in the received message corresponds to the meter ID of the AMR meter with which the receiving device is intended to operate. At block 610, the receiving device removes clock recovery bytes from the received message. At decision block 615, the receiving device determines whether all clock recovery bytes are "0xFF." Because all of the clock recovery bytes should be "0xFF," these bytes are used to ensure that the message was received correctly. If all clock recovery bytes are "0xFF," the process proceeds to block 610, where the receiving device computes the checksum. Otherwise, the process does not compute the checksum or parse the message, but returns to block 605 to receive the next message from the meter.

At block 620, the receiving device computes the checksum for the received message. At decision block 625, the receiving device determines whether the computed checksum matches the checksum included in the message. If so, the process proceeds to block 630, where the receiving device parses the message. The particular process for parsing the message varies based on the message type of the Model Protocol 3 message. Model parsing processes are described in additional detail herein. On the other hand, if the computed checksum does not match the checksum included in the message, the receiving device does not parse the message, but returns to block 605 to receive the next message from the meter.

Figure 7:
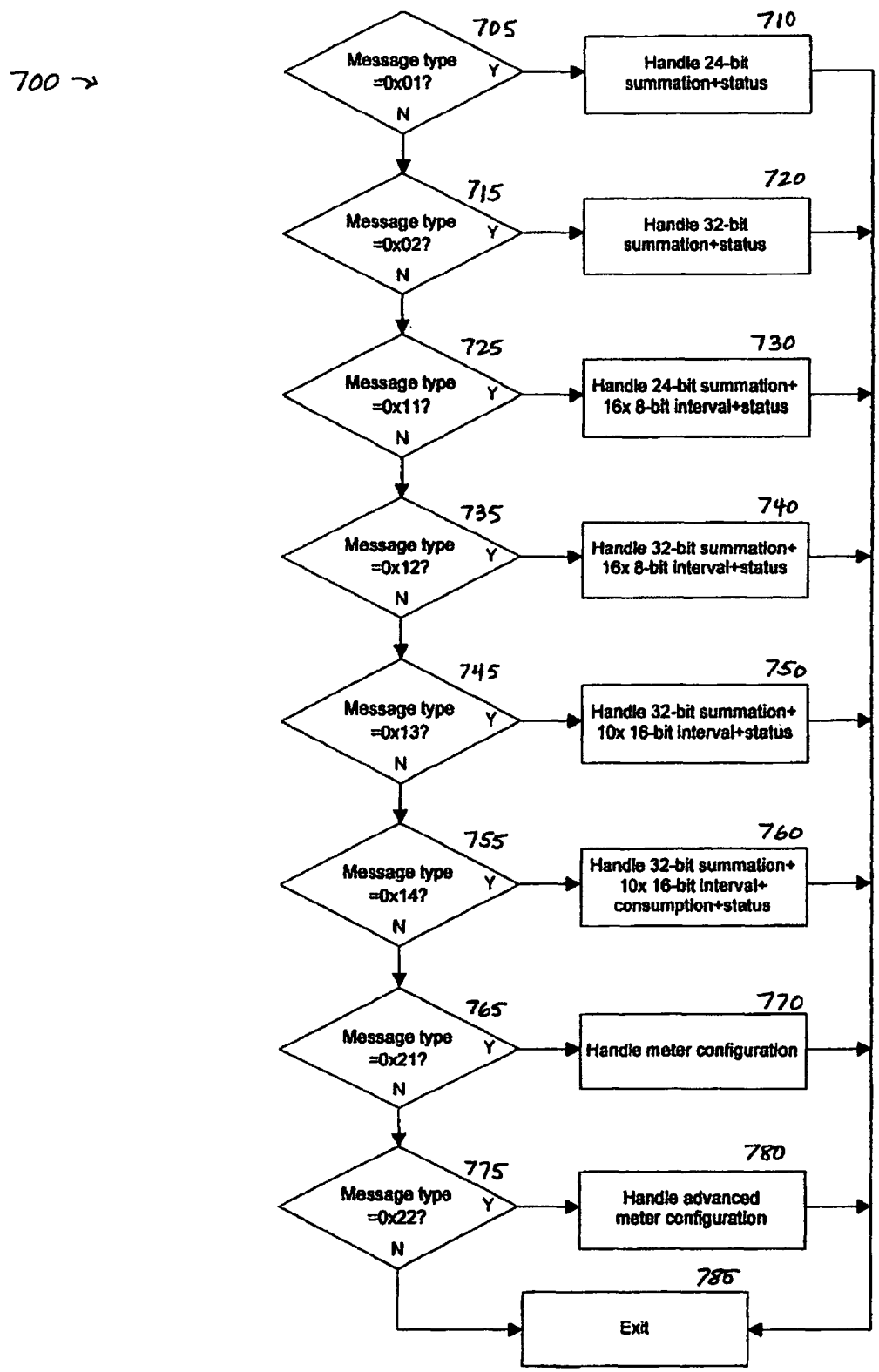
FIGS. 7-12 are flow diagrams of processes for parsing received messages.

FIG. 7 is a flow diagram of a suitable process 700 by which a receiving device parses a received message encoded using Model Protocol 3. At decision block 705, the receiving device determines whether the message type is "0x01," which indicates a message that provides 24-bit summation and meter status information (see Table 20). If so, at block 710, the receiving device passes the message to an appropriate message handler, as described in detail herein.

If the message type is not "0x01," at decision block 715, the receiving device determines whether the message type is "0x02," which indicates a message that provides 32-bit summation and meter status information (see Table 20). If so, at block 720, the receiving device passes the message to an appropriate message handler, as described in detail herein.

If the message type is not "0x02," at decision block 725, the receiving device determines whether the message type is "0x11," which indicates a message that provides 24-bit summation, sixteen 8-bit intervals, and meter status information (see Table 20). If so, at block 730, the receiving device passes the message to an appropriate message handler, as described in detail herein.

if the message type is not "0x11," at decision block 735, the receiving device determines whether the message type is "0x12," which indicates a message that provides 32-bit summation, sixteen 8-bit intervals, and meter status information (see Table 20). If so, at block 740, the receiving device passes the message to an appropriate message handler, as described in detail herein.

If the message type is not "0x12," at decision block 745, the receiving device determines whether the message type is "0x13," which indicates a message that provides 32-bit summation, ten 16-bit intervals, and meter status information (see Table 20). If so, at block 750, the receiving device passes the message to an appropriate message handler, as described in detail herein.

If the message type is not "0x13," at decision block 755, the receiving device determines whether the message type is "0x14," which indicates a message that provides 32-bit summation, ten 16-bit intervals, consumption, and meter status information (see Table 31). If so, at block 760, the receiving device passes the message to an appropriate message handler, as described in detail herein.

If the message type is not "0x14," at decision block 765, the receiving device determines whether the message type is "0x21," which indicates a message that provides meter configuration information (see Table 20). If so, at block 770, the receiving device passes the message to an appropriate message handler, as described in detail herein.

If the message type is not "0x21," at decision block 775, the receiving device determines whether the message type is "0x22," which indicates a message that provides advanced meter configuration information (see Table 31). If so, at block 780, the receiving device passes the message to an appropriate message handler, as described in detail herein. Once the message type has been determined and the message has been passed to the appropriate message handler, the process ends at block 785.

Figure 8:
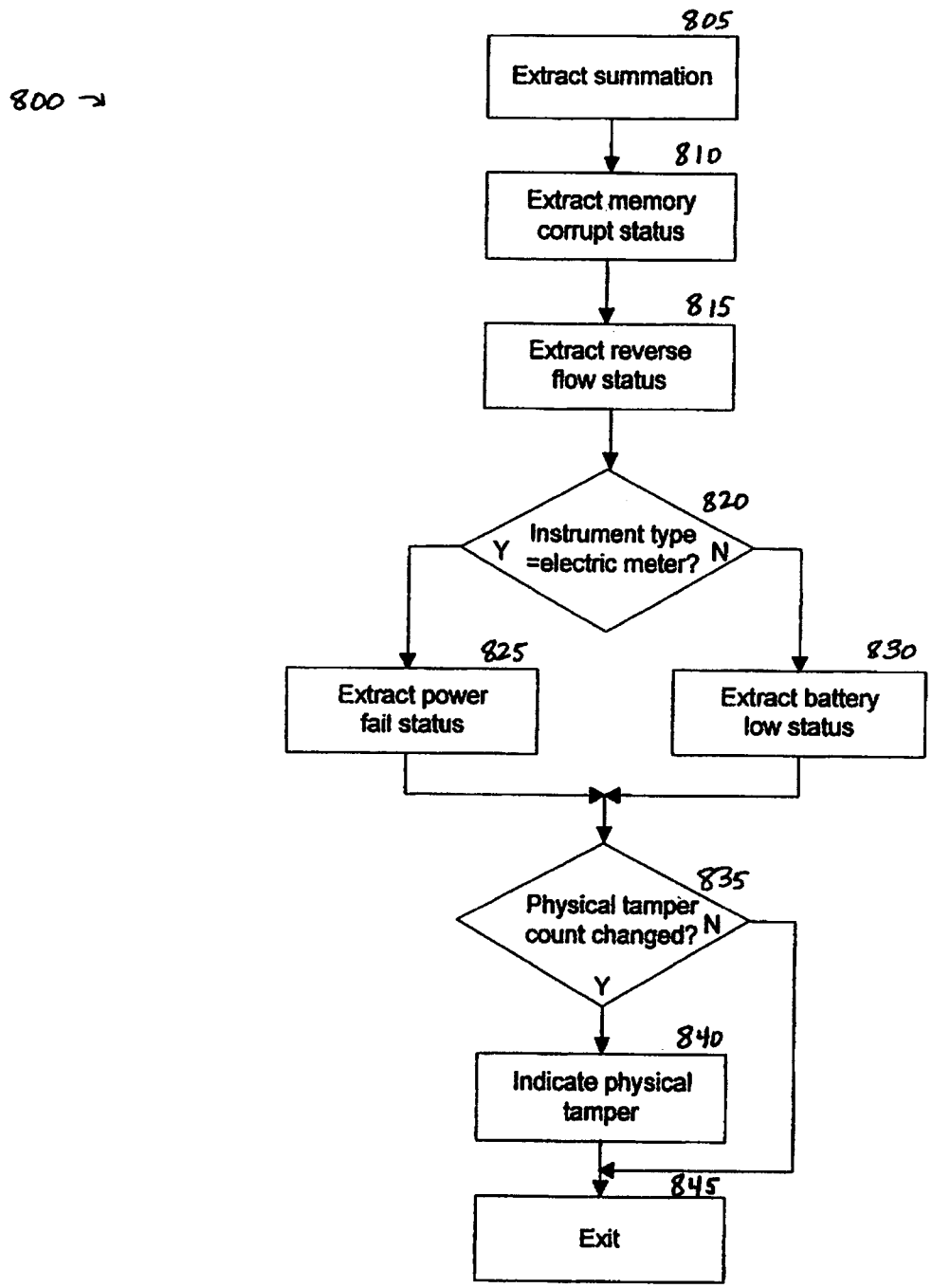

FIG. 8 is a flow diagram of a suitable process used by a message handler to parse Model Protocol 3 messages of type "0x01" (24-bit summation and meter status information) and "0x02" (32-bit summation and meter status information). At block 805, the message handler extracts summation information (actual bytes 12-14 for a 24-bit summation message; actual bytes 12-15 for a 32-bit summation message) from the message. At block 810, the message handler extracts memory corrupt status information (actual byte 15, bit 2 for a 24-bit summation message; actual byte 16, bit 2 for a 32-bit summation message) from the message. At block 815, the message handler extracts reverse flow status information (actual byte 15, bit 0 for a 24-bit summation message; actual byte 16, bit 0 for a 32-bit summation message) from the message.

At decision block 820, the message handler determines whether the instrument type (actual byte 11) indicates an electric meter. To do so, the message handler determines whether the instrument is any of type "0x10" through "0x1F" (see Table 21). If so, at block 825, the message handler extracts power fail status information (actual byte 15, bit 1 for a 24-bit summation message; actual byte 16, bit 1 for a 32-bit summation message) from the message. Otherwise, at block 830, the message handler extracts battery status information (similarly, actual byte 15, bit 1 for a 24-bit summation message; actual byte 16, bit 1 for a 32-bit summation message) from the message.

At decision block 835, the message handler determines whether the physical tamper count (actual byte 15, bits 3-7 for a 24-bit summation message; actual byte 16, bits 3-7 for a 32-bit summation message) has changed. If so, at block 840, the message handler indicates a physical tamper. The process ends at block 845.

Figure 9:
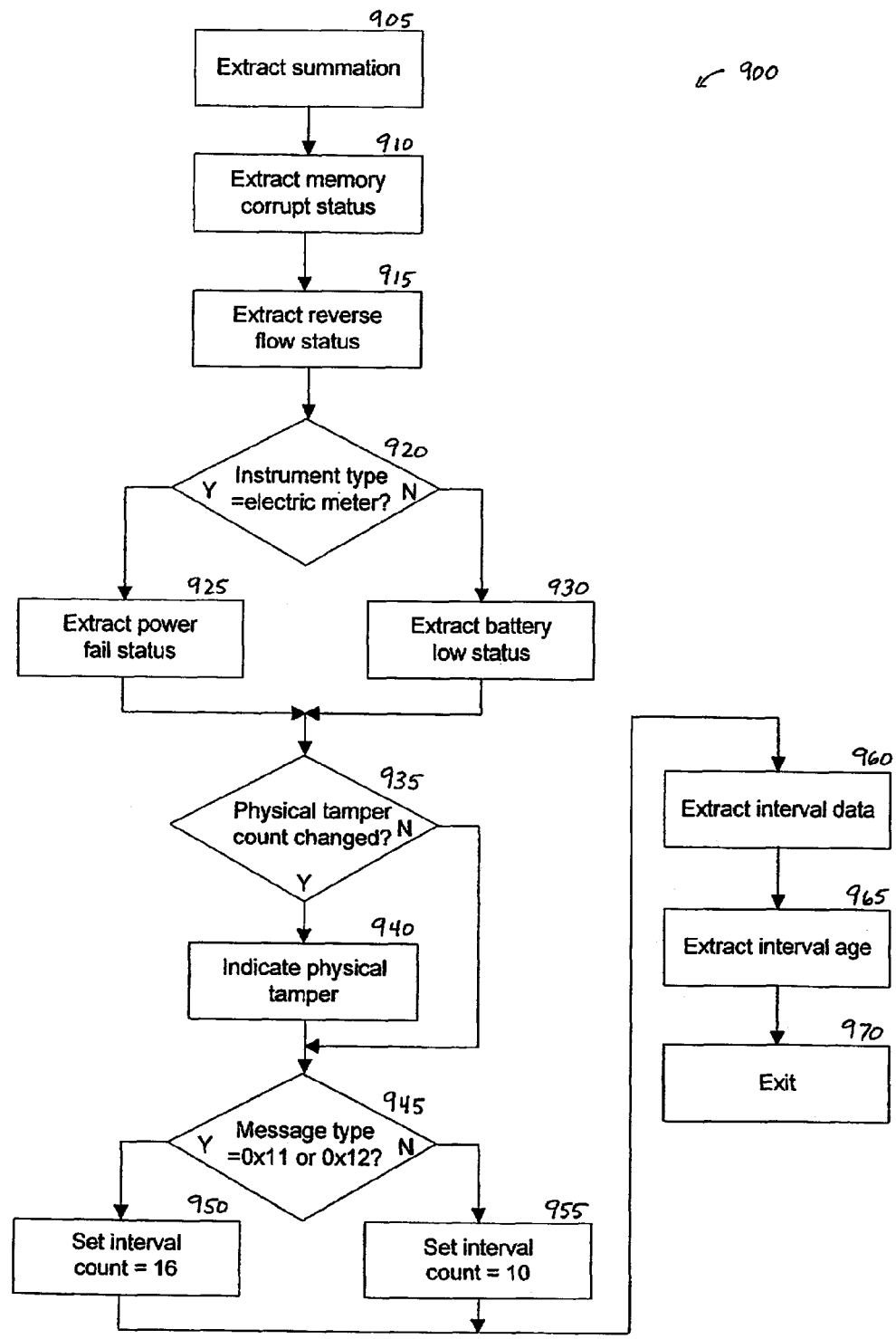

FIG. 9 is a flow diagram of a suitable process 900 used by a message handler to parse Model Protocol 3 messages of types "0x11" (24-bit summation, sixteen 8-bit intervals, and meter status information), "0x12" (32-bit summation, sixteen 8-bit intervals, and meter status information), and "0x13" (32-bit summation, ten 8-bit intervals, and meter status information). At block 905, the message handler extracts summation information (actual bytes 12-14 for a 24-bit summation message; actual bytes 12-15 for a 32-bit summation message) from the message. At block 910, the message handler extracts memory corrupt status information (actual byte 15, bit 2 for a 24-bit summation message; actual byte 16, bit 2 for a 32-bit summation message) from the message. At block 915, the message handler extracts reverse flow status information (actual byte 15, bit 0 for a 24-bit summation message; actual byte 16, bit 0 for a 32-bit summation message) from the message.

At decision block 920, the message handler determines whether the instrument type (actual byte 11) indicates an electric meter. To do so, the message handler determines whether the instrument is any of type "0x10" through "0x1F" (see Table 21). If so, at block 925, the message handler extracts power fail status information (actual byte 15, bit 1 for a 24-bit summation message; actual byte 16, bit 1 for a 32-bit summation message) from the message. Otherwise, at block 930, the message handler extracts battery status information (similarly, actual byte 15, bit 1 for a 24-bit summation message; actual byte 16, bit 1 for a 32-bit summation message) from the message.

At decision block 935, the message handler determines whether the physical tamper count (actual byte 15, bits 3-7 for a 24-bit summation message; actual byte 16, bits 3-7 for a 32-bit summation message) has changed. If so, at block 940, the message handler indicates a physical tamper.

At decision block 945, the message handler determines how many intervals the message contains. To do so, the message handler determines whether the message type is either of "0x11" or "0x12." If so, at block 950, the message handler sets the interval count to 16. Otherwise, at block 955, the message handler sets the interval count to 10.

At block 960, the message handler extracts interval data (actual bytes 16-31 for a 24-bit summation, sixteen 8-bit interval message; actual bytes 17-32 for a 32-bit summation, sixteen 8-bit interval message; actual bytes 17-36 for a 32-bit summation, ten 16-bit interval message) from the message. At block 965, the message handler extracts the interval age (actual bytes 33-34 for a 24-bit summation, sixteen 8-bit interval message; actual bytes 34-35 for a 32-bit summation, sixteen 8-bit interval message; actual bytes 38-39 for a 32-bit summation, ten 16-bit interval message) from the message. The process ends at block 970.

Figure 10:
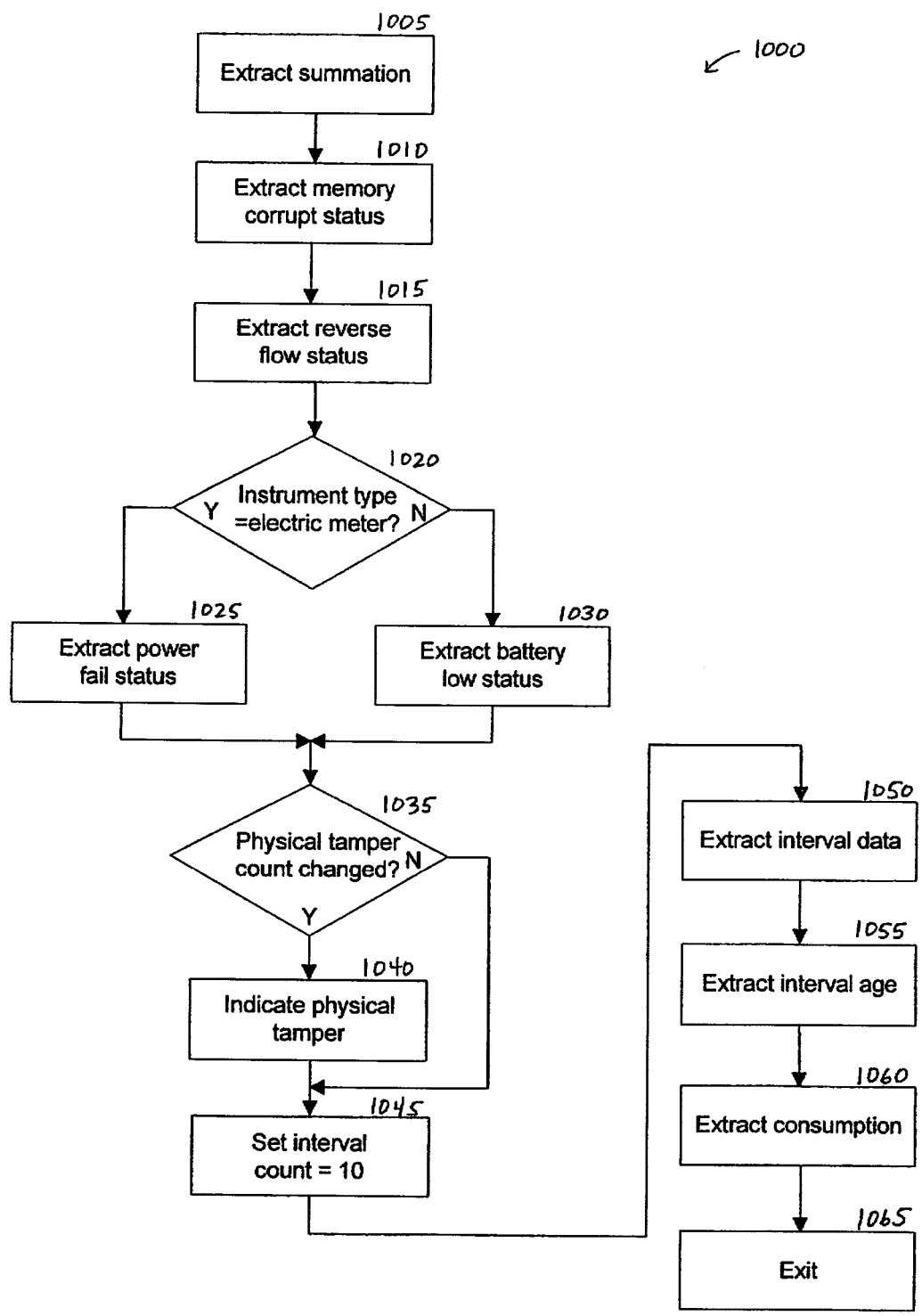

FIG. 10 is a flow diagram of a suitable process 1000 used by a message handler to parse Model Protocol 3 messages of type "0x14" (32-bit summation, ten 16-bit intervals, consumption, and meter status information). Blocks 1005-1040 are processed in a manner similar to that of corresponding blocks 905-940, described herein. At block 1045, the message handler sets the interval count to 10, which is the number of intervals for a message of type "0x14." At block 1050, the message handler extracts interval data (actual bytes 17-36; see, e.g., Table 32) from the message, and at block 1055 the message handler extracts the interval age (actual bytes 38-39) from the message. At block 1060, the message handler extracts consumption information (actual bytes 40-43) from the message. The process ends at block 1065.

Figure 11:
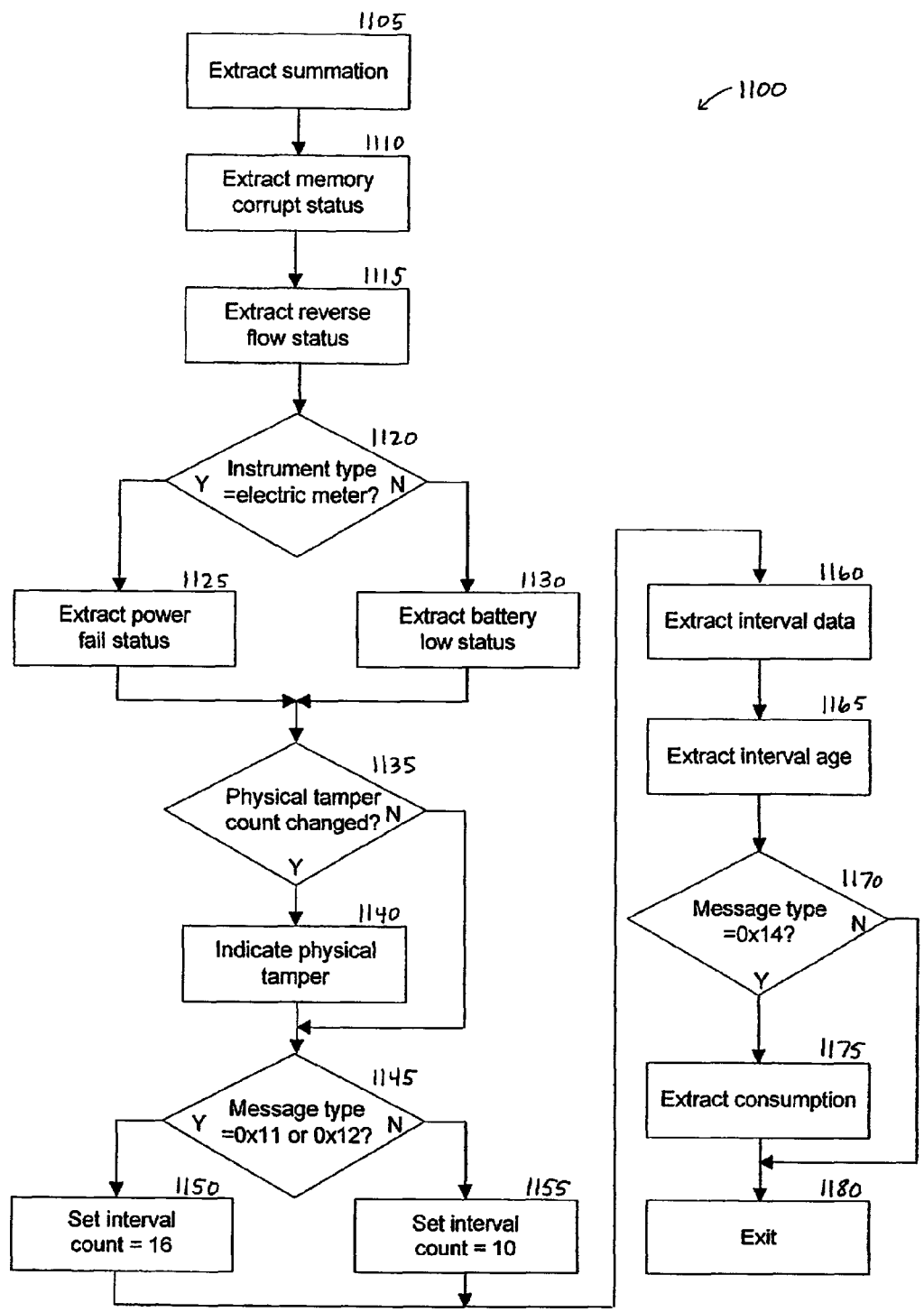

FIG. 11 is a flow diagram of a suitable, single process 1100 used by a message handler to parse Model Protocol 3 messages of types "0x11," "0x12," "0x13," and "0x14." That is, FIG. 11 combines the processes of FIGS. 9 and 10, described herein. Blocks 1105-1165 are processed in a manner similar to that of corresponding blocks 905-965, described herein. At block 1170, the message handler determines whether the message includes consumption data. To do so, the message handler determines whether the message type is "0x14." If so, the message handler extracts consumption information (actual bytes 40-43; see, e.g., Table 32) from the message. The process ends at block 1180.

Figure 12:
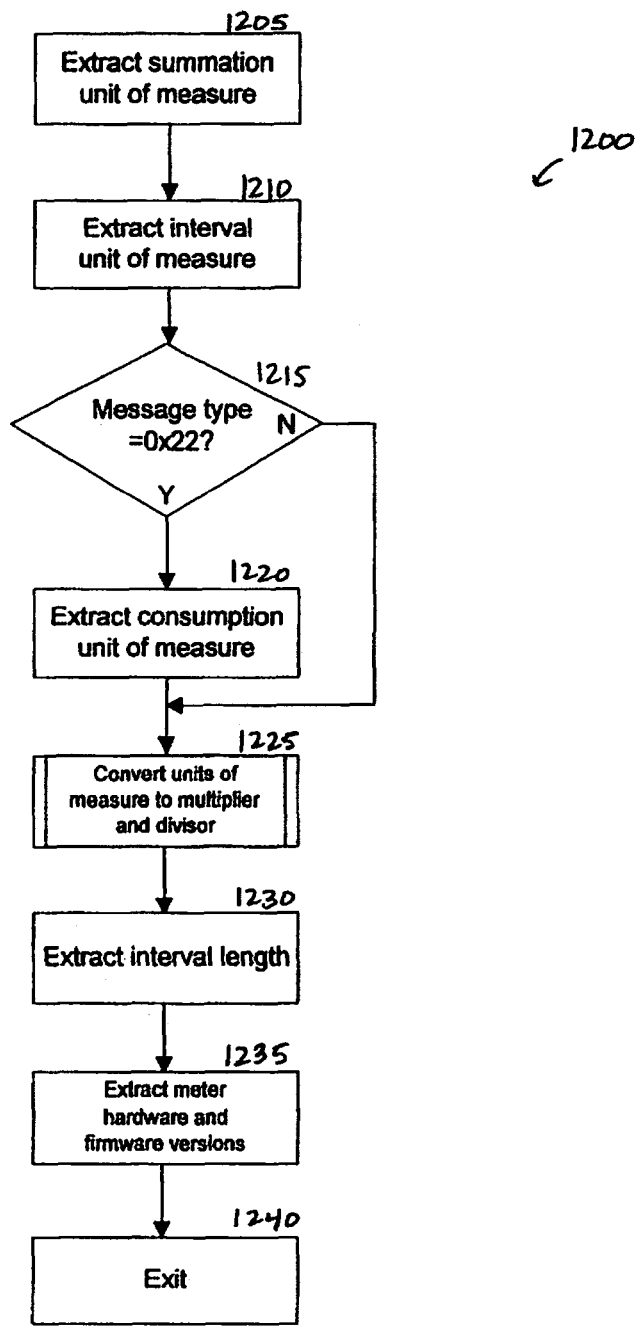

FIG. 12 is a flow diagram of a suitable process 1200 used by a message handler to parse Model Protocol 3 messages of types "0x21" (meter configuration; see, e.g., Table 28) and "0x22" (advanced meter configuration; see, e.g., Table 33). At block 1205, the message handler extracts the summation unit of measure (actual bytes 12 and 13) from the message. At block 1210, the message handler extracts the interval unit of measure (actual bytes 14 and 15) from the message.

At decision block 1215, the message handler determines whether the message includes advanced meter configuration data. To do so, the message handler determines whether the message type is "0x22." If so, at block 1220, the message handler extracts the consumption unit of measure (actual bytes 16 and 17 for advanced meter configuration messages) from the message.

Figure 13:
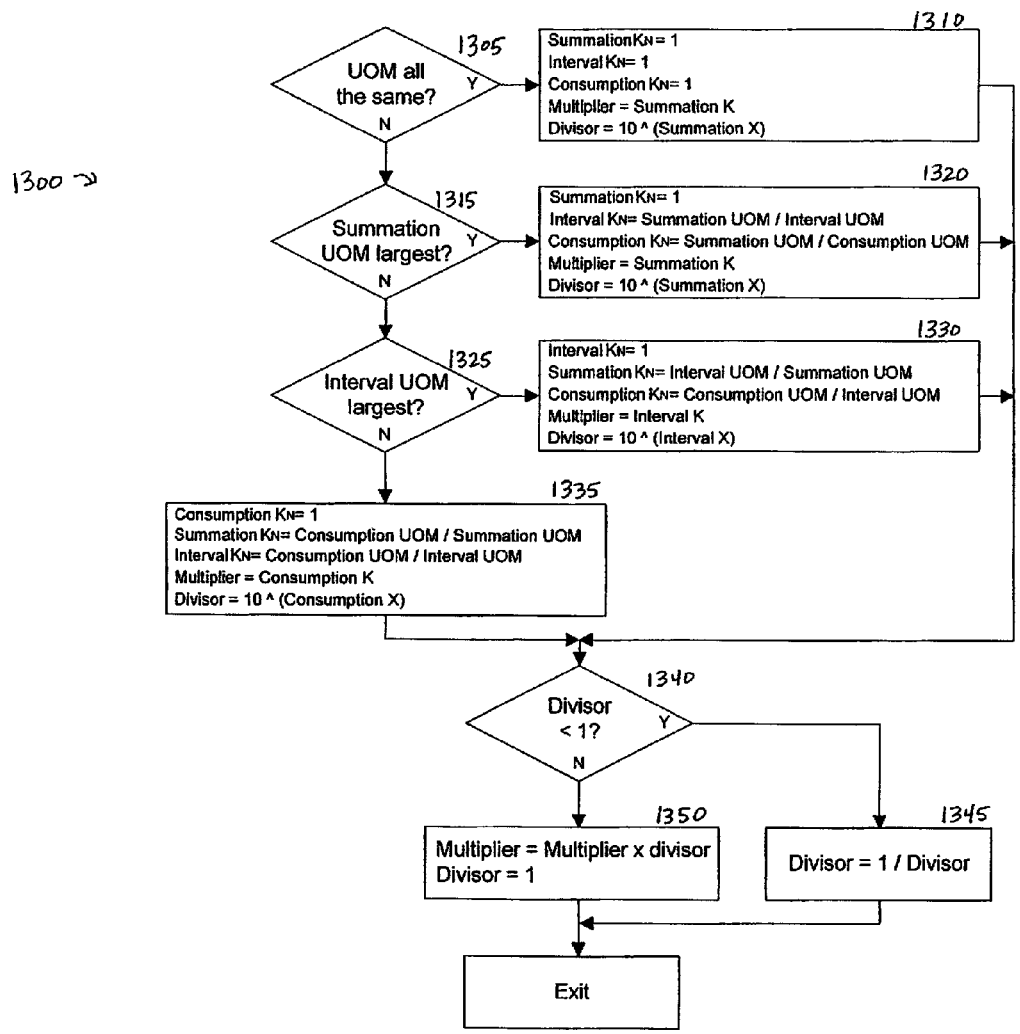
FIG. 13 is a flow diagram of a process for converting units of measure.

At block 1225, the message handler converts the units of measure to a multiplier and a divisor. This process is depicted in FIG. 13. At block 1230, the message handler extracts the interval length (actual bytes 16 and 17 for meter configuration messages; actual bytes 18 and 19 for advanced meter configuration messages) from the message. At block 1235, the message handler extracts meter hardware and firmware versions (actual bytes 20-26 for meter configuration messages; actual bytes 22-28 for advanced meter configuration messages) from the message. The process ends at block 1240.

In Model Protocol 3, as described in detail herein, summation, interval, and consumption information can each be associated with a different unit of measure. In some embodiments, the units of measure are normalized such that they relate to a single multiplier and a single divisor. Normalization constants ($K_N$) for each type of reading are computed and used to determine the multiplier and divisor.

FIG. 13 is a flow diagram of a suitable process 1300 used to convert units of measure to a multiplier and divisor. In block 1305, the process determines whether the summation, interval, and consumption information are all expressed using the same unit of measure. If so, at block 1310, the normalization constant for each reading is set to 1. The multiplier is equal to the summation constant, while the divisor is equal to 10 raised to the summation value.

If at decision block 1305, the units of measure for the readings are not all the same, at block 1315, the process determines whether the summation unit of measure is larger than the other units of measure. If so, at block 1320, the summation normalization constant is set to 1; the interval constant is set to the summation unit of measure divided by the interval unit of measure; and the consumption constant is set to the summation unit of measure divided by the consumption unit of measure. The multiplier is equal to the summation constant, while the divisor is equal to 10 raised to the summation value.

If at decision block 1315, the summation unit of measure is not the largest, at decision block 1325, the process determines whether the interval unit of measure is larger than the other units of measure. If so, at block 1330, the interval constant is set to 1; the summation constant is set to the interval unit of measure divided by the summation unit of measure; and the consumption constant is set to the consumption unit of measure divided by the interval unit of measure. The multiplier is equal to the interval constant, while the divisor is equal to 10 raised to the power of the interval value.

If at decision block 1325, the interval unit of measure is not the largest, at block 1335, the consumption constant is set to 1; the summation constant is set to the consumption unit of measure divided by the summation unit of measure; and the interval constant is set to the consumption unit of measure divided by the interval unit of measure. The multiplier is equal to the consumption constant, while the divisor is equal to 10 raised to the power of the consumption value.

At decision block 1340, the process determines whether the divisor is less than 1. If so, at block 1345, the multiplier is unchanged and the divisor is set to the reciprocal of the divisor extracted from the message. Otherwise, at block 1350, the multiplier is set to the multiplier x divisor, and the divisor is set to 1. The process ends at block 1355.

b. Correlating AMR Data to ZigBee Attributes

Once data from an AMR meter has been received and parsed, the data is correlated to associated ZigBee attributes and made available on the ZigBee HAN. In some embodiments, AMR meter data is correlated to ZigBee attributes according to Table 34. The attributes depicted in Table 34 correspond to the ZigBee SE simple metering cluster (ZigBee profile 0x0109, Cluster 0x0702). One skilled in the art will appreciate that other attribute correlations may be used. Several entries in Table 34 in the column titled "ZigBee attribute description" include parentheticals referring to "notes". The text of the "notes" are provided below the table for the reader's convenience.

TABLE 34

| AMR meter data field name | ZigBee attribute set | ZigBee attribute number | ZigBee attribute description |
| --- | --- | --- | --- |
| Summation | 0x00 | 0x00 | CurrentSummationDelivered |
| Summation | 0x00 | 0x01 | CurrentSummationReceived (note 1) |
| Consumption/Demand | 0x00 | 0x02 | CurrentMaxDemandDelivered (note 2) |
| Consumption/Demand | 0x00 | 0x03 | CurrentMaxDemandReceived (note 2) |
| EEPROM failure | 0x02 | 0x00, bit 0 | Status: Check Meter |
| Low battery | 0x02 | 0x00, bit 1 | Status: Low battery |
| Tamper detect | 0x02 | 0x00, bit 2 | Status: Tamper detect |
| Power failure | 0x02 | 0x00, bit 3 | Status: Power failure |
| Instrument type | 0x03 | 0x00 | UnitOfMeasure |
| Unit of measure | 0x03 | 0x01 | Multiplier |
| Unit of measure | 0x03 | 0x02 | Divisor |
| Instrument type | 0x03 | 0x06 | MeteringDeviceType |
| Consumption/Demand | 0x04 | 0x00 | InstantaneousDemand |
| Summation | 0x04 | 0x01 | CurrentDayConsumptionDelivered (note 3) |
| Summation | 0x04 | 0x02 | CurrentDayConsumptionReceived (note 3) |
| Summation | 0x04 | 0x03 | PreviousDayConsumptionDelivered (note 4) |
| Summation | 0x04 | 0x04 | PreviousDayConsumptionReceived (note 4) |
| Number of intervals | 0x05 | 0x00 | MaxNumberOfPeriodsDelivered (note 5) |

In some cases, the corresponding ZigBee attribute is of a different data size than the AMR data. For example, in the ZigBee SE profile, summation is expressed as a 48-bit integer, while in Model Protocols 1 through 3, summation is expressed as either a 24- or 32-bit integer. If the corresponding ZigBee attribute is larger than the AMR data, the AMR data is sign-extended to fill the ZigBee attribute. If the corresponding ZigBee attribute is smaller than the AMR data, the AMR data is truncated to fit the ZigBee attribute.

Note 1: Summation can be applied to the CurrentSummationReceived attribute if the customer has its own power generation capability (e.g., solar panels or a wind generator) and returns excess energy to the power grid. If two successive summations from the AMR meter indicate a negative change (e.g., when "net metering" is used), the absolute value of the difference between the two readings can be applied to the CurrentSummationReceived attribute.

Note 2: The CurrentMaxDemandDelivered attribute and the CurrentMaxDemandReceived attribute are optional. If used, the ZigBee SE CurrentMaxDemandDeliveredTime and CurrentMaxDemandReceivedTime (attributes 0x08 and 0x09 in attribute set 0x00) are populated with the time at which the maximum demands were detected. A negative value for demand is applied to CurrentMaxDemandReceived, because negative demand is an indication of energy being returned to the power grid.

Note 3: The CurrentDayConsumptionDelivered attribute and the CurrentDayConsumptionReceived attribute are optional. These attributes represent the amount of energy consumed or supplied since midnight, local time. These values are continuously updated, and CurrentDayConsumptionReceived is updated any time that CurrentSummationReceived is updated.

Note 4: The PreviousDayConsumptionDelivered attribute and the PreviousDayConsumptionReceived attribute are optional. These attributes represent the amount of energy consumed or supplied during the 24-hour period that ended at midnight, local time. These attributes are equal to the values of CurrentDayConsumptionDelivered and CurrentDayConsumptionReceived prior to being reset to zero at midnight.

Note 5:If the MaxNumberOfPeriodsDelivered attribute is non-zero, the device also responds to the "Get Profile" command in the simple metering client cluster. The ZigBee SE profile only allows certain values for interval duration. If the AMR meter's interval duration does not correspond to one of the interval durations supported by the ZigBee SE profile, the device reports an interval duration that is an integer multiple (M) or fraction (1/N) of the interval duration reported by the AMR meter. Interval values are computed by either dividing the values reported by the AMR meter by N and filling N consecutive profile periods with the result, or by adding the values of M consecutive intervals as reported by the AMR meter and placing the result into a single profile period.

From the foregoing, it will be appreciated that specific embodiments of the communications bridge have been described herein for purposes of illustration, but that various modifications may be made without deviating from the spirit and scope of the communications bridge.

We claim:

1. A system for providing a communications bridge, the system comprising:
   an automatic meter reading (AMR) receiver configured to:
      receive via a radio signal AMR data from an AMR meter;
      provide the AMR data to a microcontroller;
   the microcontroller configured to:
      receive the AMR data from the AMR receiver;
      translate the AMR data into corresponding ZigBee protocol data at least in part by,
         parsing a plurality of bytes of the AMR data,
         for at least one of the plurality of bytes of the AMR data,
            determining an AMR data field corresponding to the byte of the AMR data,
         for at least one of a plurality of determined AMR data fields,
            correlating the determined AMR data field and any corresponding byte of the AMR data to a ZigBee attribute, and
         storing the correlated AMR data as ZigBee protocol data; and
      provide the ZigBee protocol data to a ZigBee radio; and
   the ZigBee radio configured to:
      receive the ZigBee protocol data from the microcontroller; and
      provide the ZigBee protocol data to a home area network (HAN).

2. The system of claim 1, wherein the AMR receiver is configured to receive the AMR data from the AMR meter via a modulation and encoding scheme used by the AMR meter.

3. The system of claim 1, wherein the AMR receiver is configured to receive the AMR data only from a particular type of AMR meter.

4. The system of claim 1, wherein the microcontroller comprises:
   a slave microcontroller configured to:
      receive the AMR data from the AMR receiver;
      decode the AMR data; and
      provide the decoded AMR data to a master microcontroller; and
   the master microcontroller configured to:
      receive the decoded AMR data from the slave microcontroller;
      translate the decoded AMR data into the corresponding ZigBee protocol data; and
      provide the ZigBee protocol data to the ZigBee radio.

5. The system of claim 4, wherein the master microcontroller is further configured to:
   respond to requests from the HAN for the ZigBee protocol data.

6. The system of claim 4, wherein the master microcontroller is further configured to:
   receive from the HAN configuration information relating to the AMR meter; and
   provide the configuration information to the slave microcontroller, and
   wherein the slave microcontroller is further configured to:
      configure the AMR receiver to receive the AMR data from the AMR meter based on the configuration information.

7. The system of claim 1, wherein the system further comprises:
   nonvolatile memory configured to store:
      an encrypted firmware image for the microcontroller; and
      configuration information related to the HAN, and
   wherein the microcontroller is configured to retrieve, from the nonvolatile memory, the encrypted firmware image and the configuration information related to the HAN.

8. The system of claim 7, wherein the microcontroller is further configured to update its own firmware in accordance with the encrypted firmware image.

9. The system of claim 7, wherein the nonvolatile memory is further configured to store interval data retrievable by other devices in the HAN.

10. A method for providing a communications bridge, the method comprising:
    configuring a microcontroller based on configuration information received from a home area network (HAN);
    configuring, by the microcontroller, an (Automatic Meter Reading) AMR receiver to receive messages from an AMR meter;
    receiving, by the AMR receiver, a message from the AMR meter, the message including AMR data;
    transposing, by the microcontroller, the AMR data into ZigBee data, wherein the transposing comprises swapping bytes of the AMR data;
    providing the ZigBee data to the HAN.

11. The method of claim 10, wherein the microcontroller comprises a slave microcontroller and a master microcontroller,
    wherein the configuring the microcontroller comprises configuring, by the master microcontroller, the slave microcontroller based on the configuration information received from the HAN.

12. The method of claim 11, wherein the transposing, by the microcontroller, the AMR data into the ZigBee data comprises:
    parsing the AMR data by the slave microcontroller; and
    providing, by the slave microcontroller, the parsed AMR data to the master microcontroller.

13. The method of claim 12, wherein the providing the ZigBee data to the HAN comprises providing, by the master microcontroller, the parsed AMR data to a device on the HAN upon request by the device.

14. The method of claim 10, further comprising:
    joining, by the microcontroller, an existing HAN.

15. The method of claim 10, further comprising:
   forming, by the microcontroller, a new HAN; and
   joining, by the microcontroller, the new HAN.

16. A non-transitory computer-readable medium comprising instructions for providing an automatic meter reading (AMR) meter to ZigBee communications bridge for facilitating communication involving an AMR meter, the instructions comprising:
   instructions for receiving messages from the AMR meter, a message including AMR data;
   instructions for converting the AMR data into ZigBee data corresponding to the AMR data, wherein the instructions for converting comprise:
      instructions for parsing a plurality of bytes of the AMR data,
      instructions for, for at least two of the plurality of bytes of the AMR data,
         determining an AMR data field corresponding to the byte of the AMR data,
      instructions for, for at least one of the determined AMR data fields,
         correlating the determined AMR data field and any corresponding byte of the AMR data to a ZigBee attribute, and
   instructions for storing the correlated AMR data as ZigBee protocol data.

17. The non-transitory computer-readable medium of claim 16, the instructions further comprising:
   instructions for providing the ZigBee data, or information computed based on the ZigBee data, to a device on a Local Area Network upon request by the device.

18. The non-transitory computer-readable medium of claim 16, the instructions further comprising:
   instructions for producing a wake-up tone, the wake-up tone causing the AMR meter to transmit the message.

19. The non-transitory computer-readable medium of claim 16, the instructions further comprising:
   instructions for configuring the AMR meter in accordance with configuration data received from a Local Area Network.

20. The non-transitory computer-readable medium of claim 16, wherein the instructions further comprise:
   instructions for receiving an encrypted firmware update from a Local Area Network;
   instructions for storing the encrypted firmware update in nonvolatile memory;
   instructions for decrypting the encrypted firmware update; and
   instructions for updating device firmware in accordance with the decrypted firmware update.

* * * * *